United States Patent
Chandrasekhar et al.

(10) Patent No.: US 8,654,734 B2
(45) Date of Patent: Feb. 18, 2014

(54) MULTI-CELL CHANNEL STATE INFORMATION-REFERENCE SYMBOL PATTERNS FOR LONG TERM EVOLUTION EXTENDED CYCLIC PREFIX AND CODE DIVISION MULTIPLEXING-TIME MULTIPLEXING

(75) Inventors: Vikram Chandrasekhar, Dallas, TX (US); Eko N. Onggosanusi, Allen, TX (US); Runhua Chen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 43 days.

(21) Appl. No.: 13/150,909

(22) Filed: Jun. 1, 2011

(65) Prior Publication Data

US 2012/0243500 A1    Sep. 27, 2012

Related U.S. Application Data

(60) Provisional application No. 61/350,314, filed on Jun. 1, 2010, provisional application No. 61/358,663, filed on Jun. 25, 2010.

(51) Int. Cl.
*H04W 4/00* (2009.01)
(52) U.S. Cl.
USPC ............................................. 370/330

(58) Field of Classification Search
USPC .................................................. 370/330, 436
See application file for complete search history.

(56) References Cited

U.S. PATENT DOCUMENTS

2011/0237270 A1* 9/2011 Noh et al. .................... 455/450
2013/0088949 A1* 4/2013 Zhang et al. ................. 370/208

* cited by examiner

*Primary Examiner* — Mark Rinehart
*Assistant Examiner* — Peter Cheng
(74) *Attorney, Agent, or Firm* — Ronald O. Neerings; Wade James Brady; Frederick J. Telecky, Jr.

(57) ABSTRACT

This invention is a method of wireless communication using candidate multi-cell CSI-RS time-frequency patterns in the invention. This invention avoids collision with antenna ports 0, 1, 2 and 3 used for transmitting cell-specific reference signals and port 5 used for transmitting demodulation reference signals. This invention satisfies the nested property requirement. This invention avoids collision with DM-RS signal for extended cyclic prefix transmission as long as DMRS Rank is less than or equal to 2. For ranks greater than 2, this invention produces patterns that may collide with Rel. 10 DM-RS for extended CP. The invention includes alternative patterns obtained by relabeling and/or reshuffling the CSI-RS antenna port numbers while preserving identical time-frequency resources assigned to CSI-RS in the time-frequency grid.

12 Claims, 54 Drawing Sheets

L=0            L=5  L=0            L=5

L=0        L=5 L=0                    L=5

R  INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0    L=5 L=0    L=5

R  INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0             L=5  L=0                L=5

R  INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0        L=5  L=0                L=5

L=0　　　　　L=5　L=0　　　　　L=5

R　INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0　　　　　　L=5　L=0　　　　　　L=5

- R : INTRA-CELL CSI-RS ON ANTENNA PORT I
- CRS PORTS 0 AND 1
- REL. 8 DM-RS (ANTENNA PORT 5)
- CRS PORTS 2 AND 3
- PDSCH / PDCCH / PHICH / PCFICH

L=0　　　　　L=5　L=0　　　　　　L=5

R　INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0    L=5 L=0    L=5

L=0　　　　　　　　L=5　L=0　　　　　　　　L=5

R  INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0　　　　　　L=5　L=0　　　　　　L=5

L=0　　　　　　L=5　L=0　　　　　　L=5

R ░ INTRA-CELL CSI-RS ON ANTENNA PORT I

▨ CRS PORTS 0 AND 1

▧ REL. 8 DM-RS (ANTENNA PORT 5)

▩ CRS PORTS 2 AND 3

☐ PDSCH / PDCCH / PHICH / PCFICH

L=0    L=5  L=0    L=5

R — INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0         L=5 L=0                    L=5

L=0    L=5 L=0    L=5

R  INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0　　　　　　L=5 L=0　　　　　　　　L=5

R　INTRA-CELL CSI-RS ON ANTENNA PORT I

CRS PORTS 0 AND 1

REL. 8 DM-RS (ANTENNA PORT 5)

CRS PORTS 2 AND 3

PDSCH / PDCCH / PHICH / PCFICH

L=0    L=5 L=0    L=5

MULTI-CELL CHANNEL STATE INFORMATION-REFERENCE SYMBOL PATTERNS FOR LONG TERM EVOLUTION EXTENDED CYCLIC PREFIX AND CODE DIVISION MULTIPLEXING-TIME MULTIPLEXING

CLAIM OF PRIORITY

This application claims priority under 35 U.S.C. 119(e)(1) to U.S. Provisional Application No. 61/350,314 filed Jun. 1, 2010 and U.S. Provisional Application No. 61/358,663 filed Jun. 25, 2010.

TECHNICAL FIELD OF THE INVENTION

The technical field of this invention is wireless communication such as wireless telephony.

BACKGROUND OF THE INVENTION

To obtain accurate channel state information at the user equipment (UE) the Evolved Universal Terrestrial Radio Access (E-UTRA) LTE-Advanced standard employs a new reference symbol called Channel State Information-Reference Symbol (CSI-RS).

CSI-RS transmission is required for channel estimation at the UE since Rel. 8 Cell-specific Reference Symbols (CRS) are available only up to 4 antenna ports. For 4 transmitting antennas (TX) CRS is transmitted on antenna ports 0, 1, 2 and 3). A general principle of Rel. 10 reference symbols (RS) is precoded UE-RS used for data demodulation for up to an 8 layer transmission while non-precoded cell-specific CSI-RS is used for link adaptation. Existing Rel. 8 CRS will be used for control and measurement purposes and providing backwards compatibility for channel estimation at Rel. 8 UEs.

It is important to design CSI-RS reference patterns corresponding to the OFDM time-frequency resource block grid to minimize interference while measuring channel quality information (CQI) at a given UE from CSI-RS transmissions from interfering multiple cells.

The E-UTRA LTE-Advanced standard currently includes the following:

CSI-RS port multiplexing is based on Code Division Multiplexing (CDM) for each pair of CSI-RS ports.

Avoidance of port 5 of the same cell.

Two, 4 and 8 CSI-RS ports are nested to simplify implementation. This means that pattern with smaller number of CSI-RS ports (such as 1, 2 or 4) is a subset of the pattern with larger number of CSI-RS ports (2, 4 or 8).

A time-invariant time/frequency shift is used for CSI-RS transmission in a cell.

The following high-level design guidelines are advantageous the final CSI-RS pattern:

Minimizing Rel. 8 UE Performance Degradation.

Because Rel. 8 LTE UEs are oblivious to CSI-RS puncturing of their PDSCH REs, these UEs will experience throughput degradation and a Block Error Rate (BLER) floor at high Signal to Noise Ratio (SNR) especially when scheduled with a higher-order Modulation and Coding Scheme (MCS). Appropriate eNodeB scheduling of such UEs on non CSI-RS subframes may minimize the CSI-RS footprint across subframes. Alternately MCS downscaling such as Quadrature Phase Shift Keying (QPSK) ½ may be used whenever Rel. 8 UEs are scheduled in CSI-RS subframes.

Subframe Indices in FDD Systems.

CSI-RS transmissions should not occur in Physical Broadcast CHannel (PBCH), Synchronization Channel (SCH) or Paging channel carrying subframes to avoid problems with cell-search and initial acquisition.

Channel Estimator Complexity.

UE channel estimator complexity should be minimized by: using a CSI-RS pattern completely specified with just one resource block that is shift-invariant across frequency domain; Nested property whenever number of eNodeB APs is less than 8; CSI-RS RE locations for AP i>0 should be implicitly determined by the Orthogonal Frequency Division Multiplexing (OFDM) symbol and resource element position of AP 0; to ease channel estimation, all APs corresponding to CSI-RS in a given cell should be transmitted within a single subframe.

Interference Avoidance on Physical Downlink Control CHannel (PDCCH).

To avoid collision with PDCCH for any control region size, CSI-RS should not be carried on OFDM symbols 0 through 2. OFDM symbol 3 should be used to transmit CSI-RS as long as the operational bandwidth is greater than 1.4 MHz for higher re-use considering the limited availability of real-estate.

Interference Avoidance on CRS.

To ensure that Rel. 8 UE can receive CRS at least on APs 0 and 1, the CSI-RS transmissions should not occur on OFDM symbols {0, 4, 7, 11} in normal Cyclic Prefix (CP) operation and OFDM symbols {0, 3, 6, 9} in extended CP operation.

Interference Avoidance on UE-RS.

Because Rel. 10 UEs uses UE-RS for data demodulation, CSI-RS transmissions should not occur on REs positions intended for Rel. 10 UE-RS transmissions.

Interference Avoidance on Rel. 8 DM-RS.

For accurate channel estimation over Rel. 8 DM-RS (AP 5) at UEs configured for transmission mode 7, CSI-RS transmissions should not puncture out DM-RS REs. There are six options. In the first option eNodeB avoids AP 5 by picking a reuse pattern located outside of the AP 5 OFDM symbol. This permits the eNodeB to avoid collision with AP 5, but may result in a smaller reuse factor, especially when RS corresponding to APs 2, 3 and 5 are transmitted in a CSI-RS subframe. In the second option the eNodeB avoids AP 5 by picking a reuse pattern for a given cell specific Rel. 8 DM-RS shift, if possible. This avoids causing interference on AP 5, while ensuring a reuse factor which is at least as large as those obtained using the first option. The third option avoids AP 5 by scheduling whereby AP 5 is never sent in a subframe with CSI-RS. Thus the AP 5 and CSI-RS should not be shown in the same subframe. This option increases eNodeB scheduler complexity because it cannot configure a Rel. 8 UE for TM7 in CSI-RS subframes. In the fourth option the eNodeB transmits AP 5 RS and CSI-RS by superposition on the same RE. In the fifth option either AP 5 RS or 1 CSI-RS is transmitted, while the other one is punctured. Since CSI-RS is transparent to Rel. 8 UEs configured for Transparent Mode 7 (TM7), superposition of puncturing may result in inferior channel estimation quality at these UEs. This can affect data demodulation procedure. Further the RB selective transmission of CSI-RS of the fifth option may deteriorate intra-cell channel estimate due to the already low PRB density of CSI-RS of 1 RE/PRB/port. In the sixth option CSI-RS REs avoid RE positions corresponding to AP 5 if TM7 is enabled in a CSI-RS carrying subframe. If TM7 is not enabled with no UE is configured for TM7, then CSI-RS may reuse RE positions corresponding to AP 5. This sixth option requires one-bit signalling from eNodeB to Rel. 10 UEs to indicate whether TM7 is enabled in that CSI-RS subframe. This results in increased specification complexity. Whether TM7 is enabled may vary from one subframe to the next, implying significant signalling overhead when transmitting the one bit message.

SUMMARY OF THE INVENTION

This invention includes candidate multi-cell CSI-RS time-frequency patterns in the invention.

In contrast to a prior scheme on a similar concept, the candidate CSI-RS patterns of this invention do not require knowledge of whether LTE transmission mode 7 is enabled. The proposed candidate patterns avoid interference during CSI-RS transmissions with multiple cells. The proposed pattern does not require the UE to know whether Rel. 8 UE specific reference symbols (DM-RS) are transmitted.

This invention avoids collision with antenna ports 0, 1, 2, 3 and 5. This invention satisfies the nested property requirement for antenna ports less than 8. This invention is forward compatible with proposed WF pattern for DMRS Rank 1 and 2. This invention avoids collision as long as DMRS Rank is less than or equal to 2. For ranks greater than 2, this invention produces patterns that may collide with Rel. 10 UE-RS for extended CP. One embodiment of this invention assigns the location of CSI-RS antenna port 0 as a function of the physical layer cell identity.

The base patterns illustrated in FIGS. 3 to 54 assume CDM-T multiplexed antenna ports (2i, 2i+1) where the value i is either 0 or 1 or 2 or 3. The numbering of CSI-RS for the first antenna port starting with antenna port 0 is purely arbitrary and illustrative example. In a N TX system (N of 1, 2, 4 or 8), the CSI-RS for each antenna can be described by assigning a unique antenna port number offset for the first antenna port, just as the cell-specific reference signals are assigned antenna ports 0, 1, 2 and 3. Thus with 8 TX, the CSI-RS for the first antenna port can be given an offset equaling 15. All subsequent CSI-RS antenna port numbers can be assigned antenna port numbers 16, 17, 18, 19, 20, 21 and 22.

In this invention 2, 4 and 8 CSI-RS ports are nested to simplify implementation. This means that pattern with smaller number of CSI-RS ports is a subset of the pattern with larger number of CSI-RS ports. The base patterns illustrated in this invention are shown with respect to a Physical Resource Block (PRB) pair. The CSI-RS pattern is assumed to remain invariant across the entire system bandwidth, thus the CSI-RS patterns in a given slot over any two PRBs is the same. The base patterns illustrated in this application include possible alternative patterns obtained by relabeling and/or reshuffling of the CSI-RS antenna ports. The corresponding CSI-RS resources occupy the time-frequency resources shown in the drawings.

In this invention Ports i (i>0) follow a implicit mapping given location of antenna port 0.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
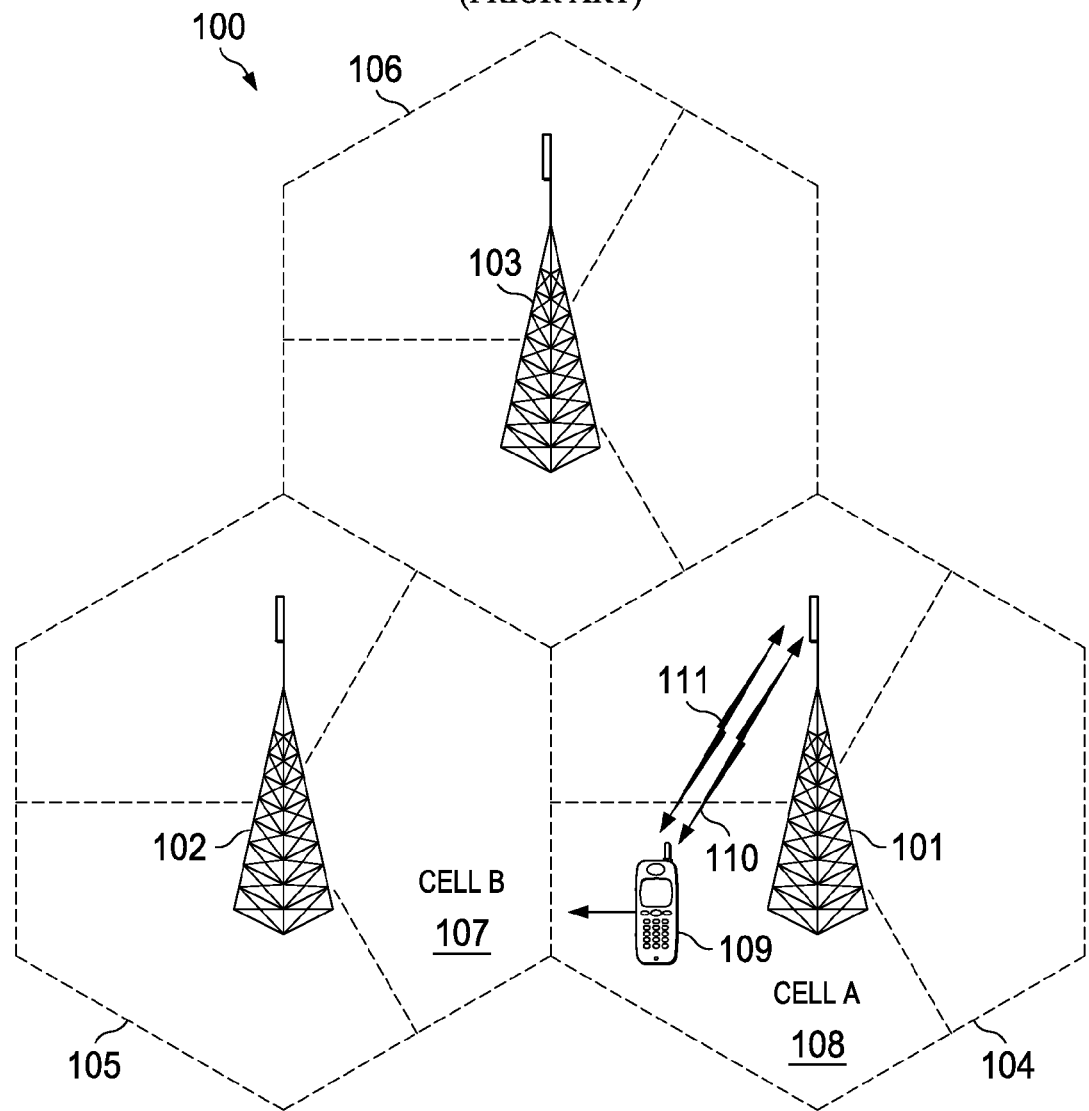
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
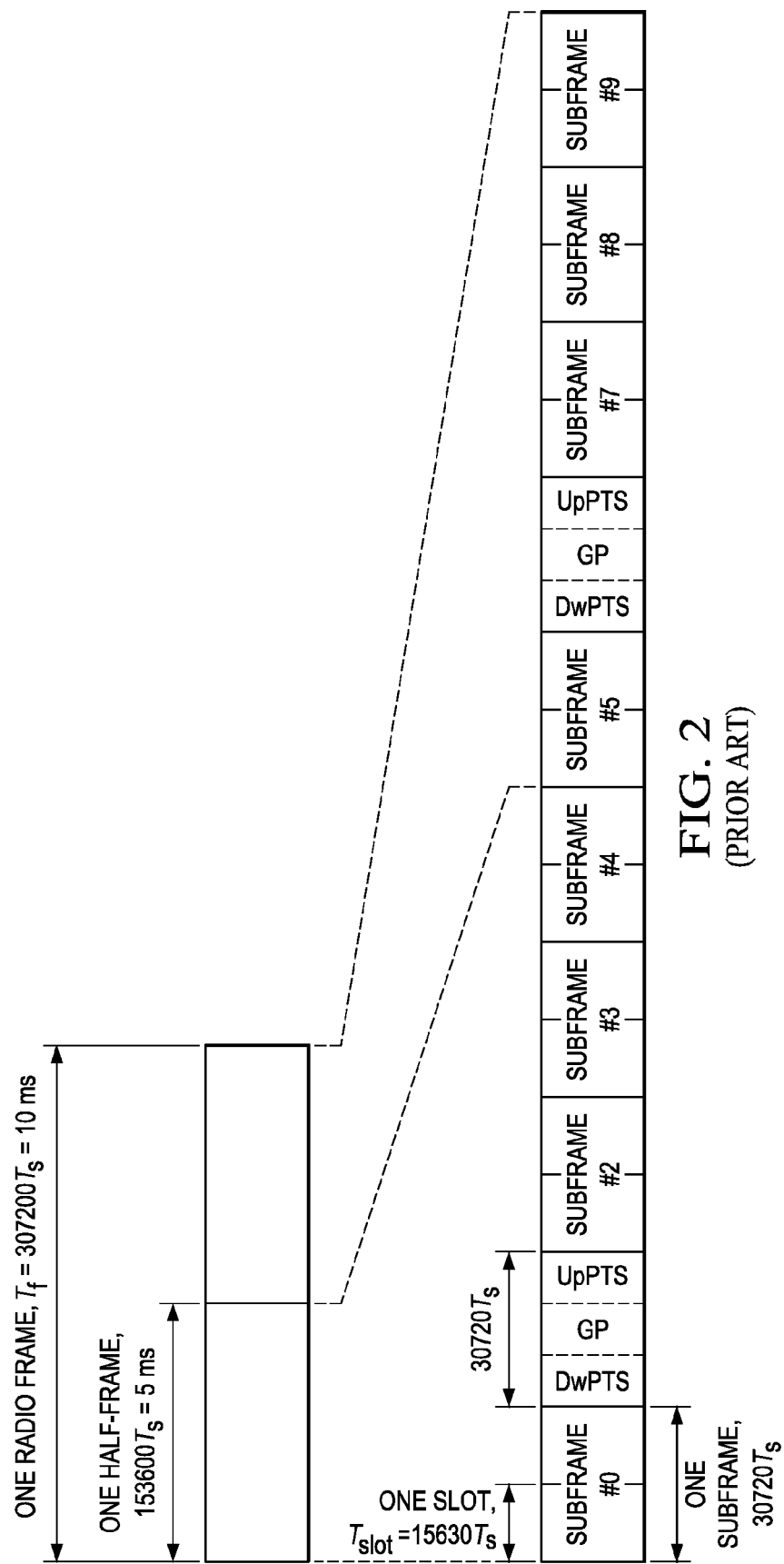
FIG. 2 shows the Evolved Universal Terrestrial Radio Access (E-UTRA) Time Division Duplex (TDD) frame structure of the prior art.
Figure 3:
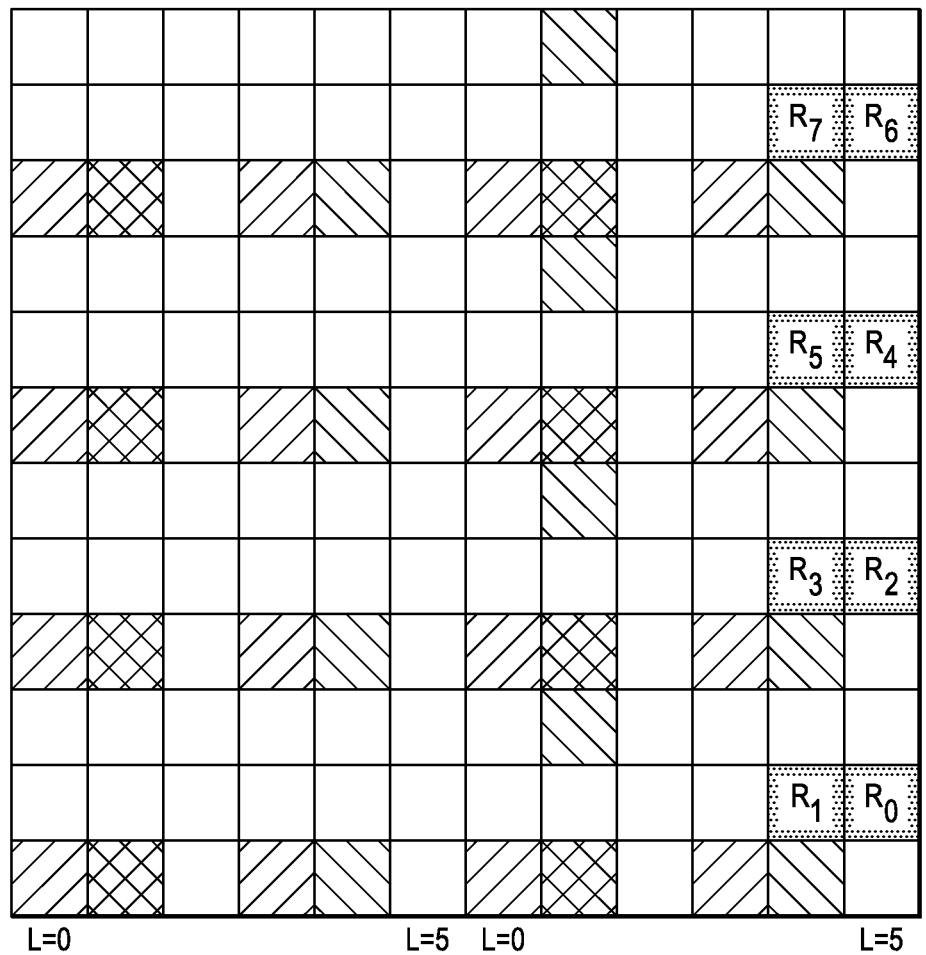
FIG. 3 illustrates a first example of an eight antenna CSI-RS pattern transmitted over a Physical Resource Block (PRB) pair extended Cyclic Prefix system using antenna ports 0, 1, 2 and 3 (resp. antenna port 5) for transmission of cell-specific RS (resp. UE-specific RS)
Figure 3:
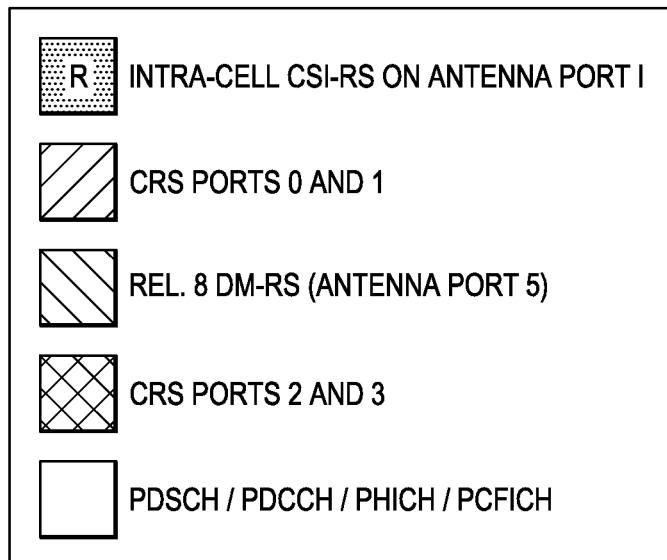
Figure 4:
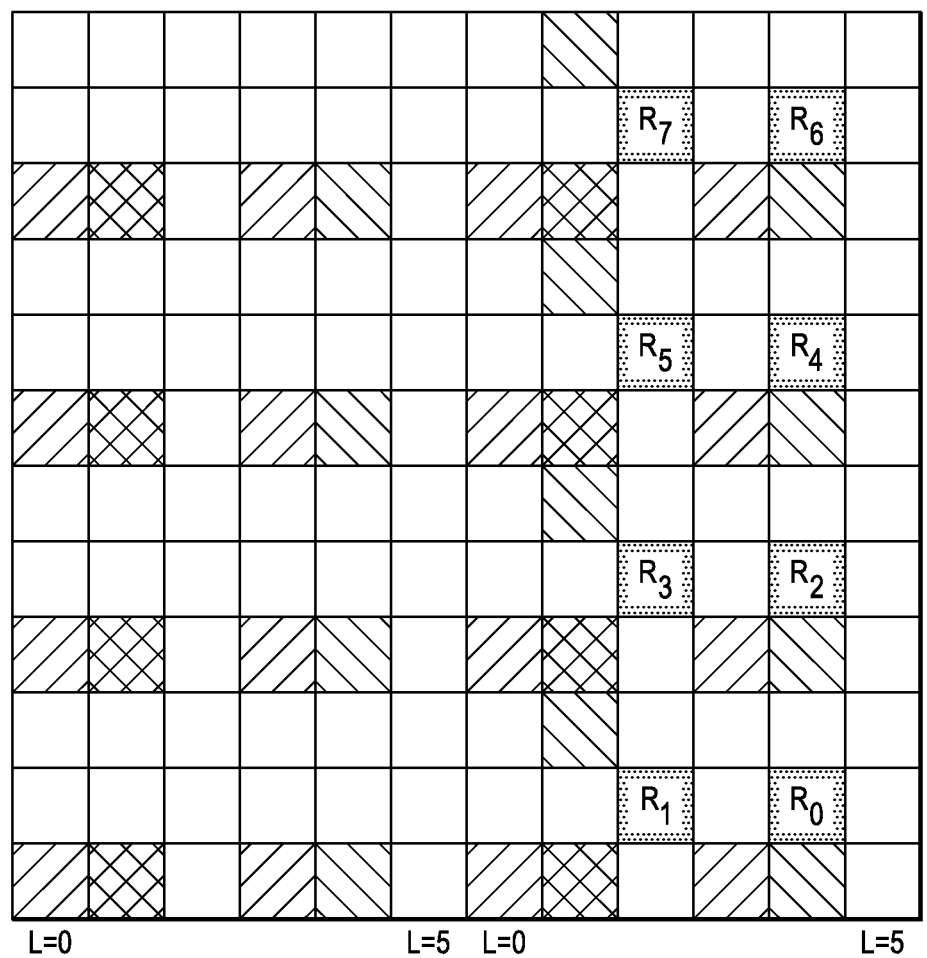
FIG. 4 illustrates a second example of an eight antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 4:
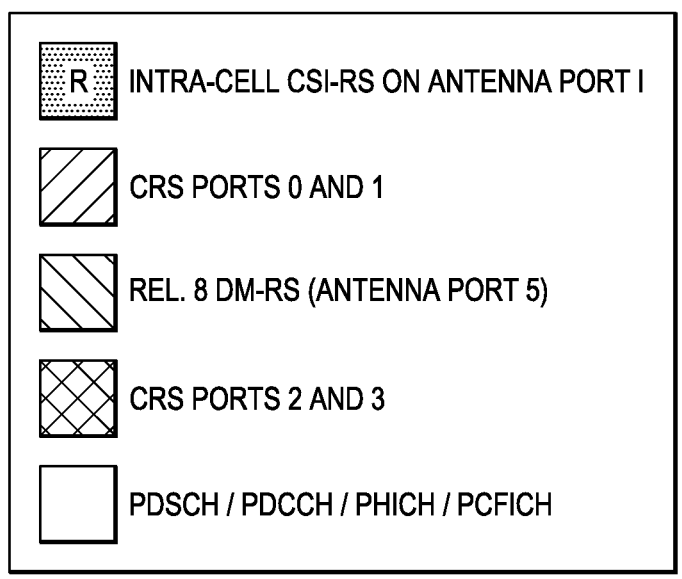
Figure 5:
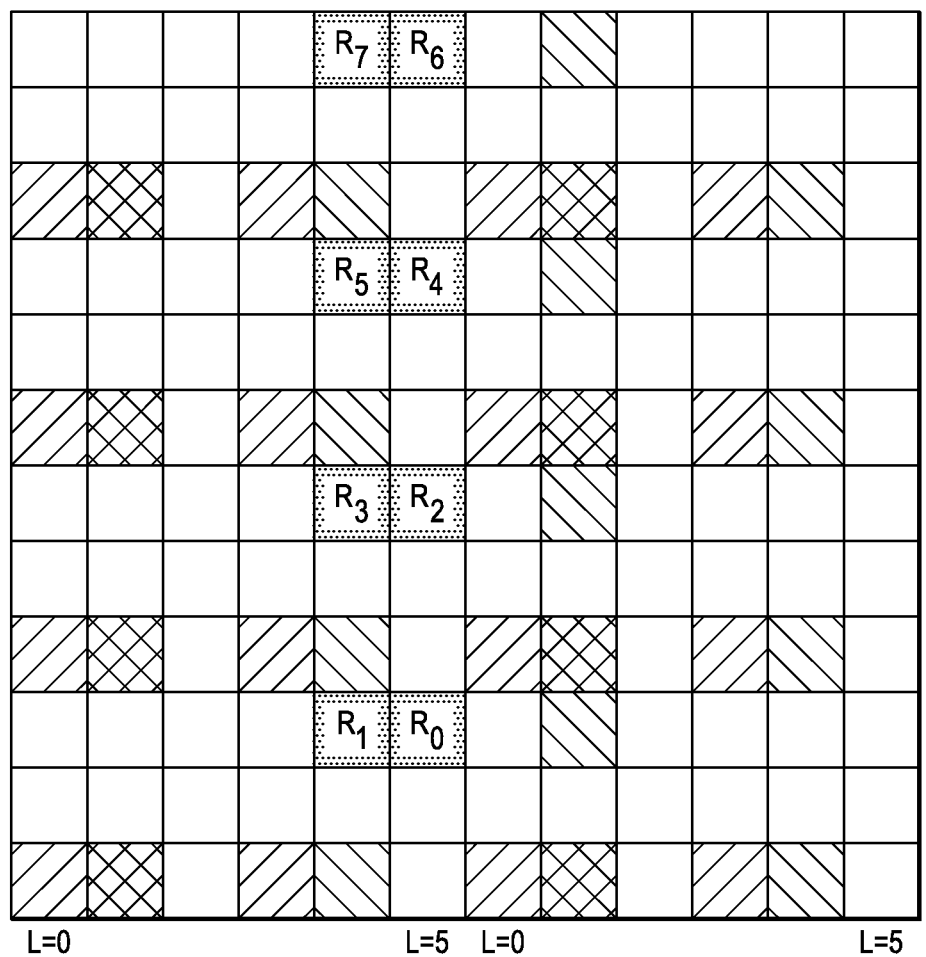
FIG. 5 illustrates a third example of an eight antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 5:
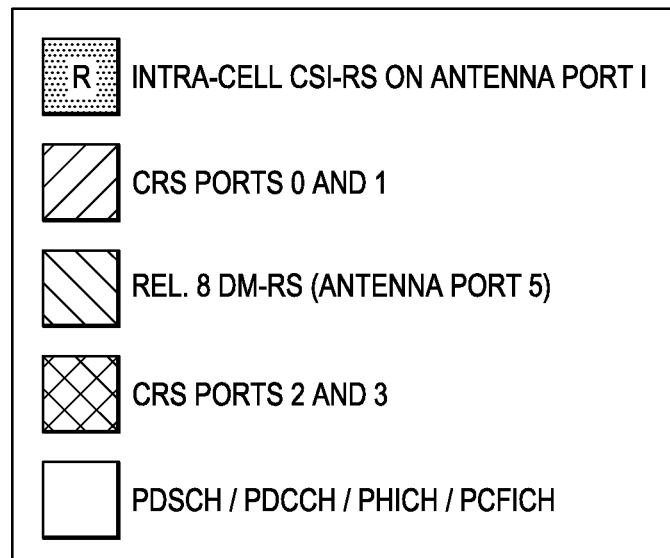
Figure 6:
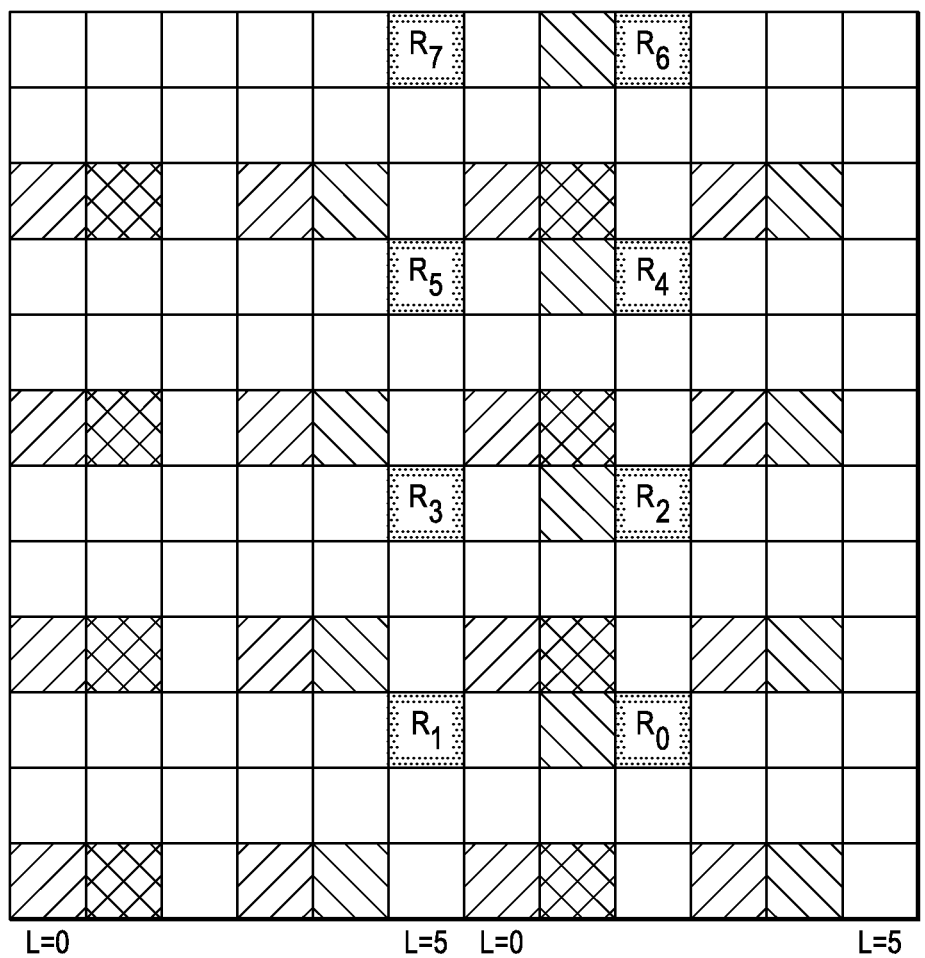
FIG. 6 illustrates a fourth example of an eight antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 6:
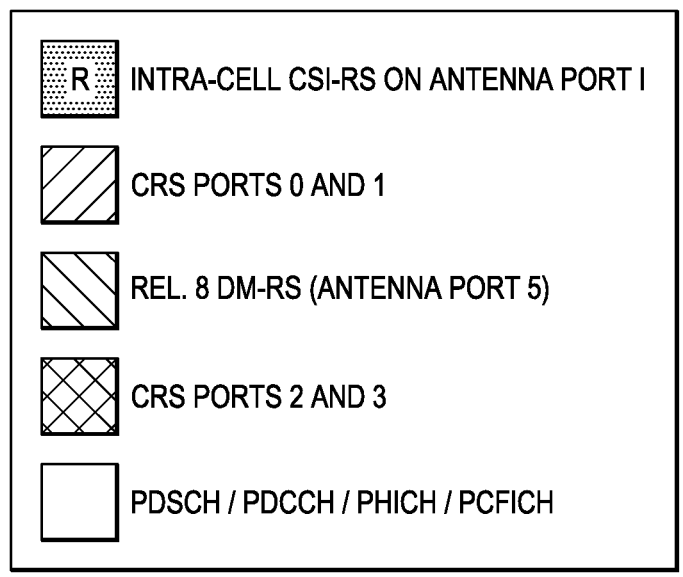
Figure 7:
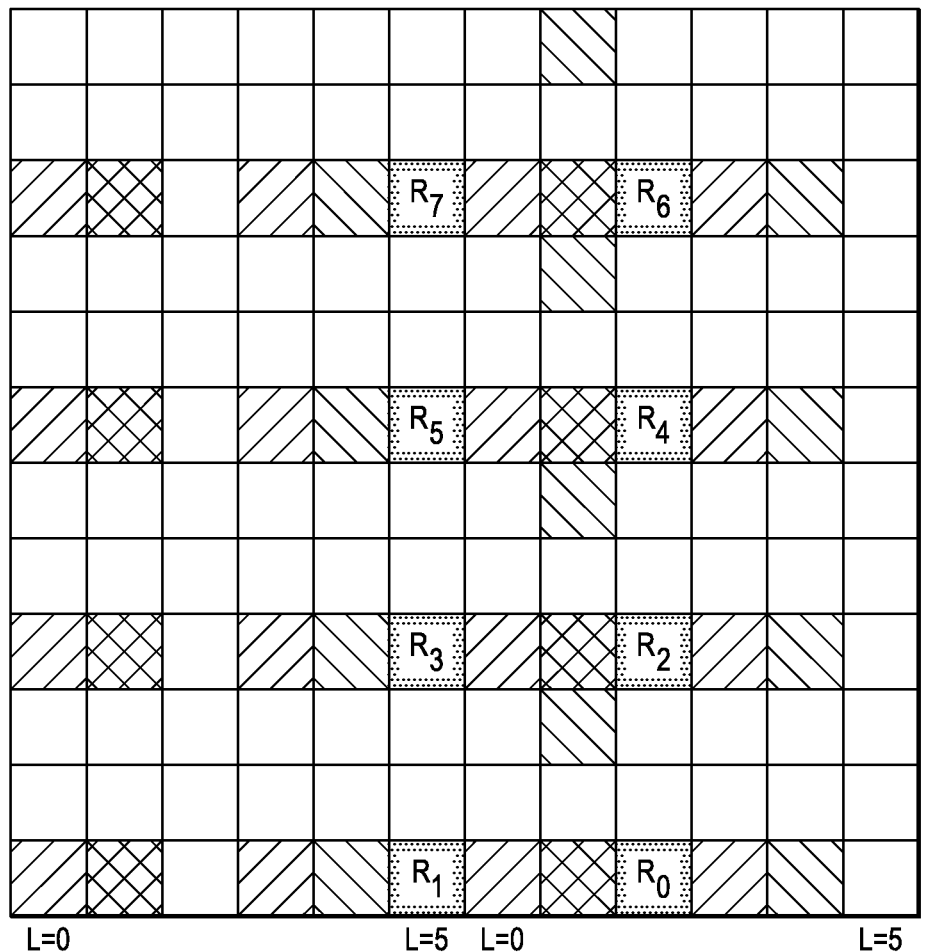
FIG. 7 illustrates a fifth example of an eight antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 7:
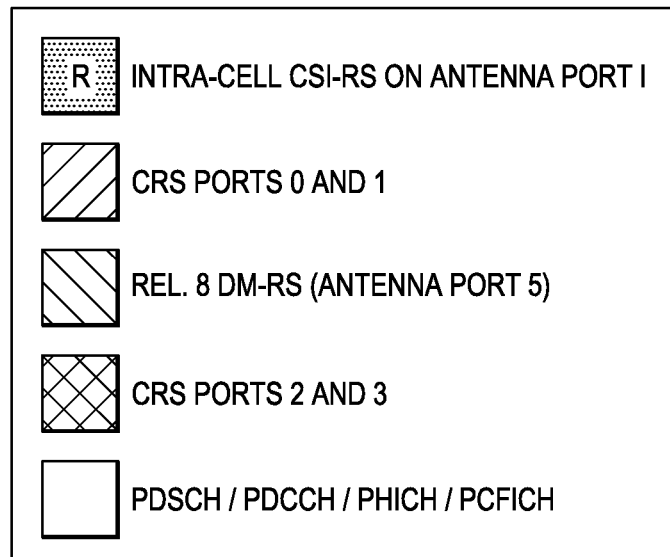
Figure 8:
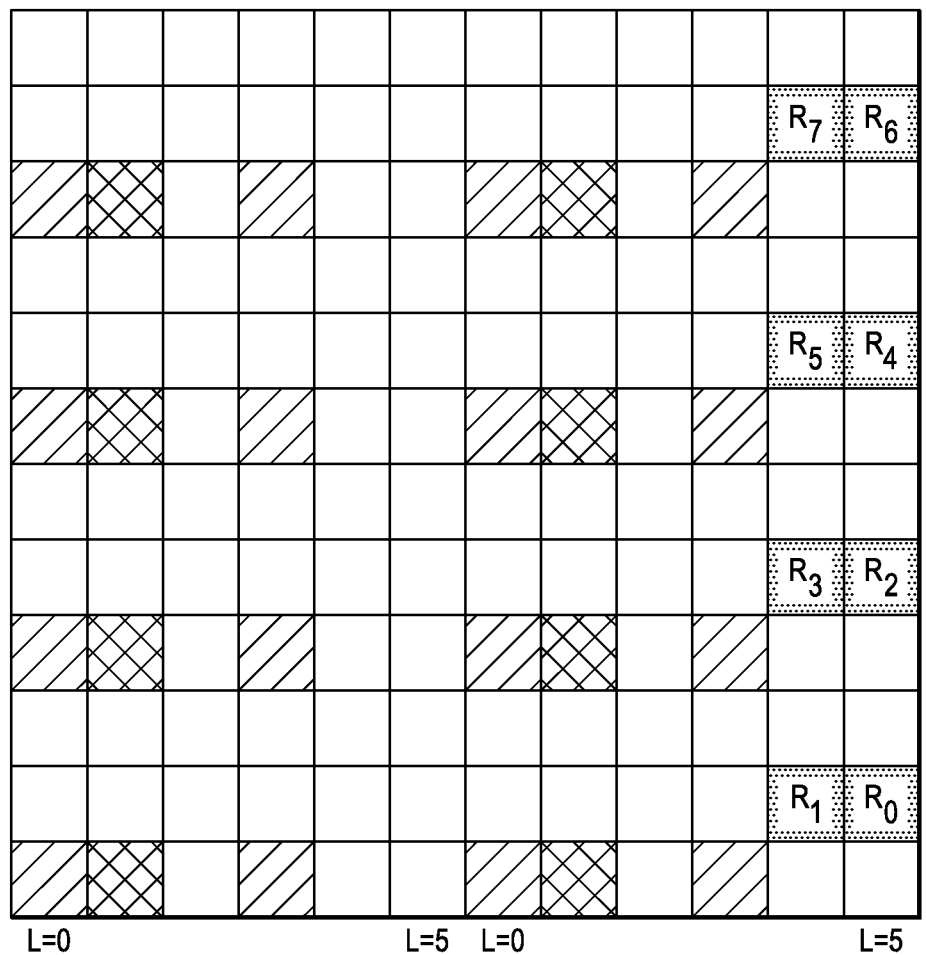
FIG. 8 illustrates a first example of an eight antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 8:
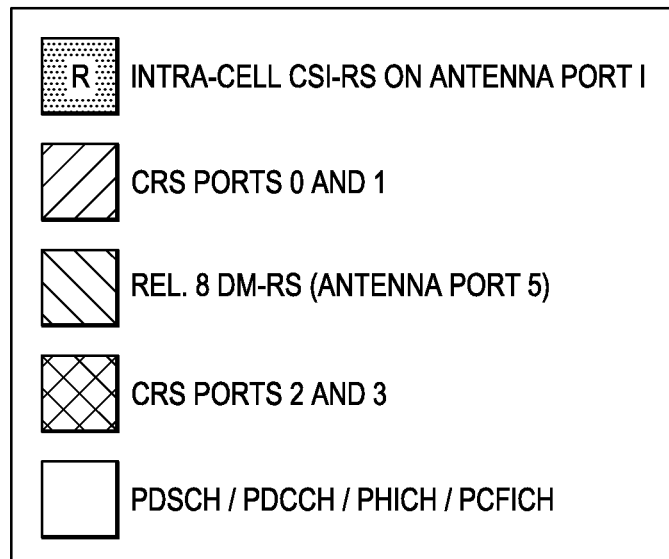
Figure 9:
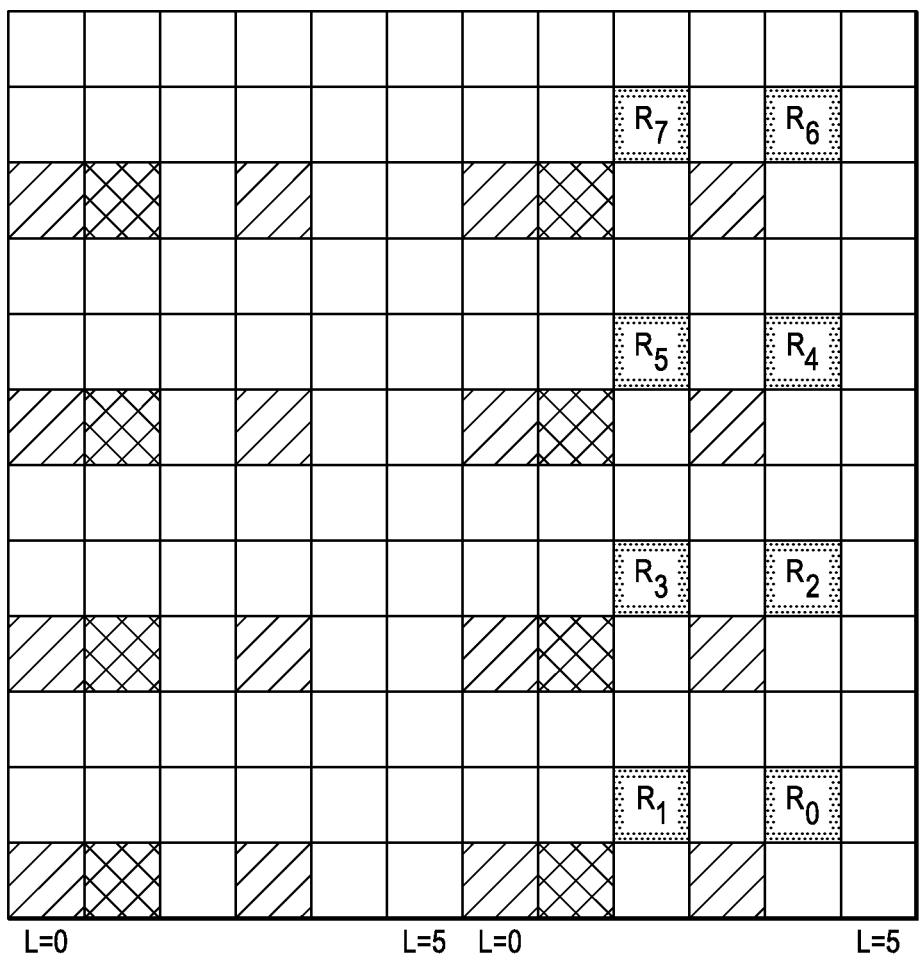
FIG. 9 illustrates a second example of an eight antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 9:
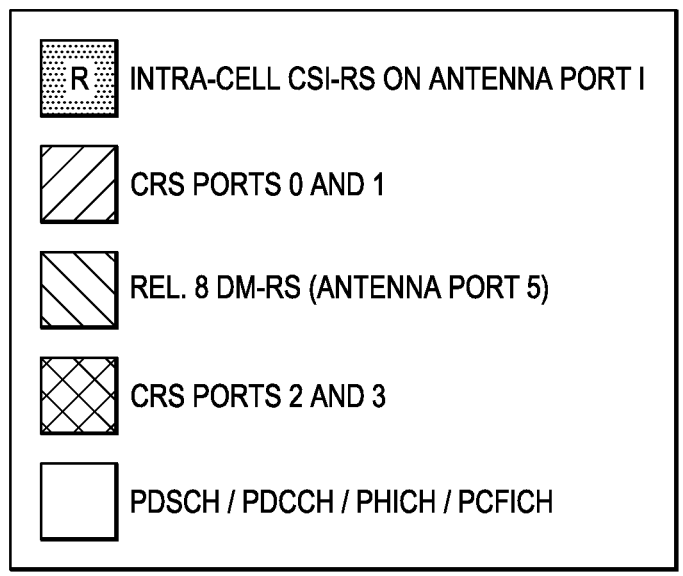
Figure 10:
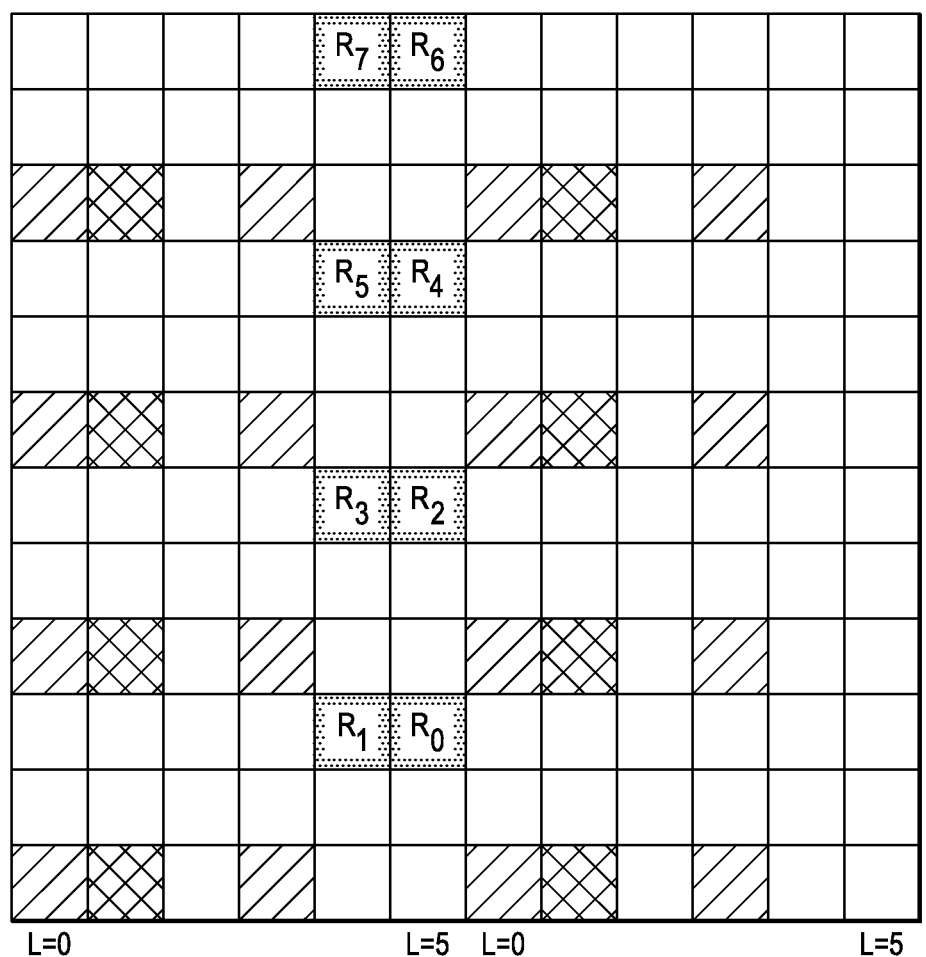
FIG. 10 illustrates a third example of an eight antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 10:
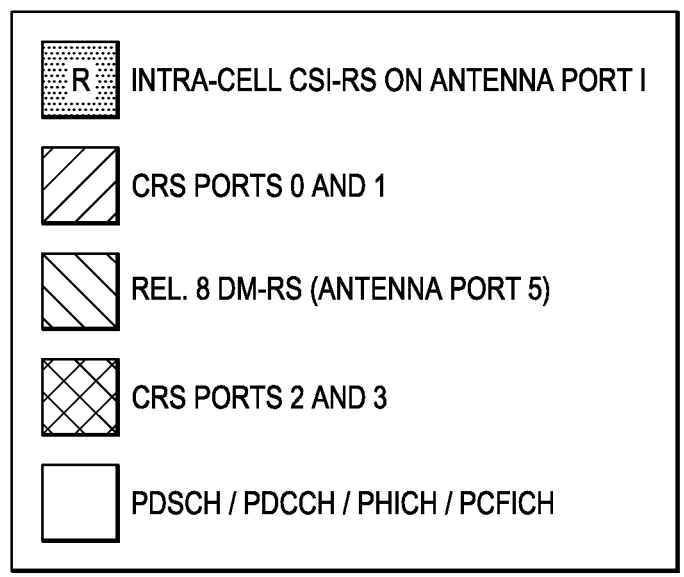
Figure 11:
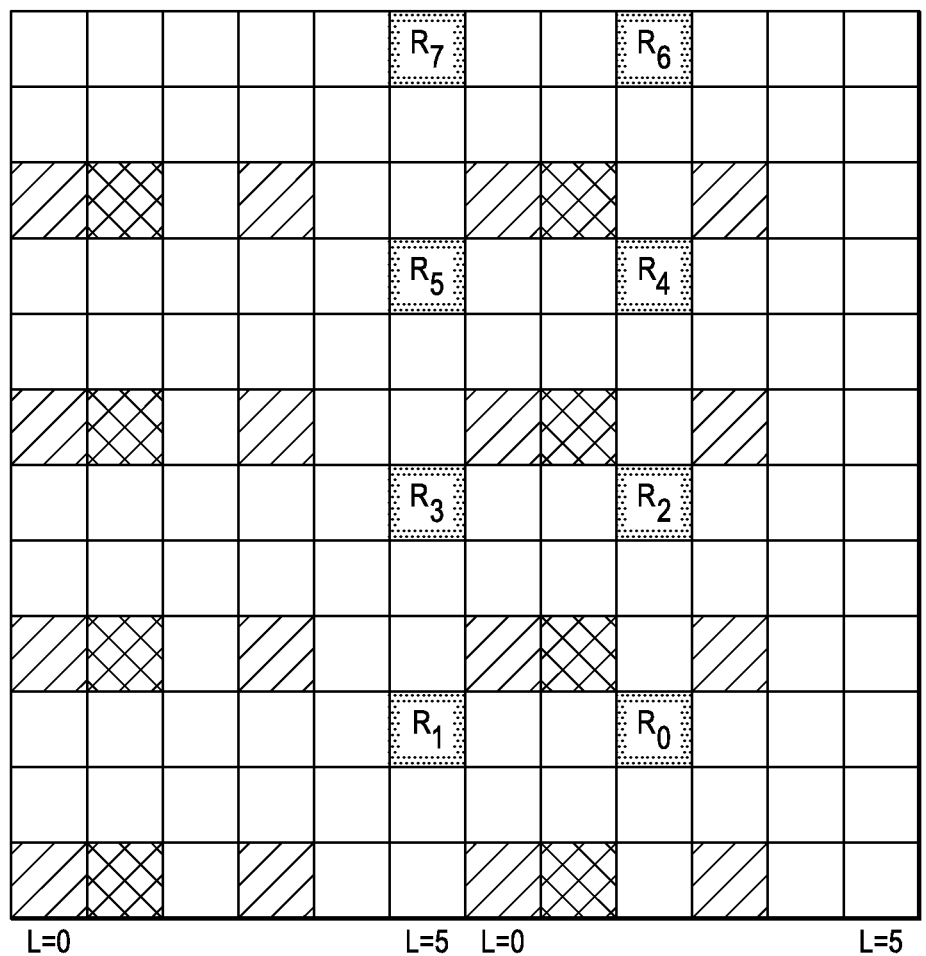
FIG. 11 illustrates a fourth example of an eight antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 11:
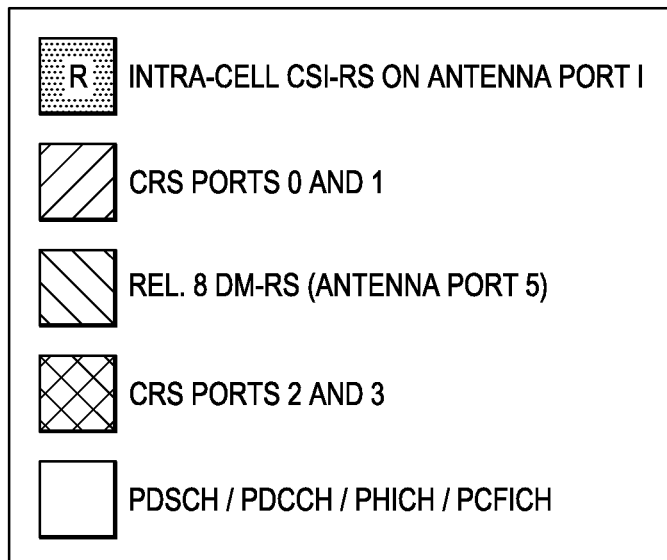
Figure 12:
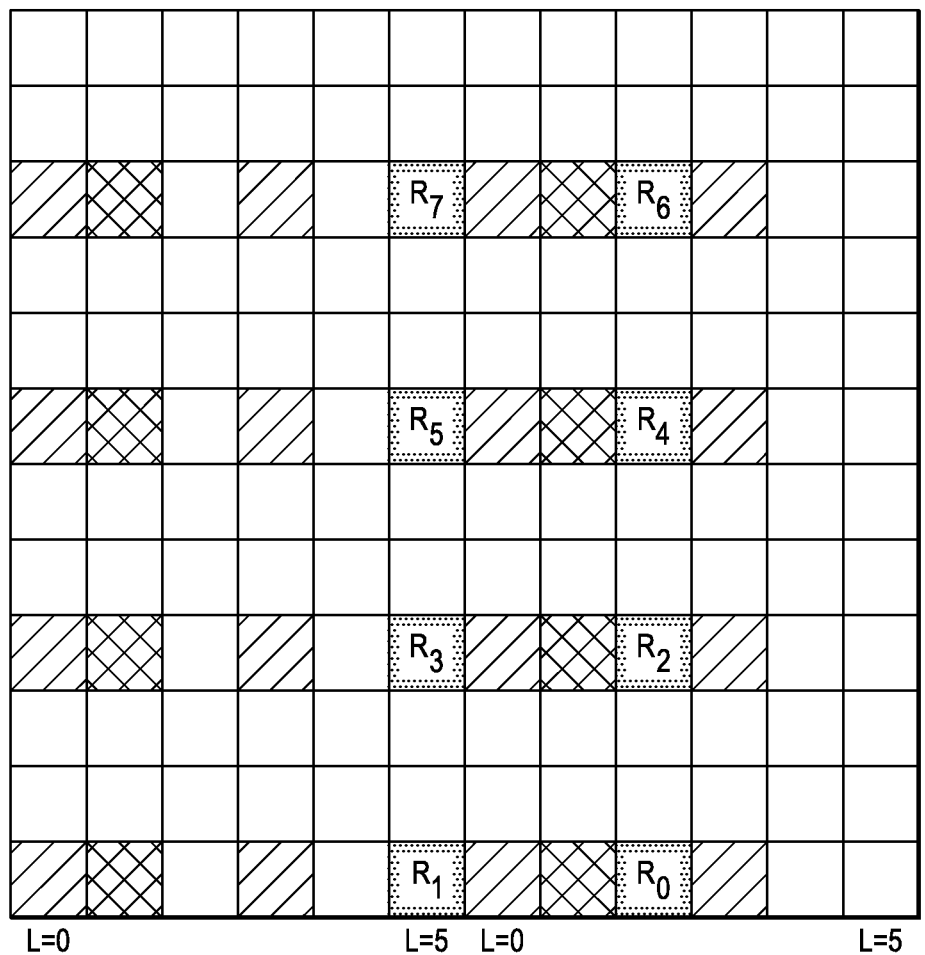
FIG. 12 illustrates a fifth example of an eight antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 12:
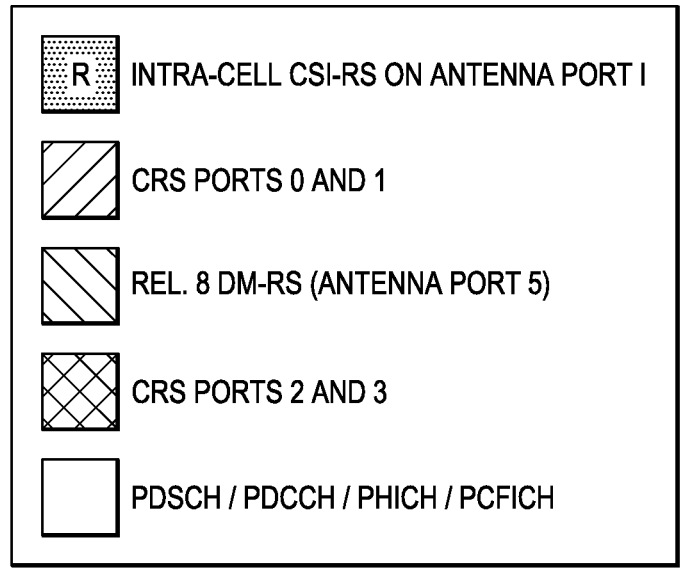
Figure 13:
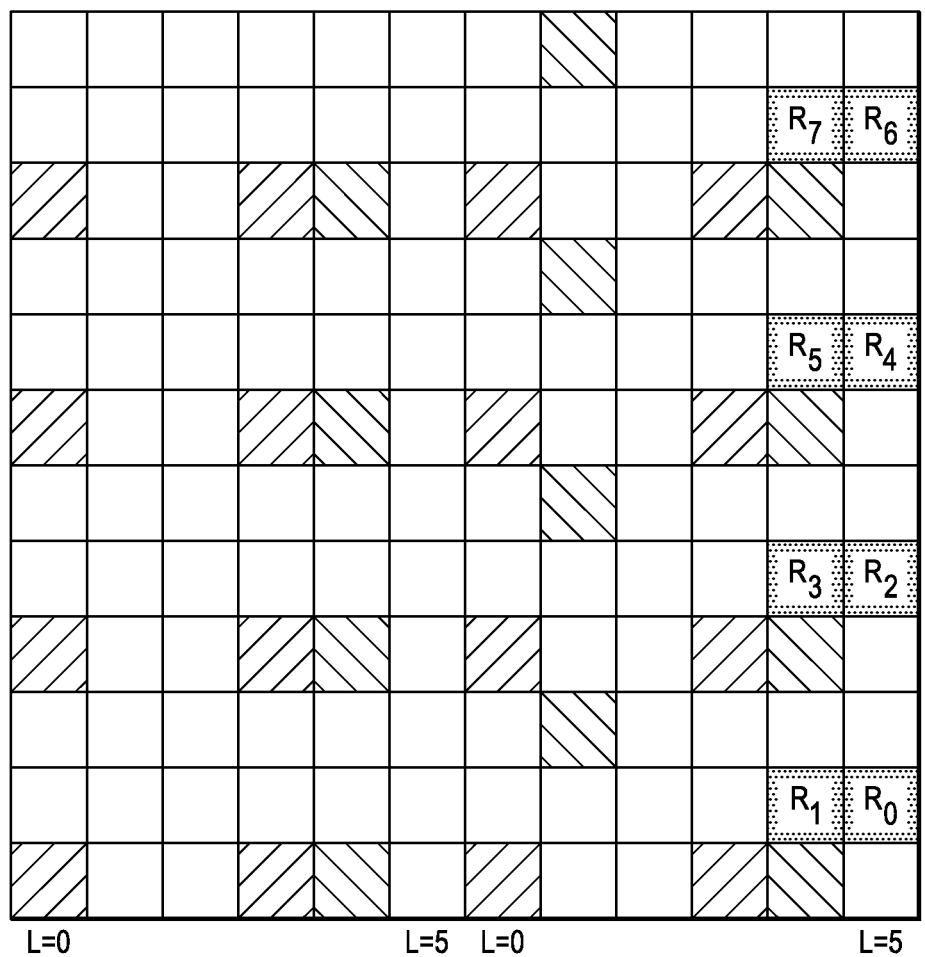
FIG. 13 illustrates a first example of an eight antenna CSI-RS pattern transmitted over a Physical Resource Block (PRB) pair extended Cyclic Prefix system not using antenna ports 2 and 3 for transmitting cell-specific RS.
Figure 13:
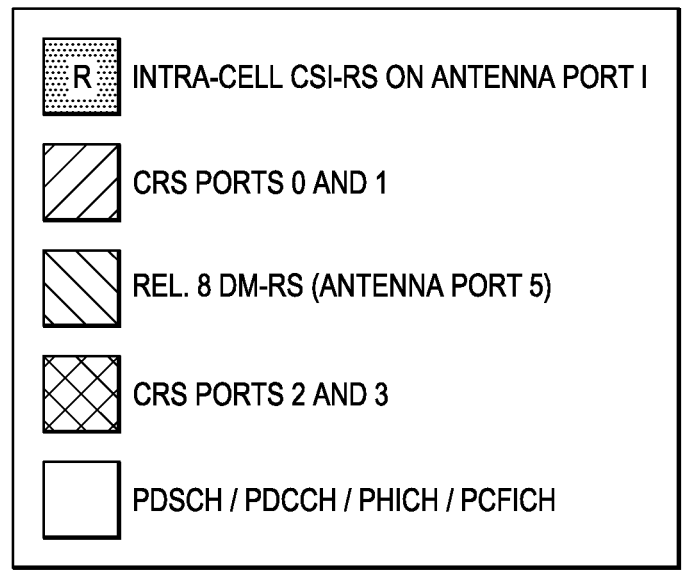
Figure 14:
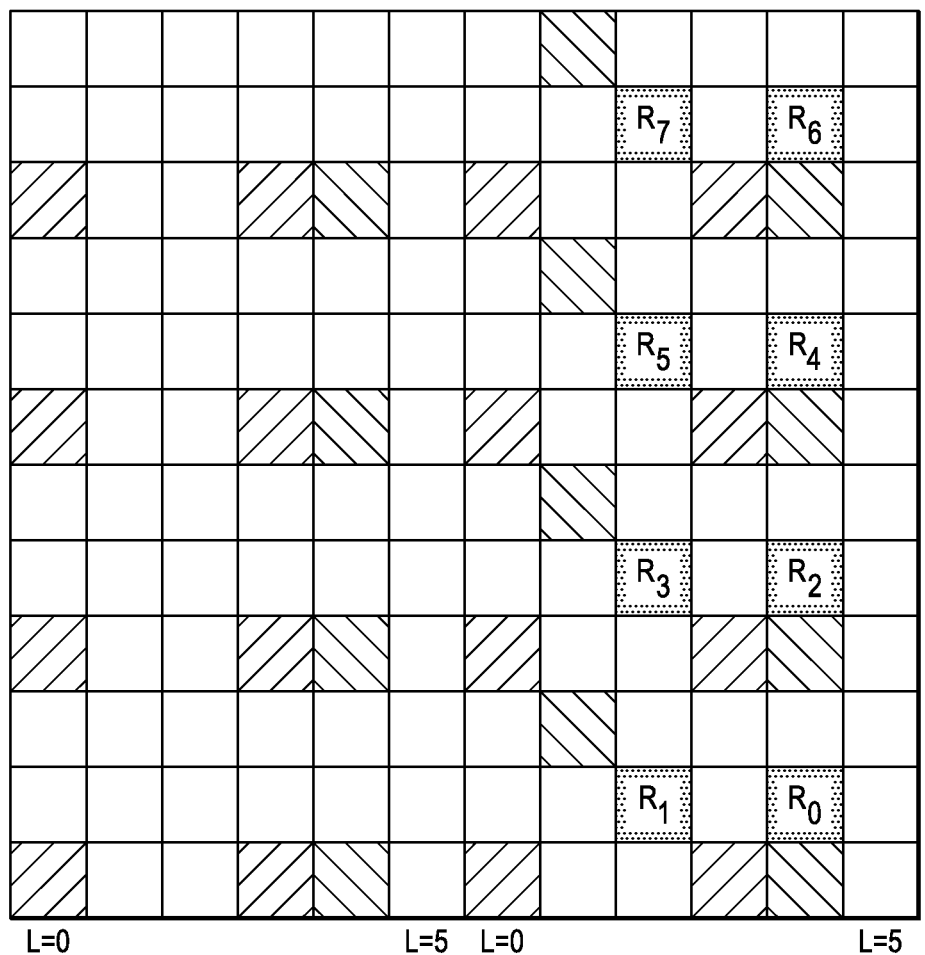
FIG. 14 illustrates a second example of an eight antenna CSI-RS pattern transmitted over a Physical Resource Block (PRB) pair extended Cyclic Prefix system not using antenna ports 2 and 3 for transmitting cell-specific RS.
Figure 14:
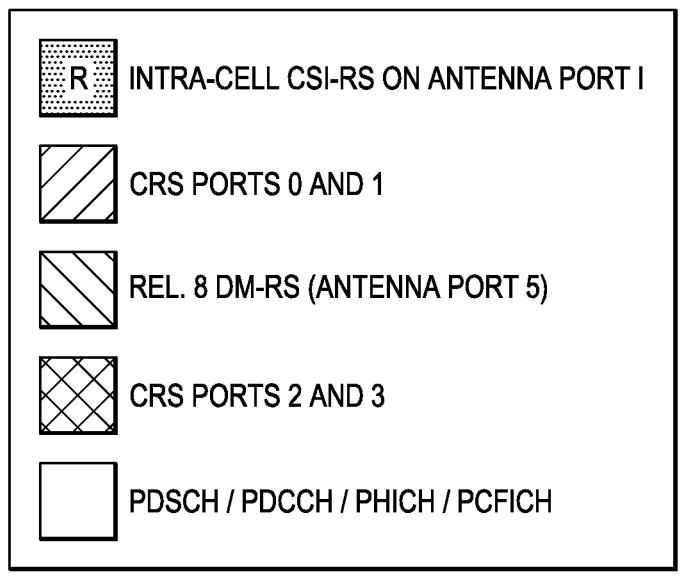
Figure 15:
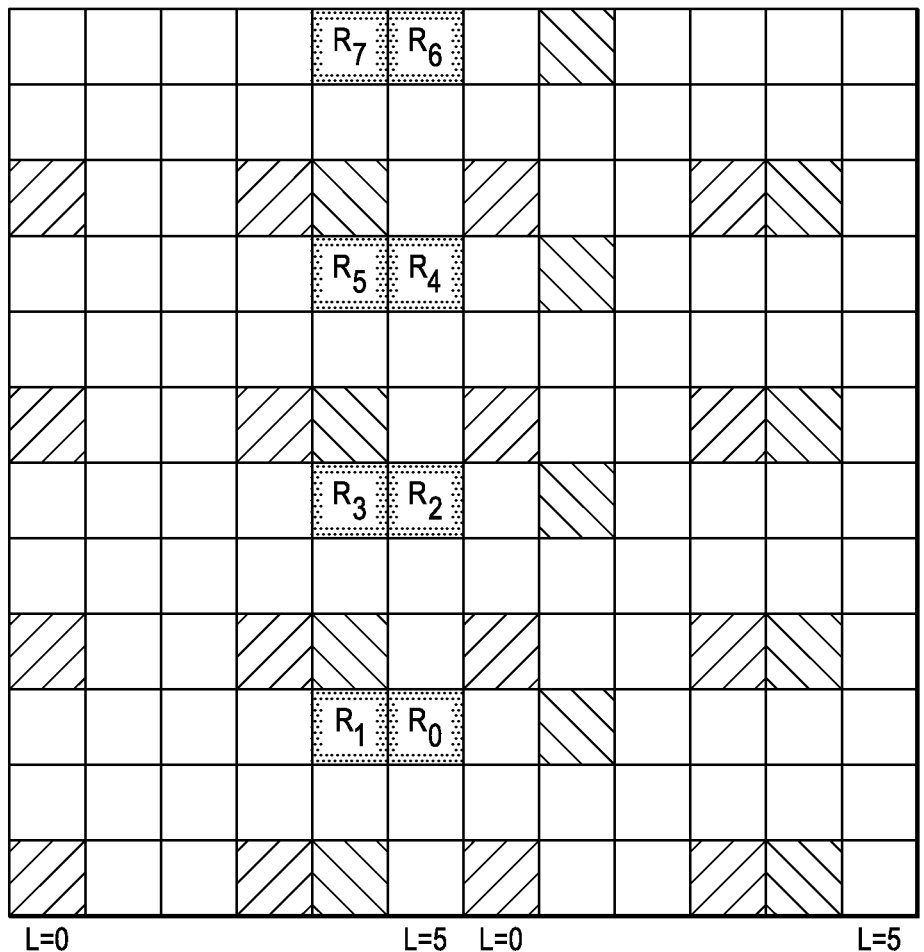
FIG. 15 illustrates a third example of an eight antenna CSI-RS pattern transmitted over a Physical Resource Block (PRB) pair extended Cyclic Prefix system not using antenna ports 2 and 3 for transmitting cell-specific RS.
Figure 15:
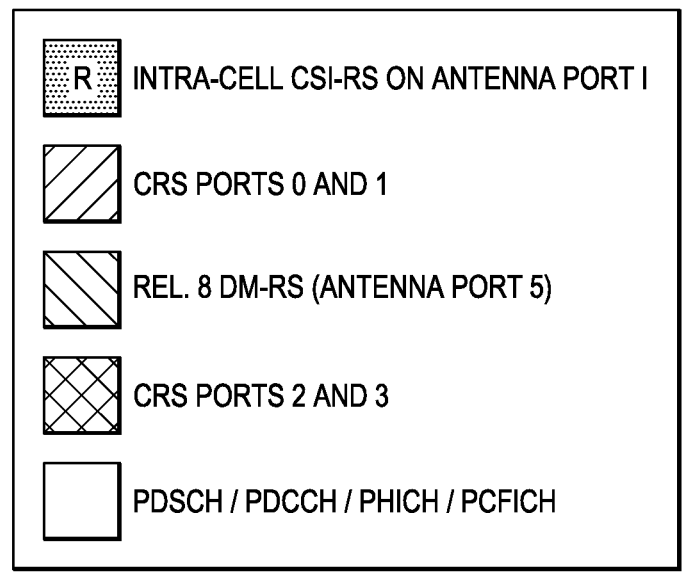
Figure 16:
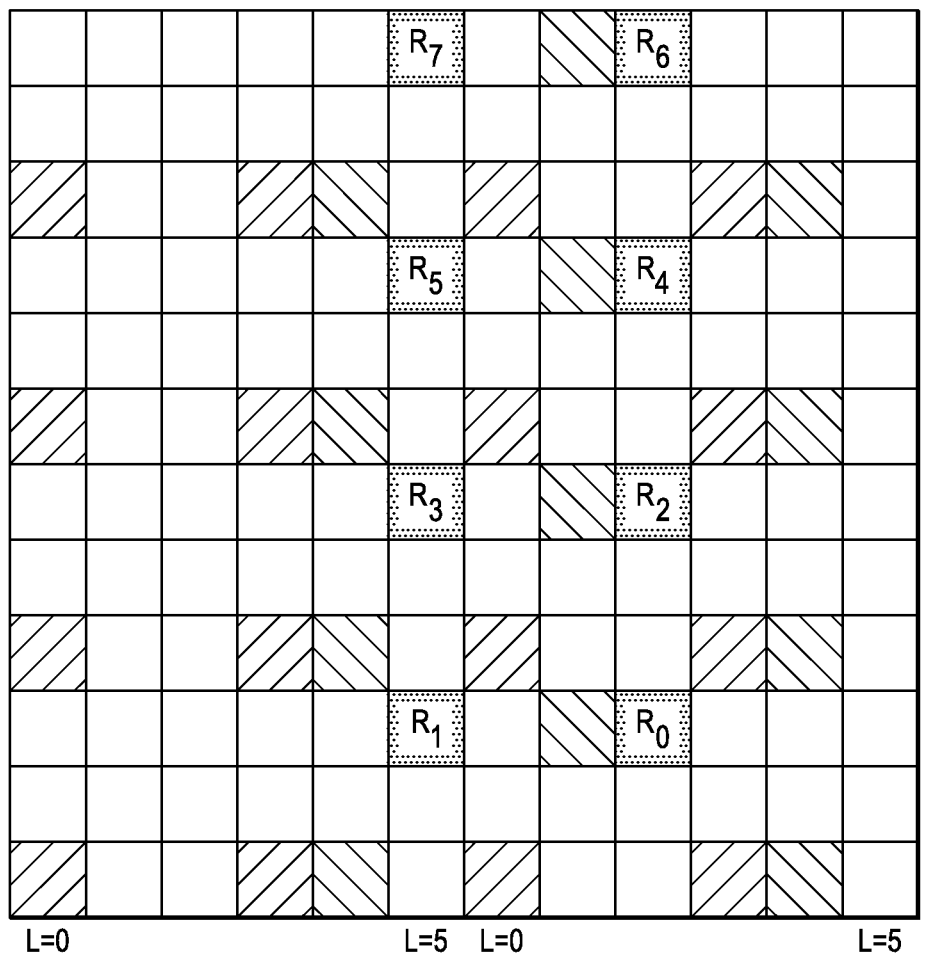
FIG. 16 illustrates a fourth example of an eight antenna CSI-RS pattern transmitted over a Physical Resource Block (PRB) pair extended Cyclic Prefix system not using antenna ports 2 and 3 for transmitting cell-specific RS.
Figure 16:
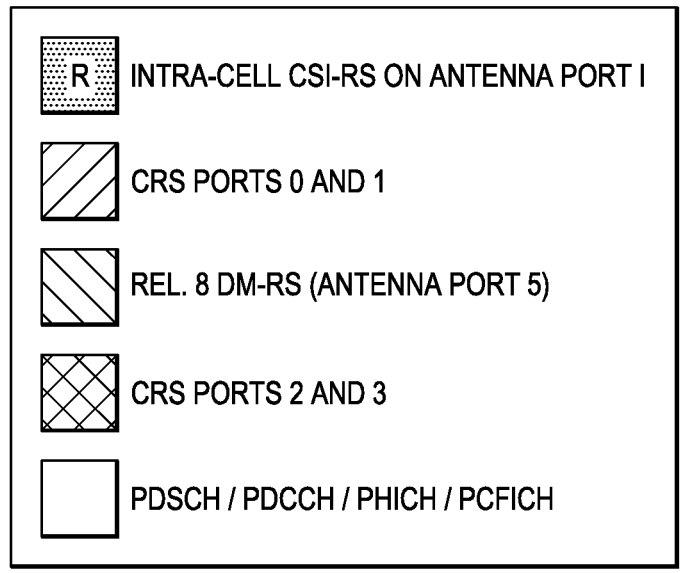
Figure 17:
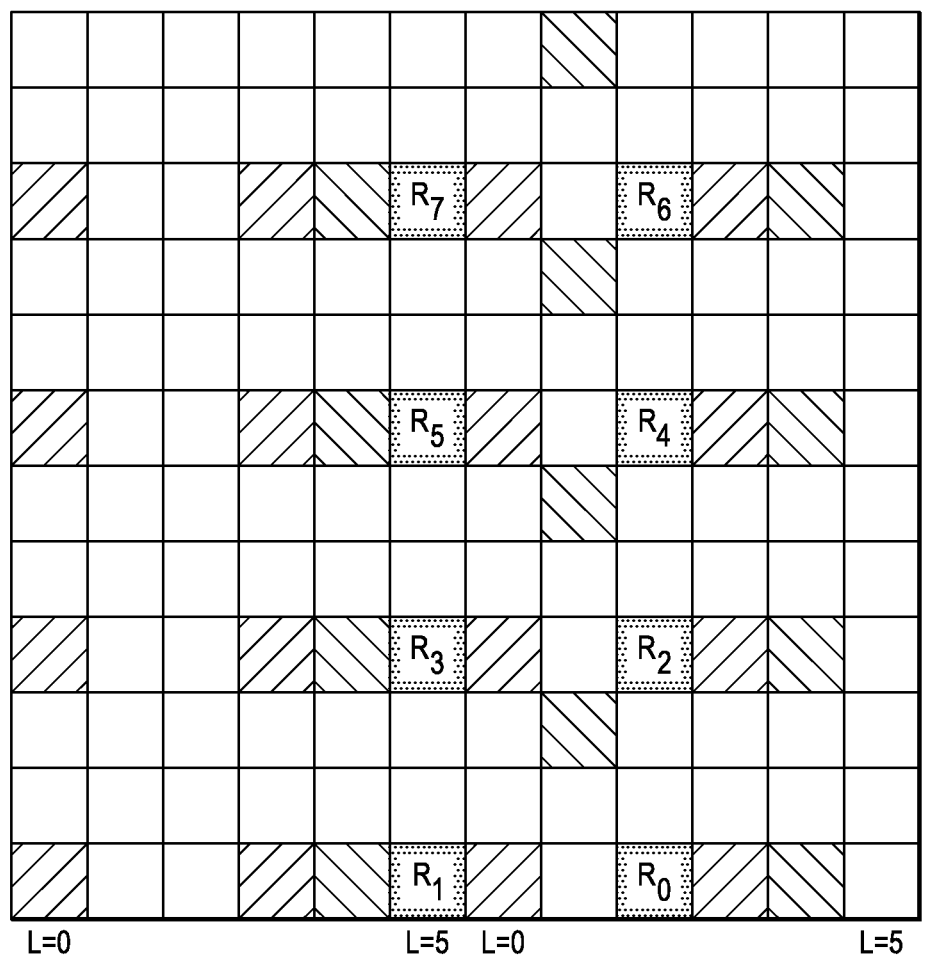
FIG. 17 illustrates a fifth example of an eight antenna CSI-RS pattern transmitted over a Physical Resource Block (PRB) pair extended Cyclic Prefix system not using antenna ports 2 and 3 for transmitting cell-specific RS.
Figure 17:
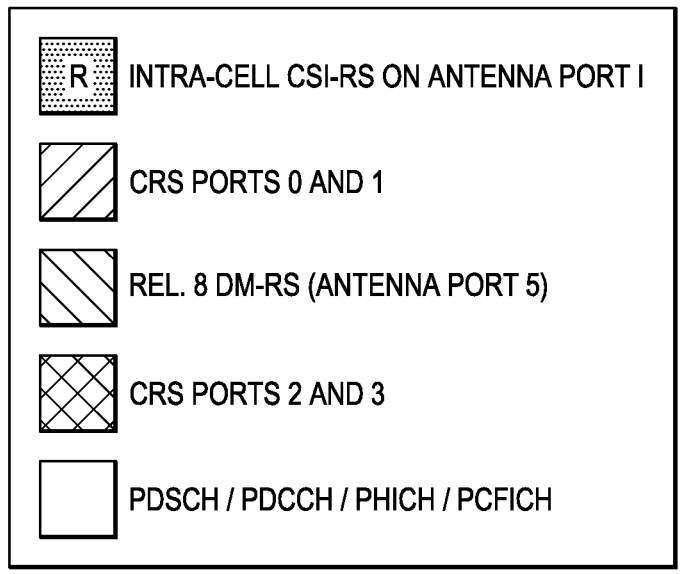
Figure 18:
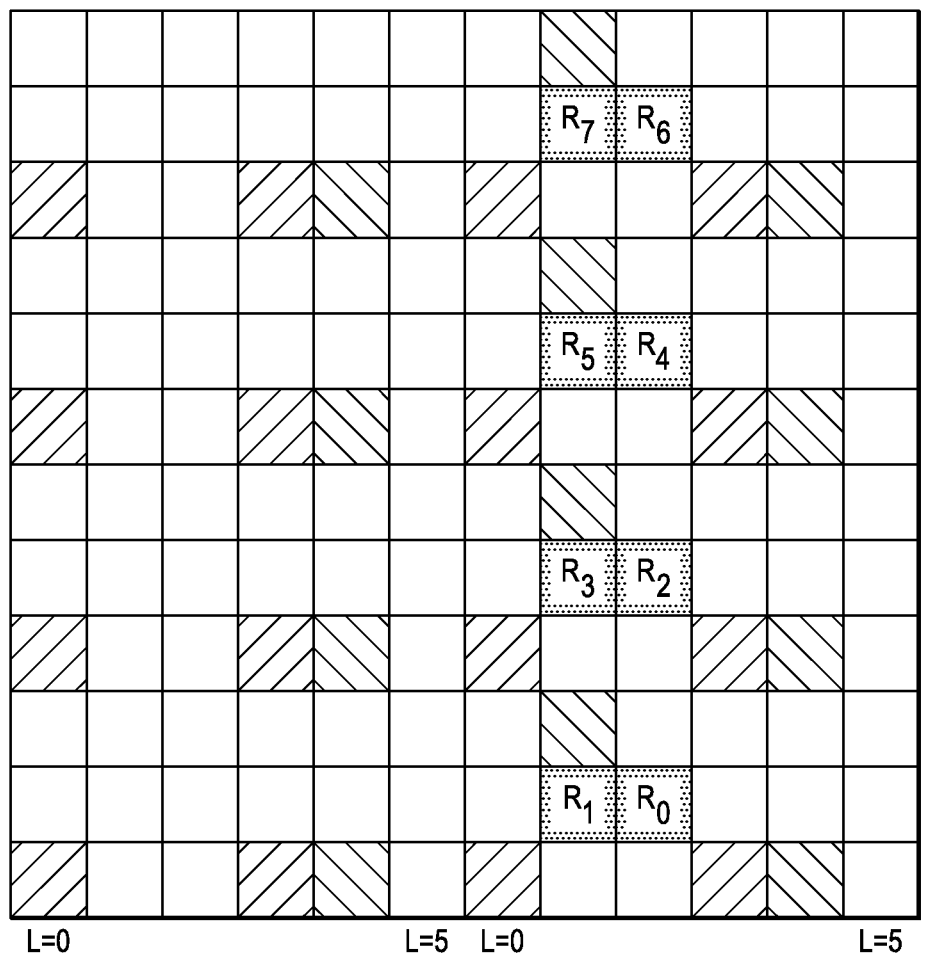
FIG. 18 illustrates a sixth example of an eight antenna CSI-RS pattern transmitted over a Physical Resource Block (PRB) pair extended Cyclic Prefix system not using antenna ports 2 and 3 for transmitting cell-specific RS.
Figure 18:
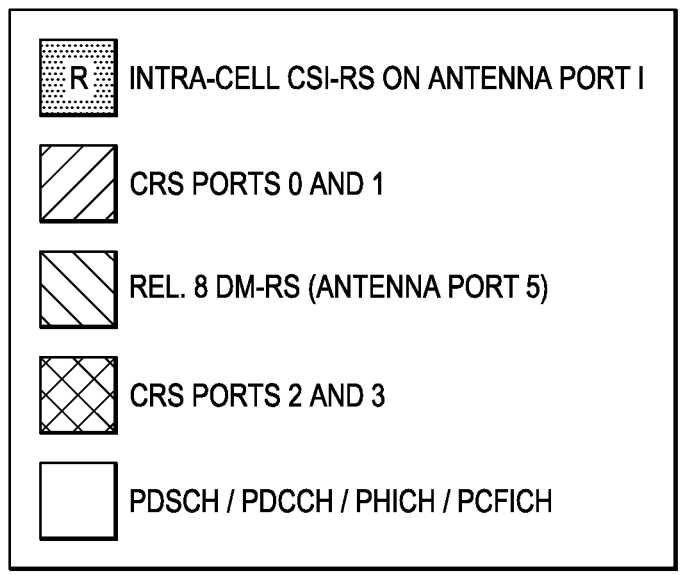
Figure 19:
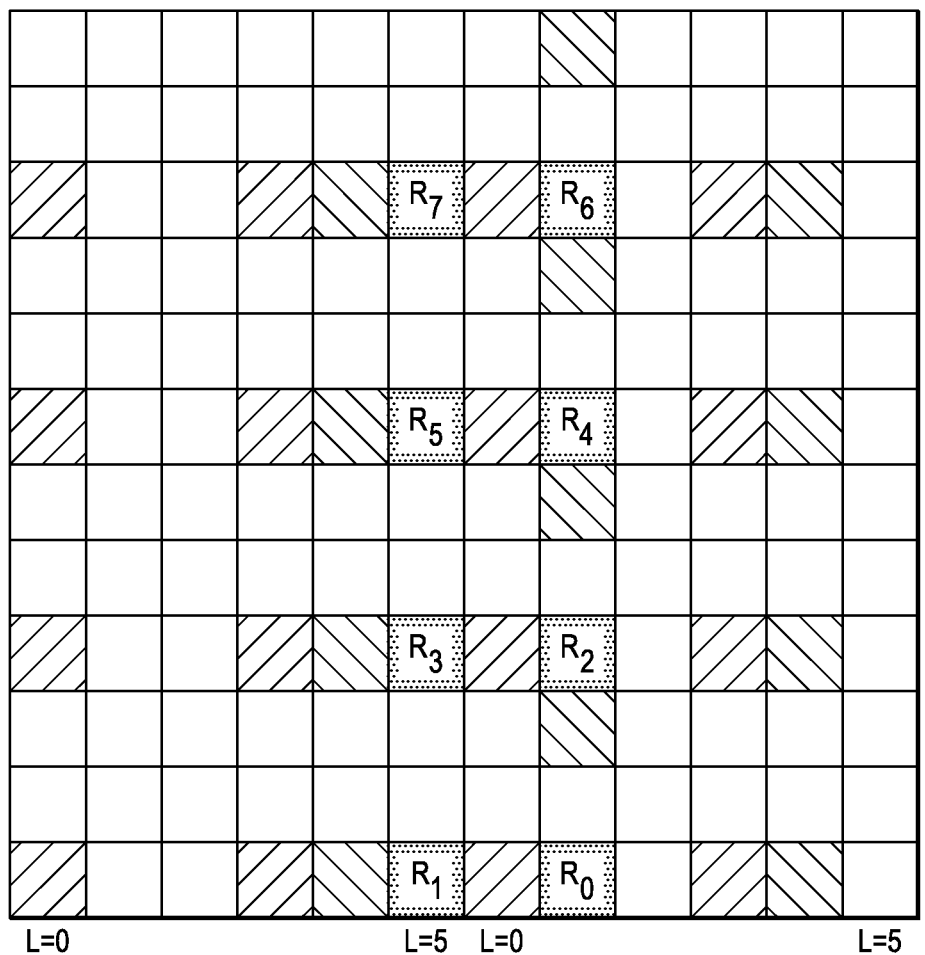
FIG. 19 illustrates a seventh example of an eight antenna CSI-RS pattern transmitted over a Physical Resource Block (PRB) pair extended Cyclic Prefix system not using antenna ports 2 and 3 for transmitting cell-specific RS.
Figure 19:
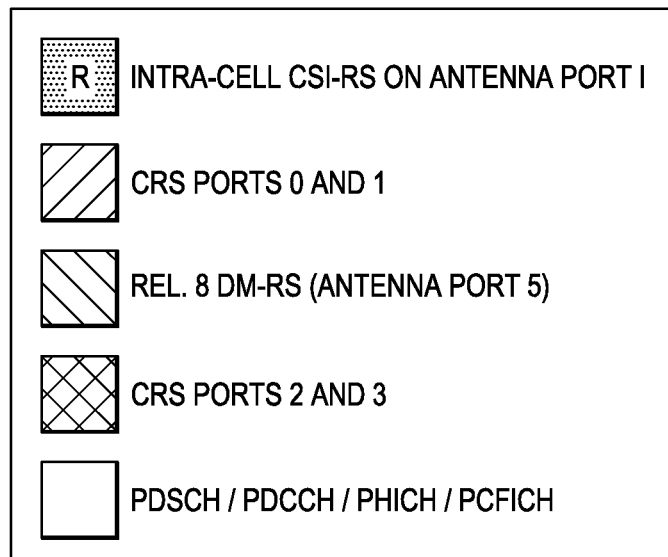
Figure 20:
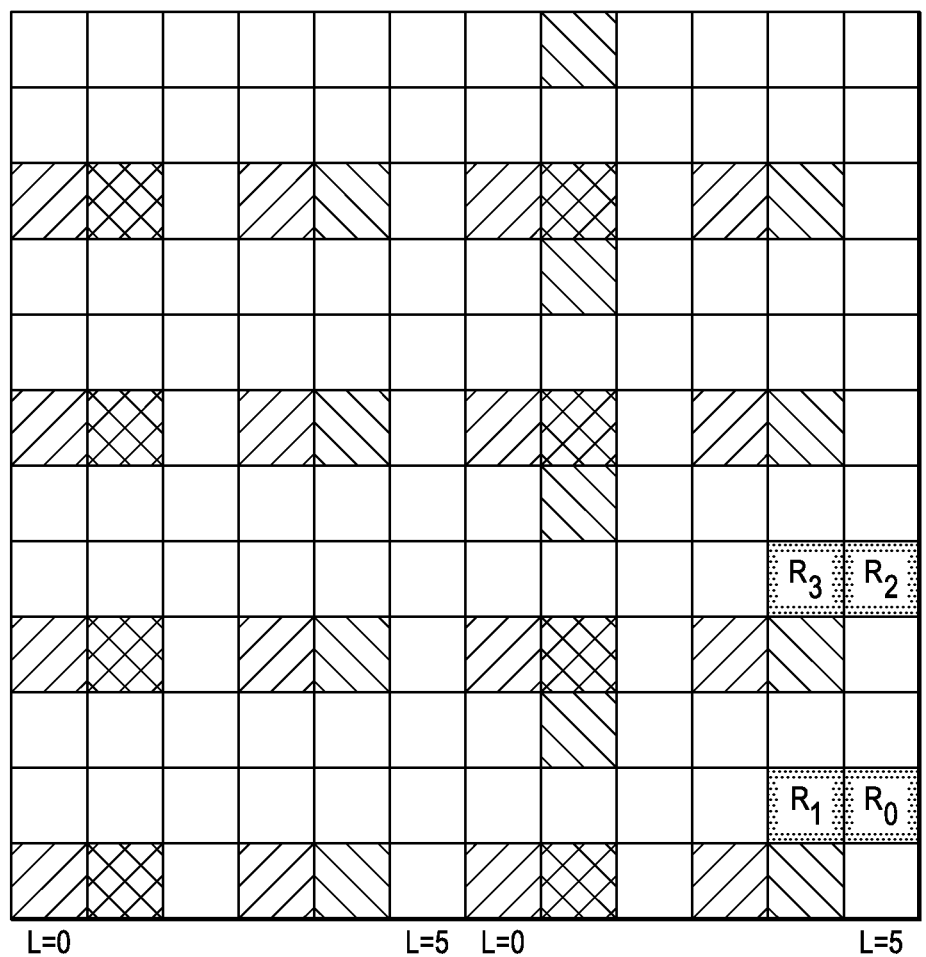
FIG. 20 illustrates a first example of a four antenna CSI-RS pattern transmitted over a Physical Resource Block (PRB) pair extended Cyclic Prefix system using antenna ports 0, 1, 2 and 3 (resp. antenna port 5) for transmission of cell-specific RS (resp. UE-specific RS)
Figure 20:
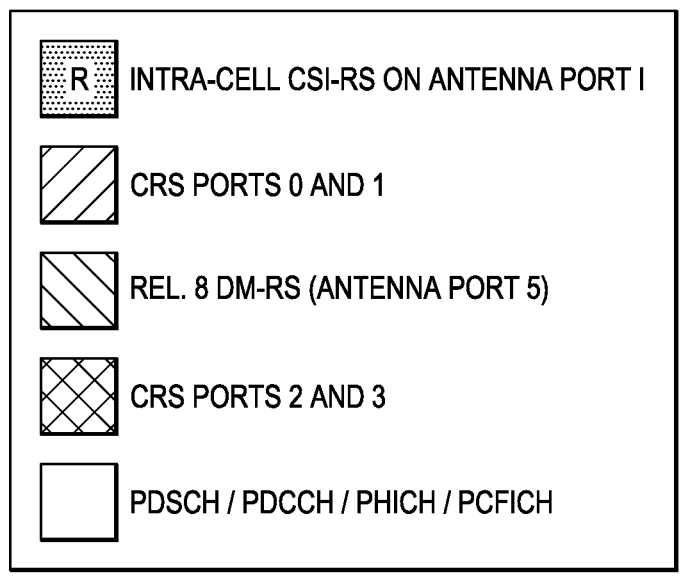
Figure 21:
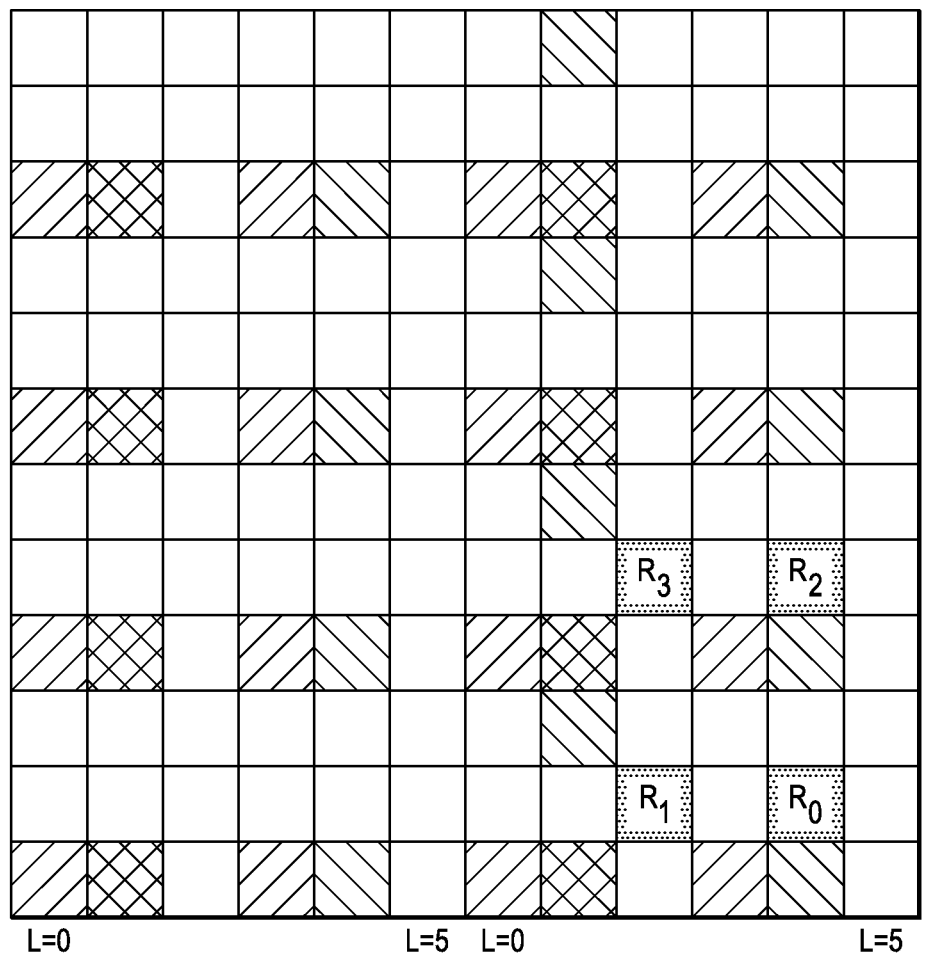
FIG. 21 illustrates a second example of a four antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 21:
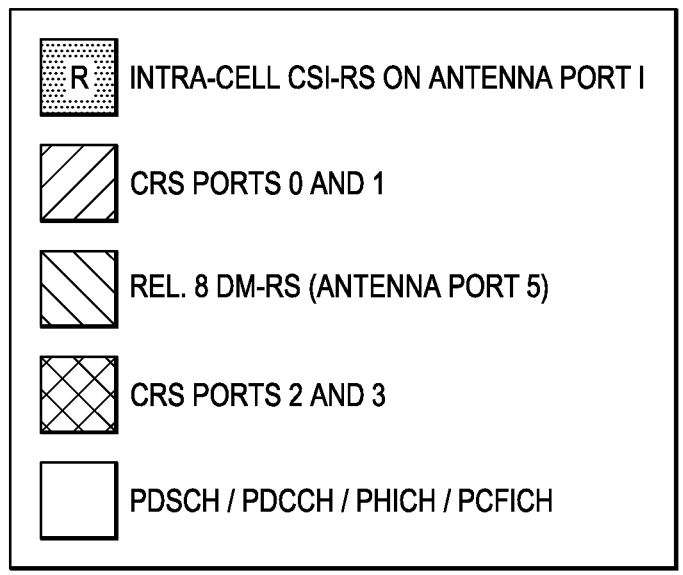
Figure 22:
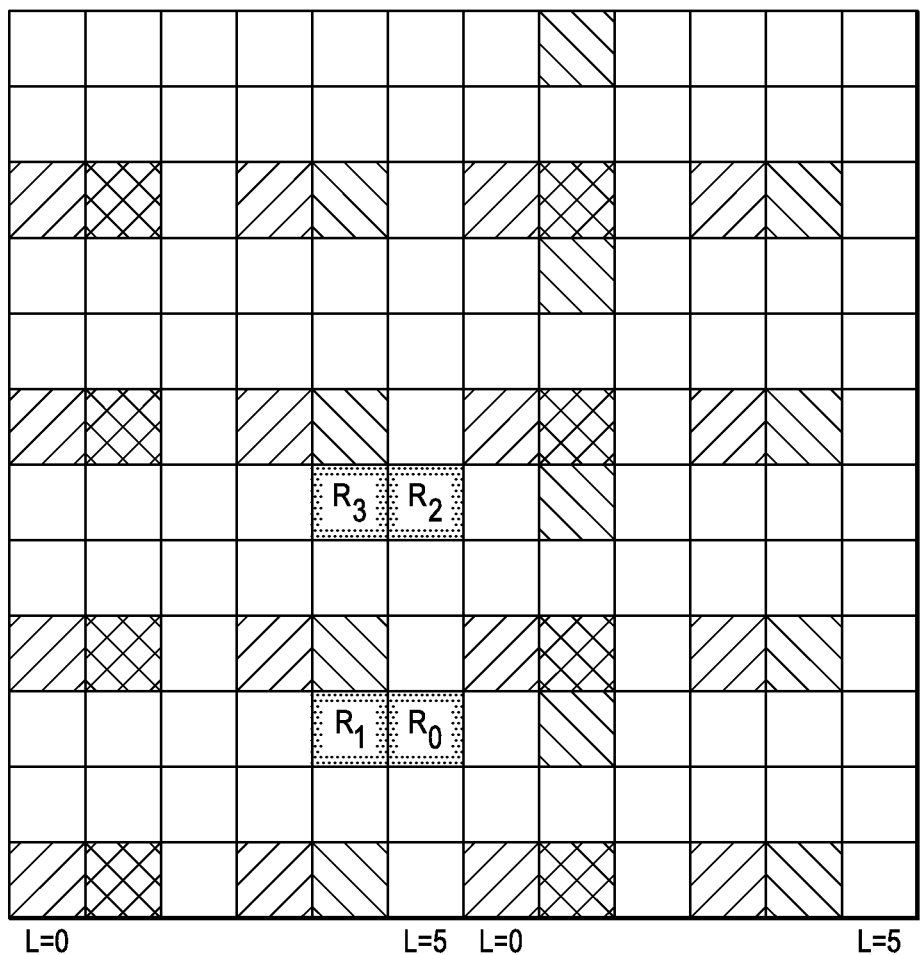
FIG. 22 illustrates a third example of a four antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 22:
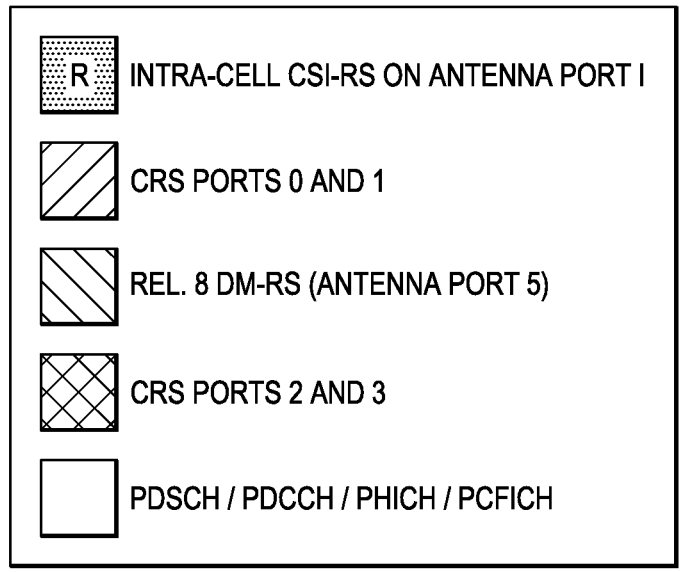
Figure 23:
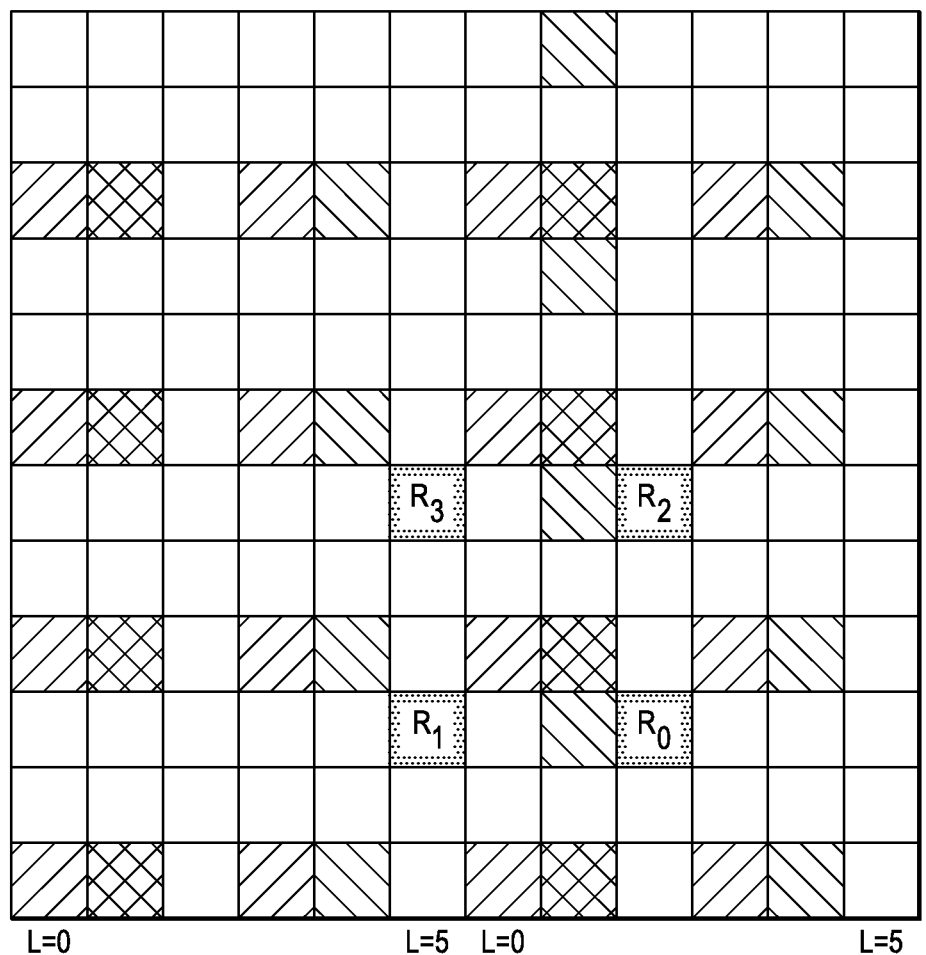
FIG. 23 illustrates a fourth example of a four antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 23:
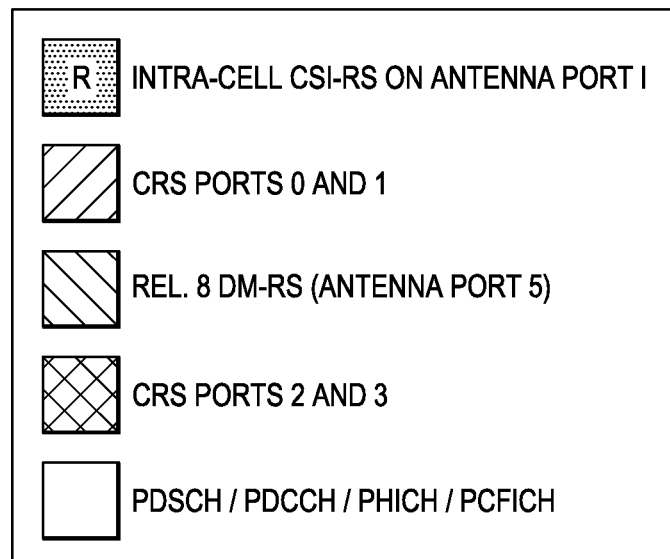
Figure 24:
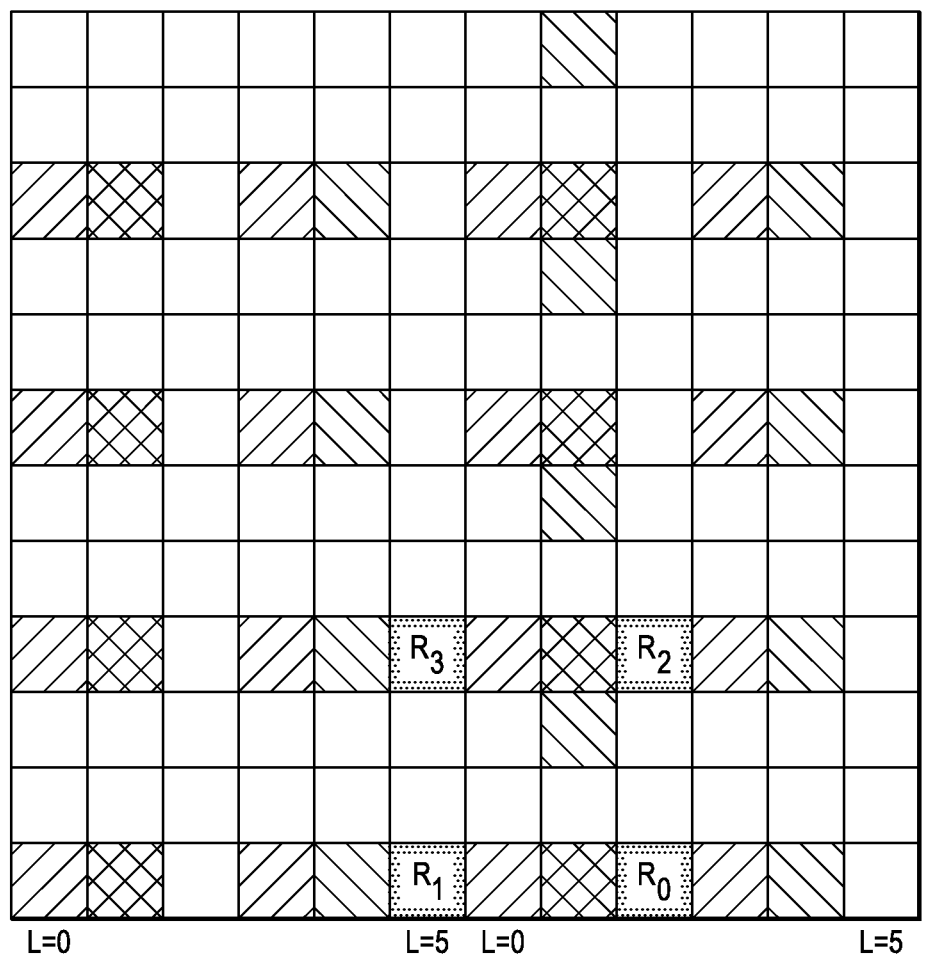
FIG. 24 illustrates a fifth example of a four antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 24:
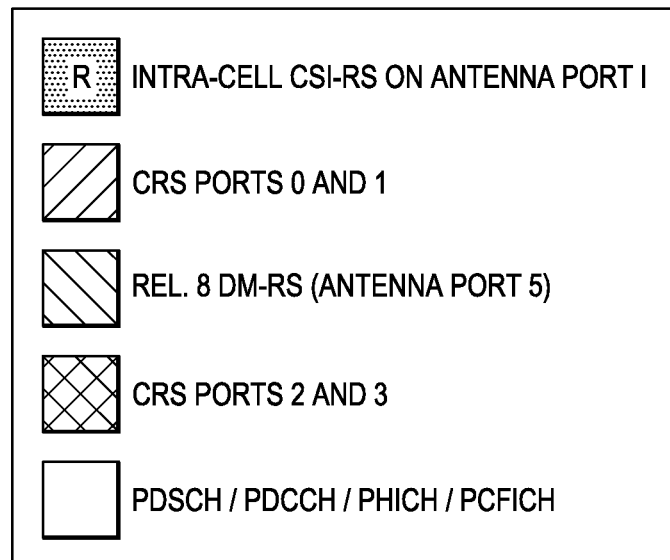
Figure 25:
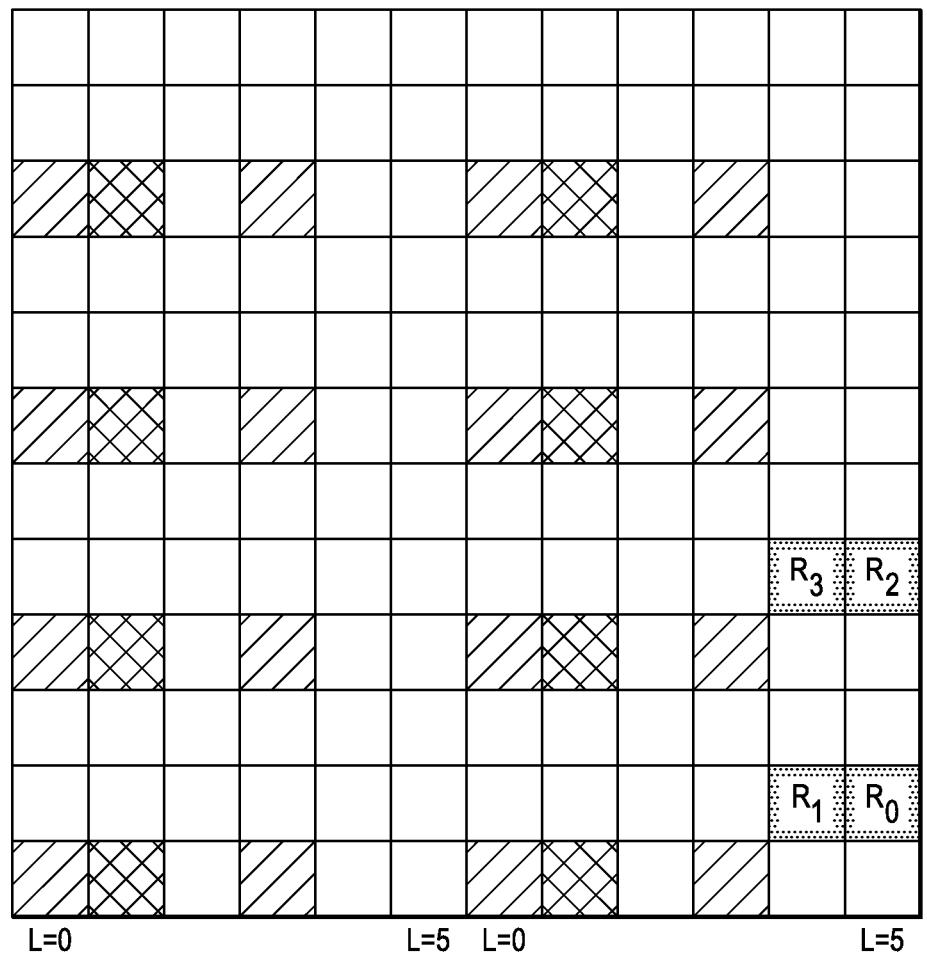
FIG. 25 illustrates a first example of a four antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 25:
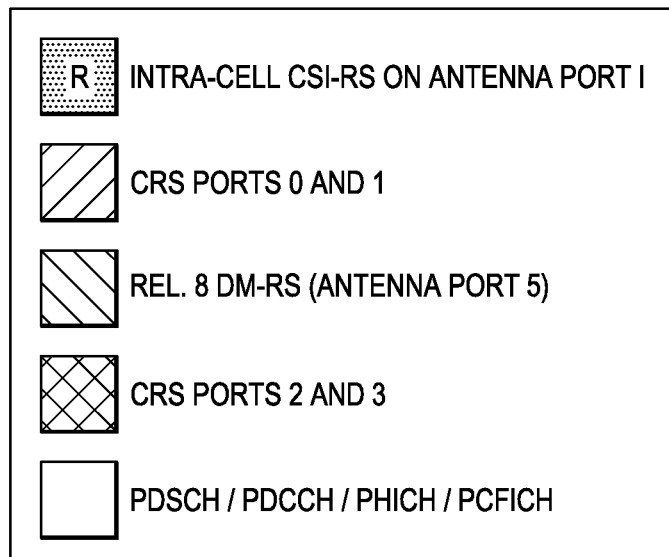
Figure 26:
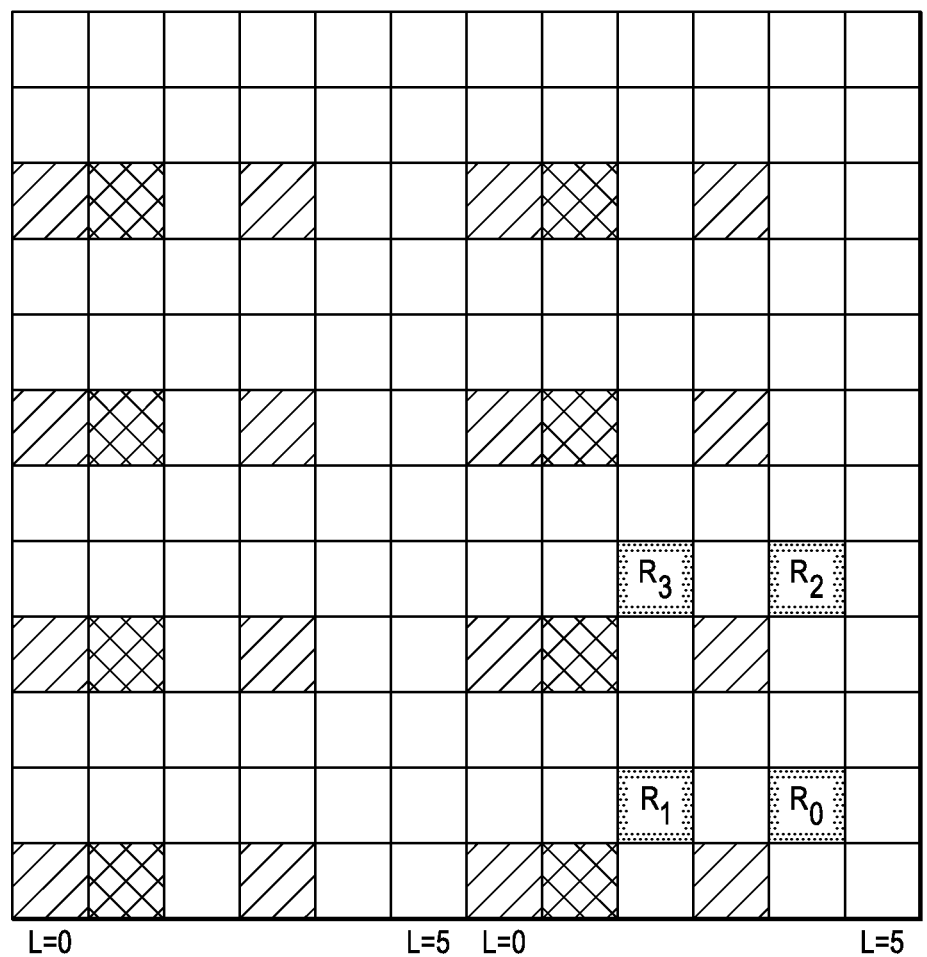
FIG. 26 illustrates a second example of a four antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 26:
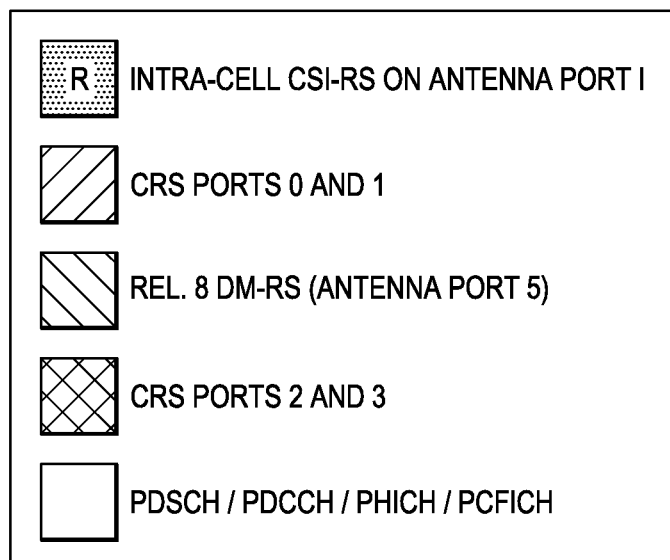
Figure 27:
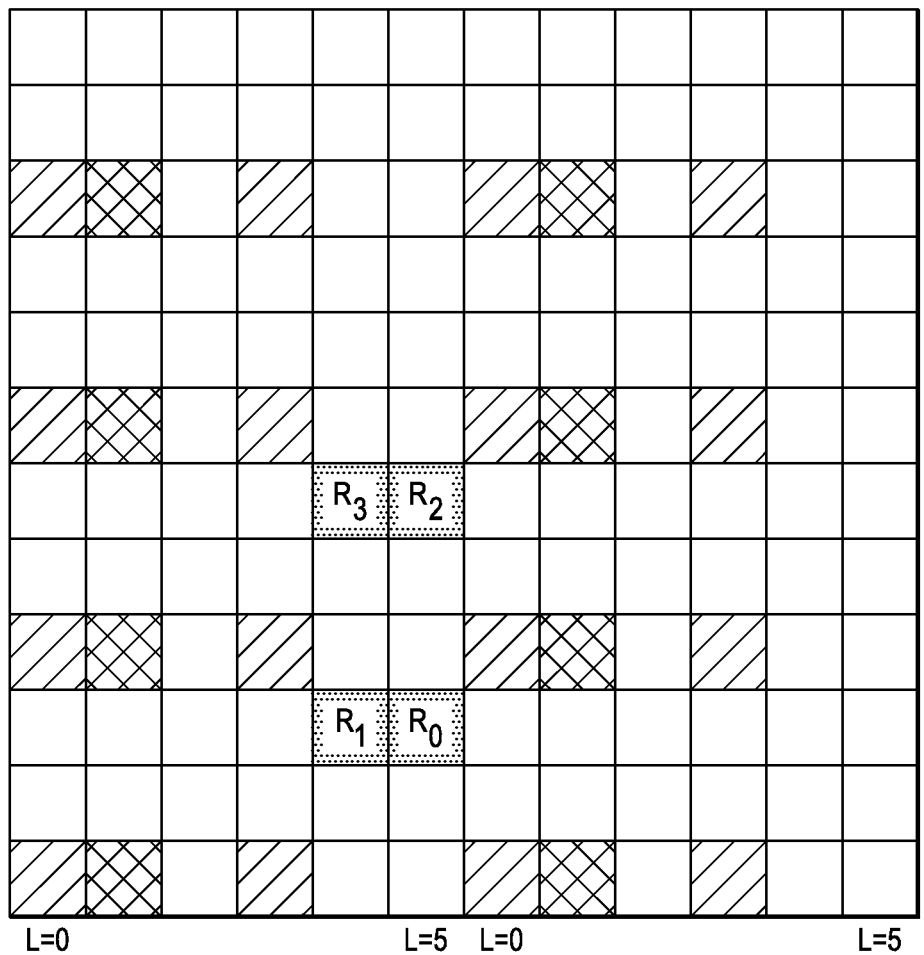
FIG. 27 illustrates a third example of a four antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 27:
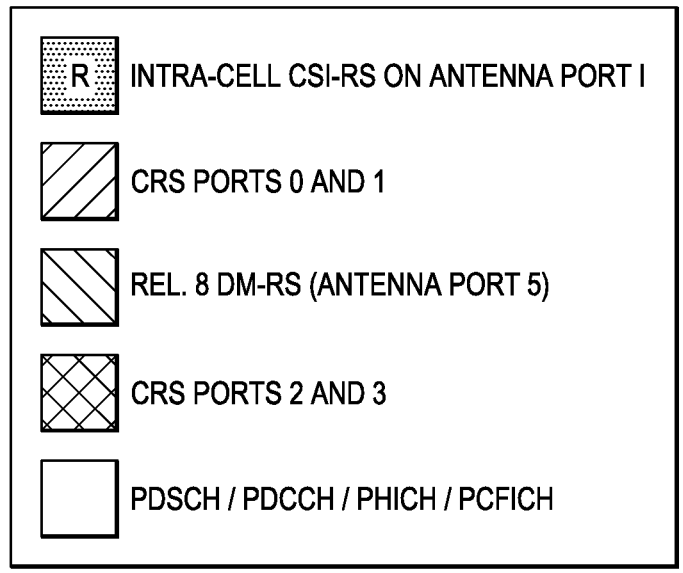
Figure 28:
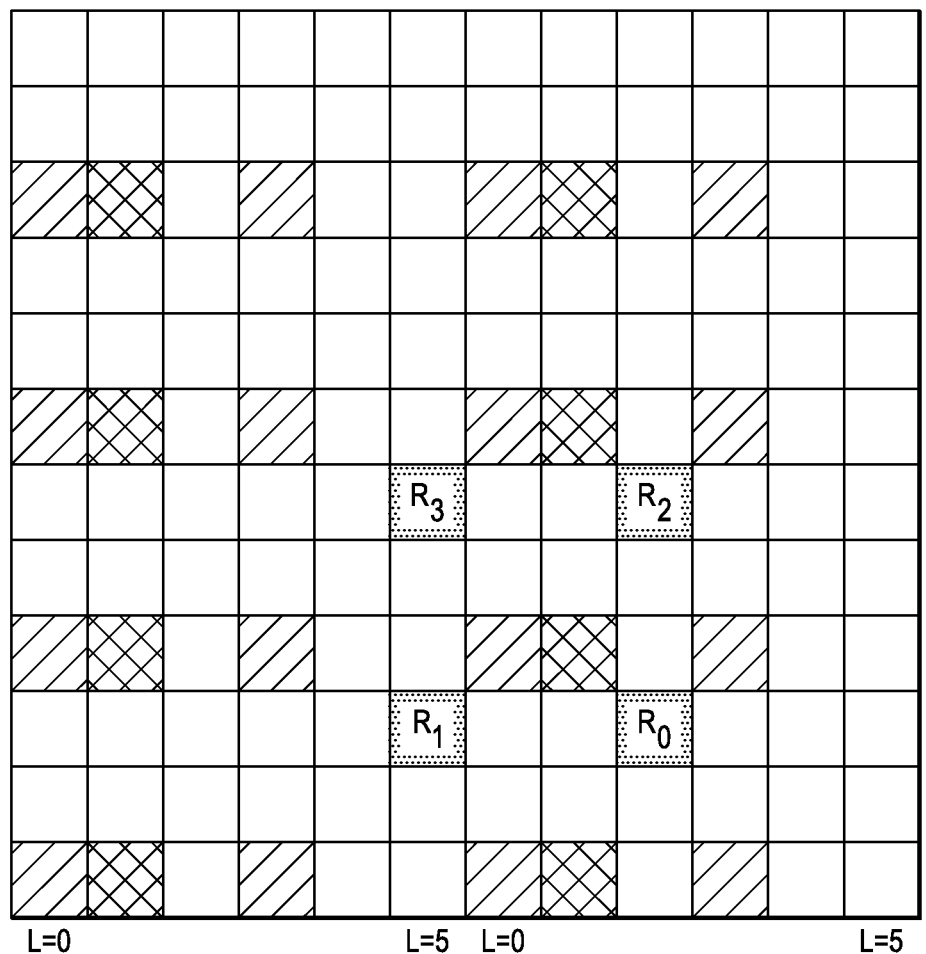
FIG. 28 illustrates a fourth example of a four antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 28:
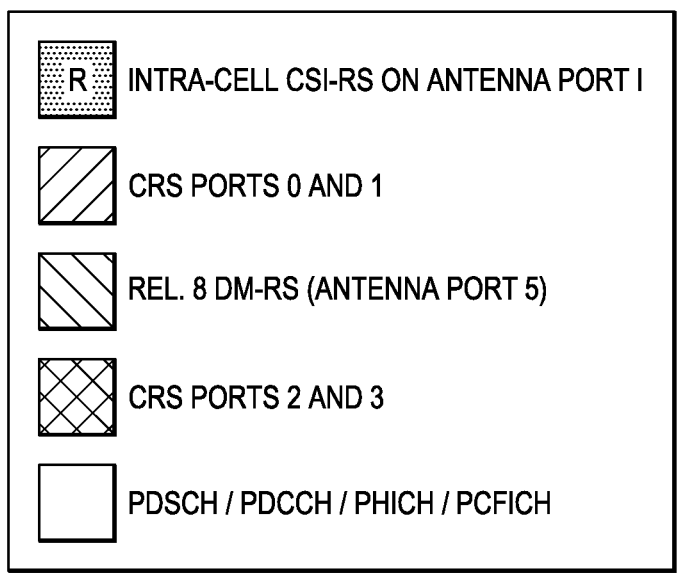
Figure 29:
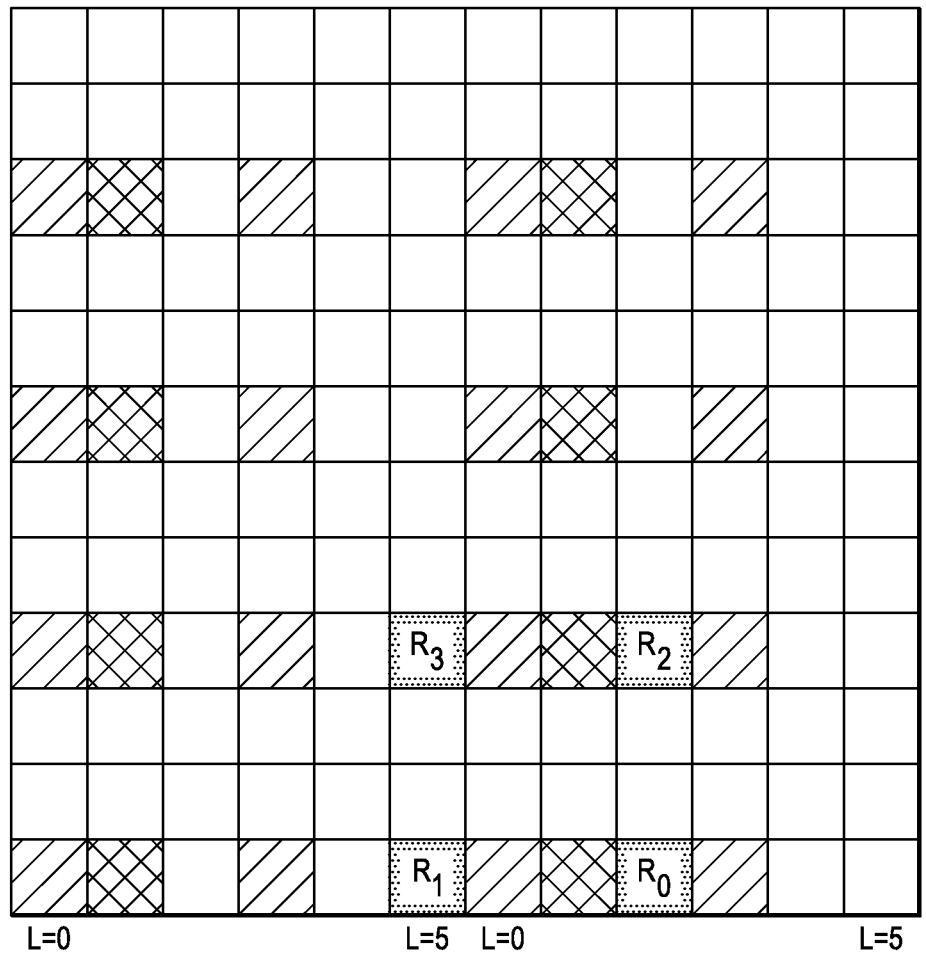
FIG. 29 illustrates a fifth example of a four antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 29:
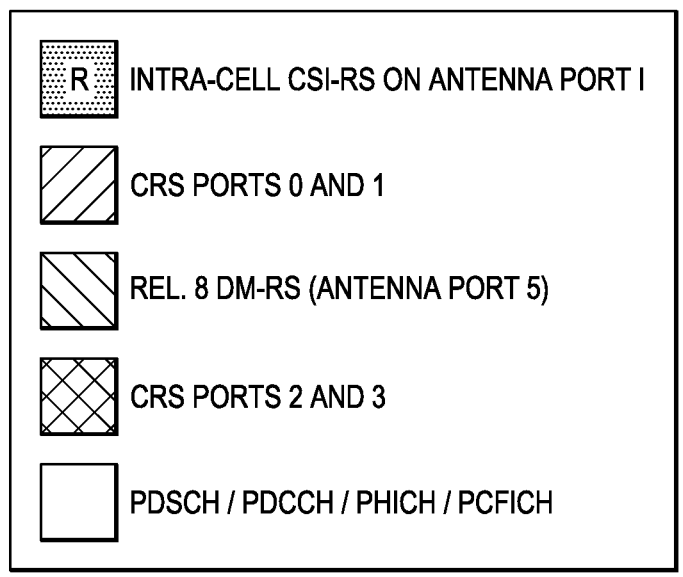
Figure 30:
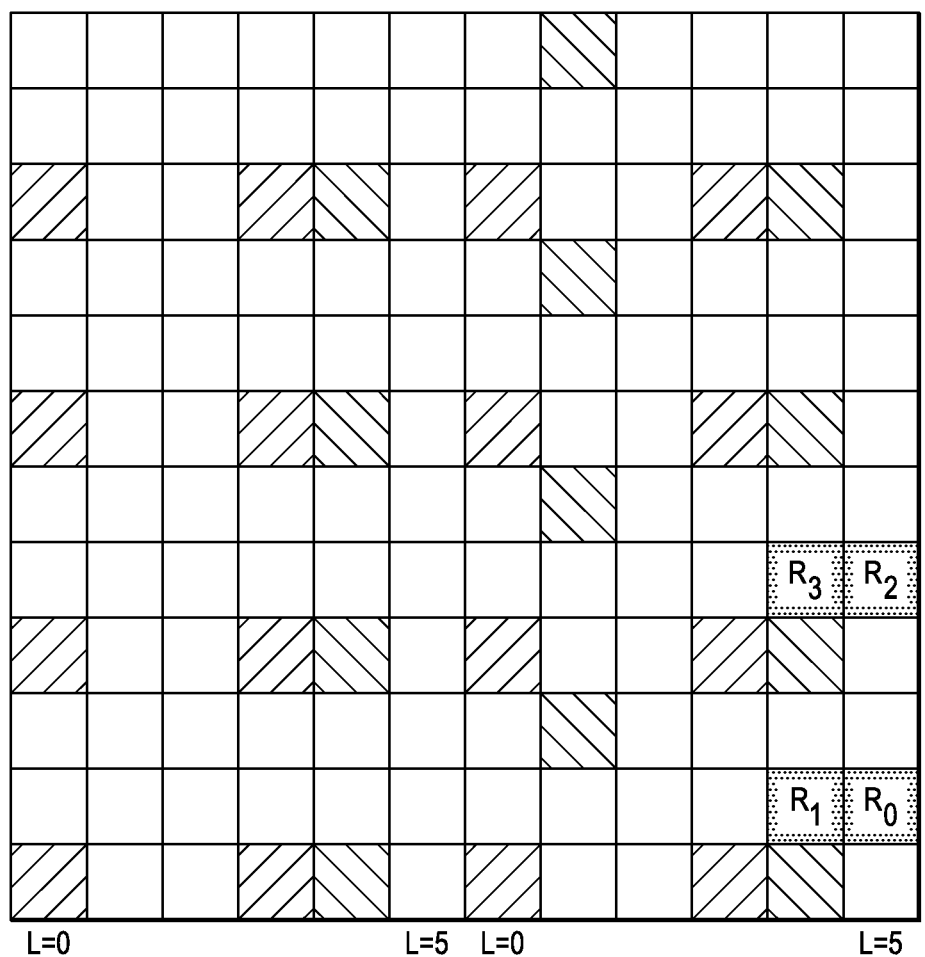
FIG. 30 illustrates a first example of a four antenna CSI-RS pattern transmitted over a Physical Resource Block (PRB) pair extended Cyclic Prefix system not using antenna ports 2 and 3 for transmitting cell-specific RS.
Figure 30:
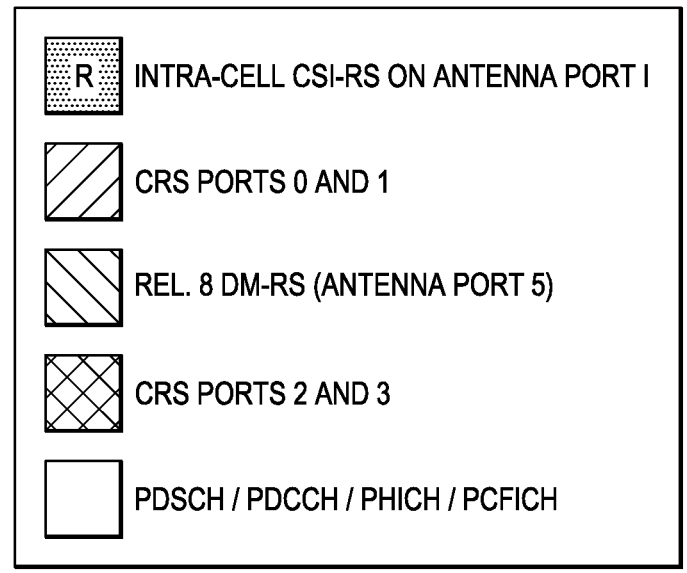
Figure 31:
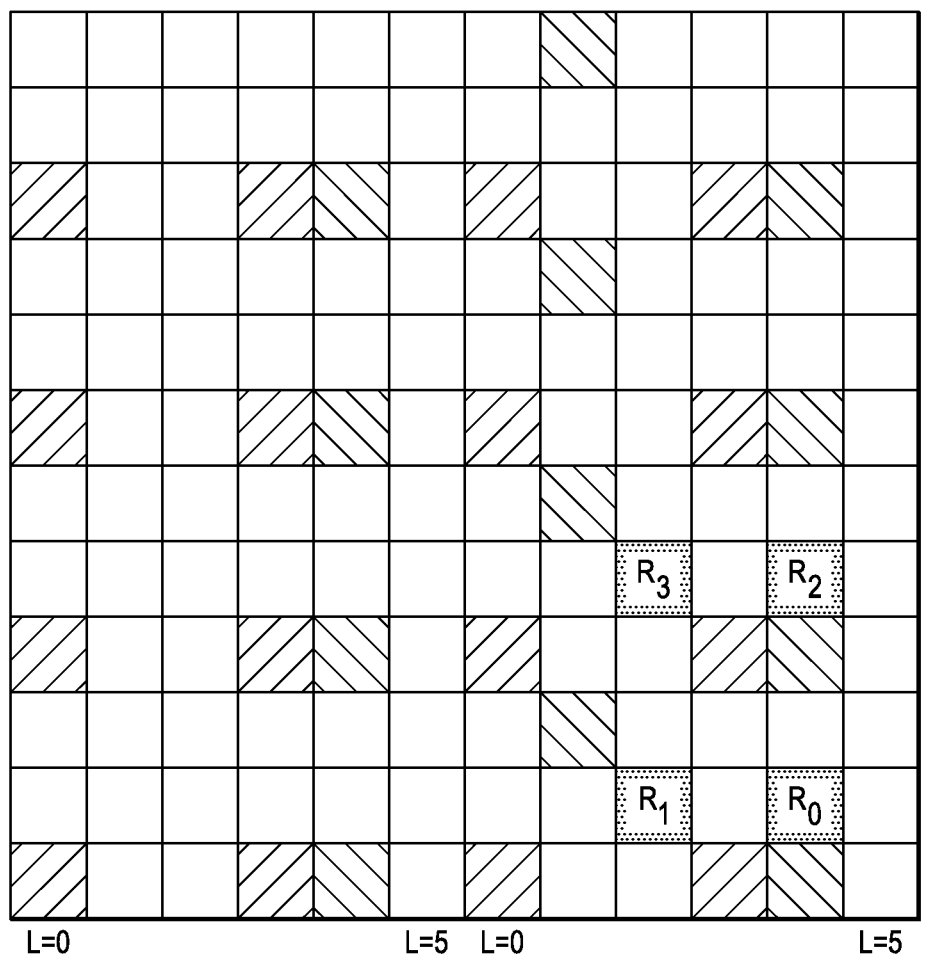
FIG. 31 illustrates a second example of a four antenna CSI-RS pattern transmitted over a Physical Resource Block (PRB) pair extended Cyclic Prefix system not using antenna ports 2 and 3 for transmitting cell-specific RS.
Figure 31:
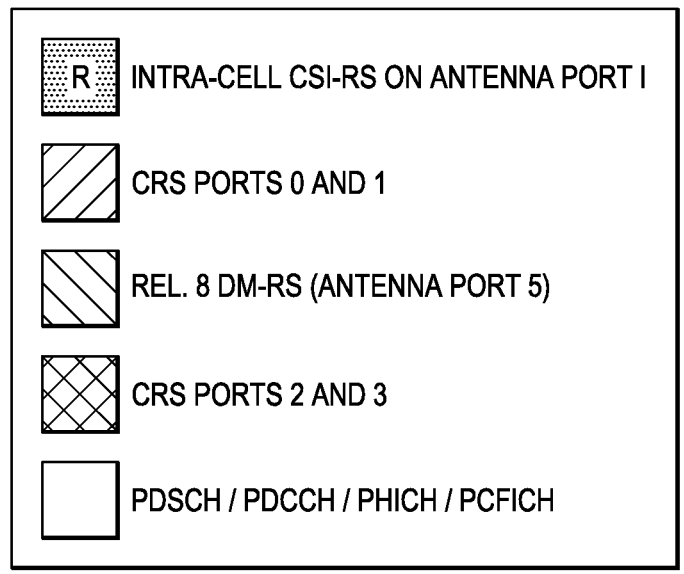
Figure 32:
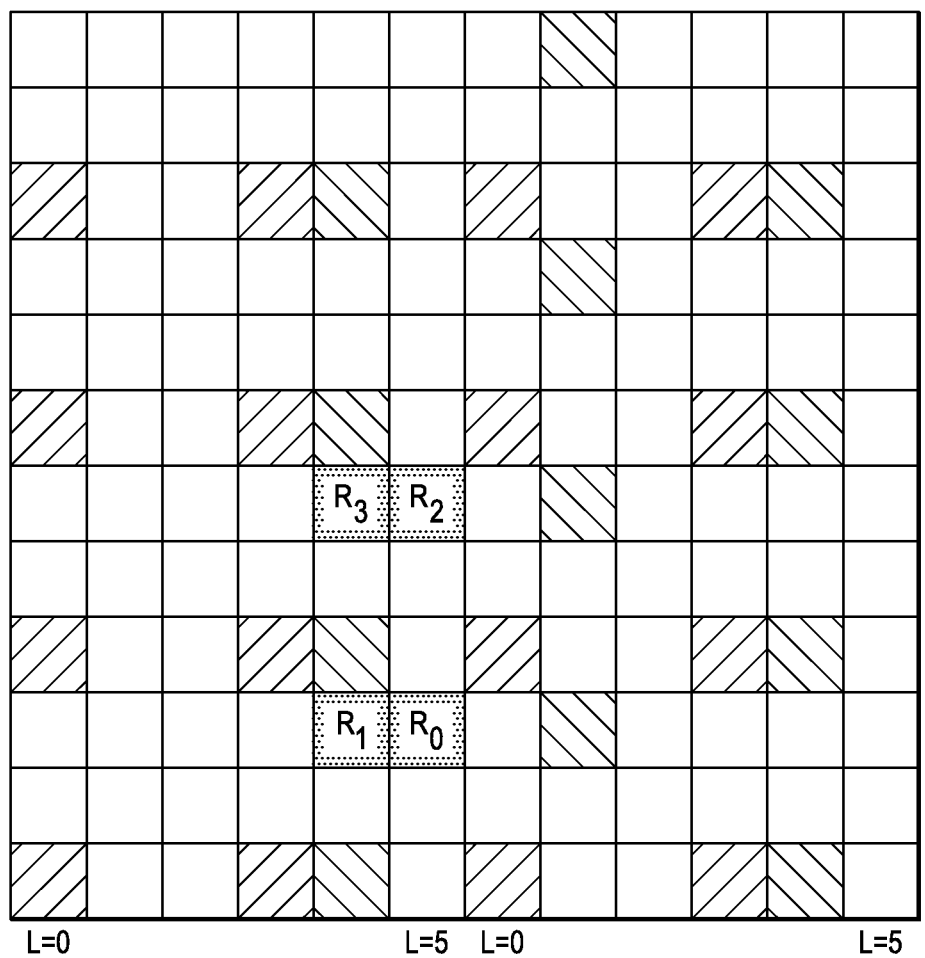
FIG. 32 illustrates a third example of a four antenna CSI-RS pattern transmitted over a Physical Resource Block (PRB) pair extended Cyclic Prefix system not using antenna ports 2 and 3 for transmitting cell-specific RS.
Figure 32:
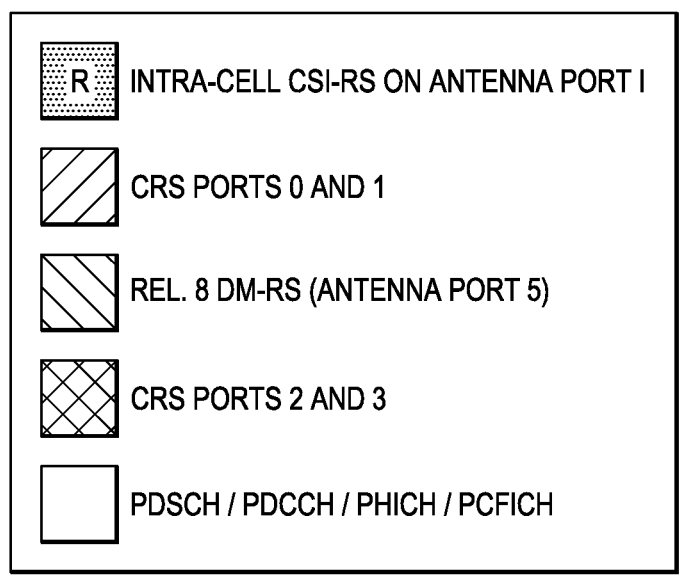
Figure 33:
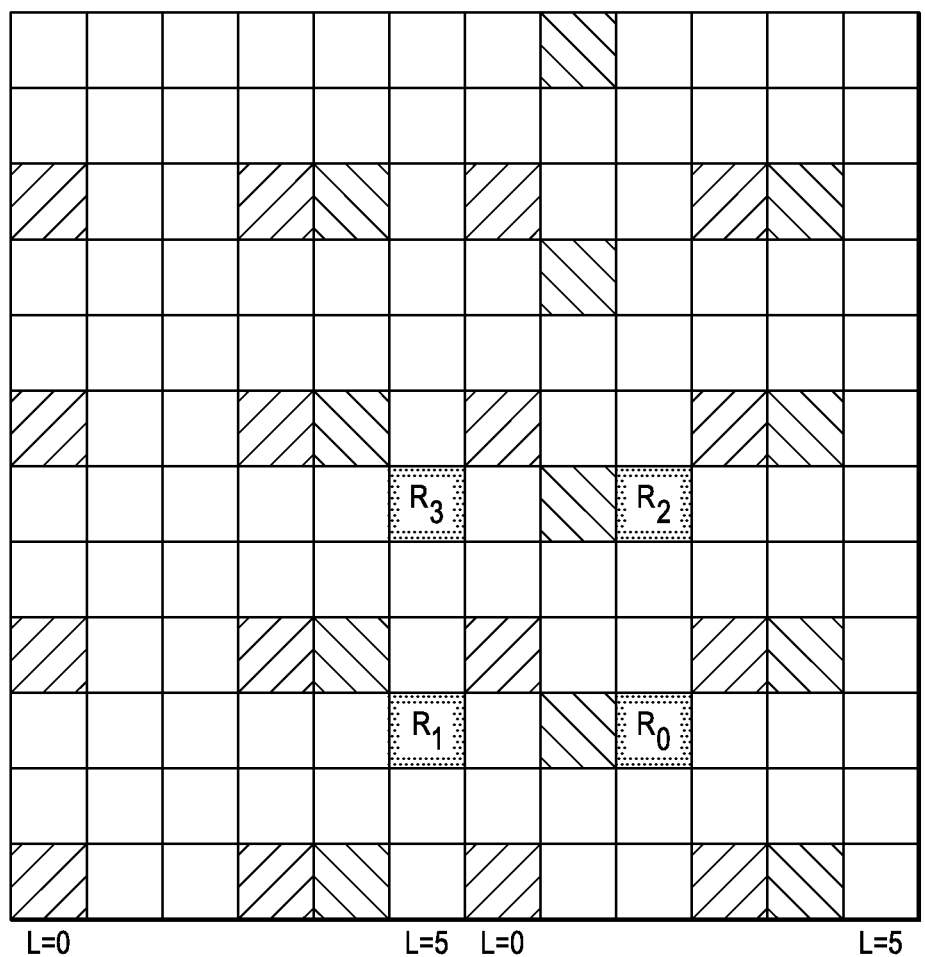
FIG. 33 illustrates a fourth example of a four antenna CSI-RS pattern transmitted over a Physical Resource Block (PRB) pair extended Cyclic Prefix system not using antenna ports 2 and 3 for transmitting cell-specific RS.
Figure 33:
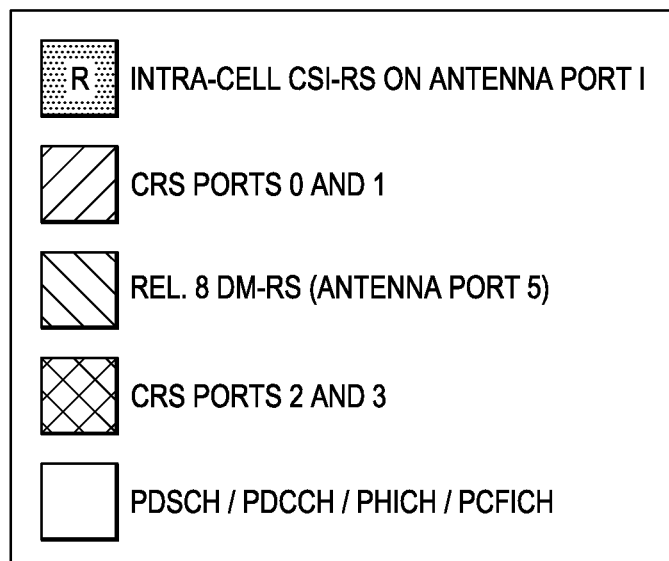
Figure 34:
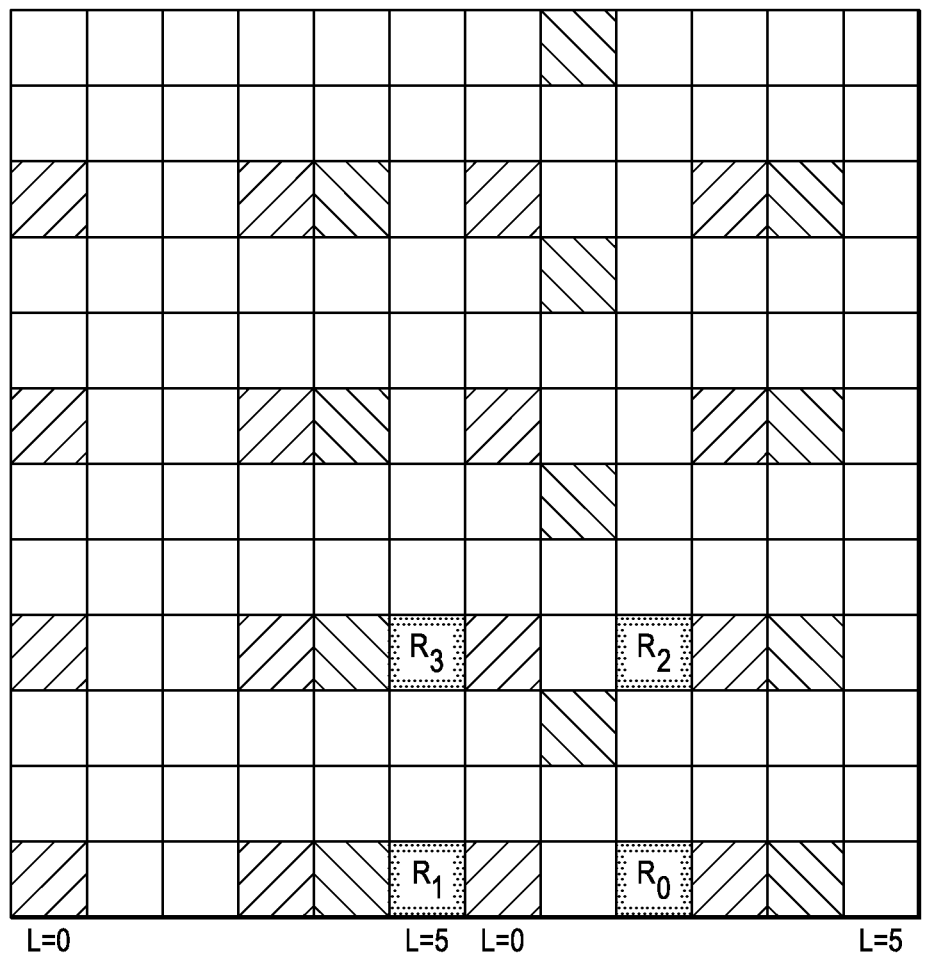
FIG. 34 illustrates a fifth example of a four antenna CSI-RS pattern transmitted over a Physical Resource Block (PRB) pair extended Cyclic Prefix system not using antenna ports 2 and 3 for transmitting cell-specific RS.
Figure 34:
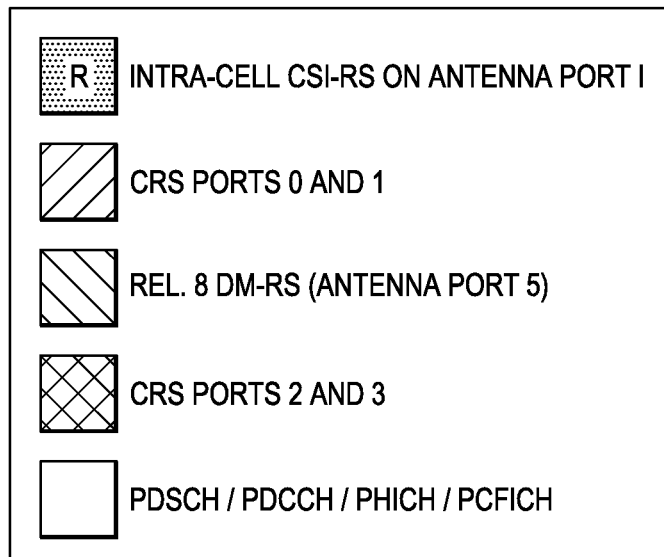
Figure 35:
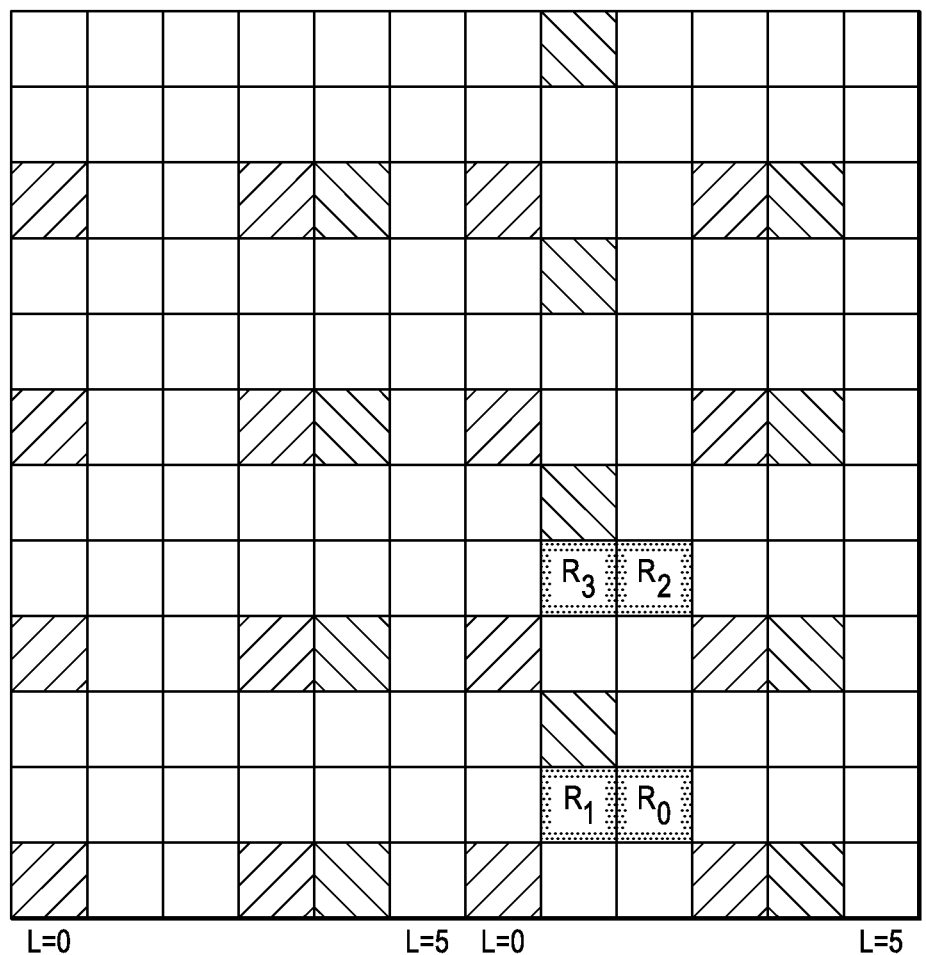
FIG. 35 illustrates a sixth example of a four antenna CSI-RS pattern transmitted over a Physical Resource Block (PRB) pair extended Cyclic Prefix system not using antenna ports 2 and 3 for transmitting cell-specific RS.
Figure 35:
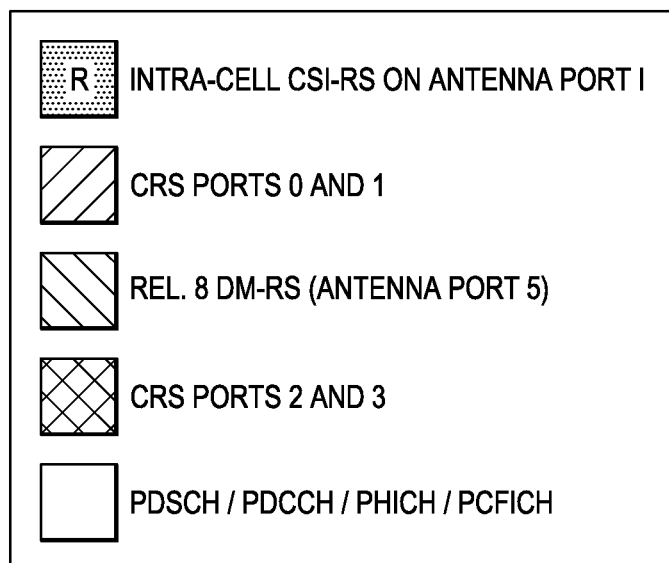
Figure 36:
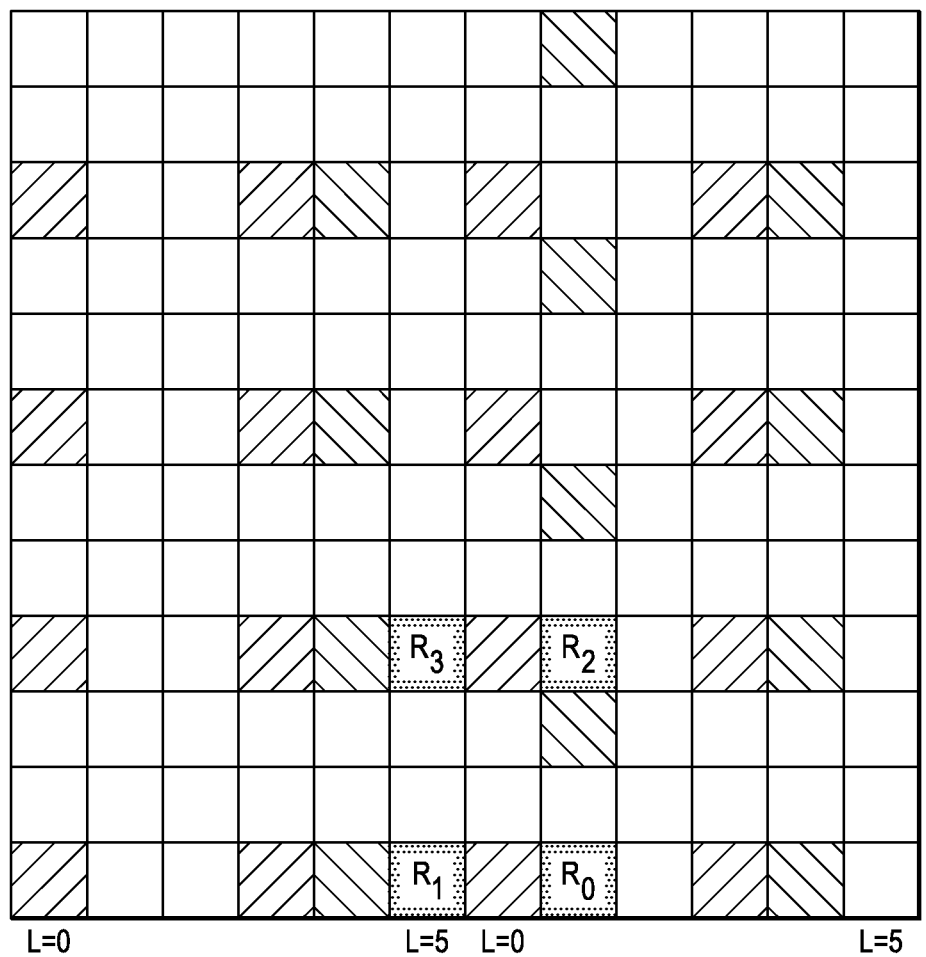
FIG. 36 illustrates a seventh example of a four antenna CSI-RS pattern transmitted over a Physical Resource Block (PRB) pair extended Cyclic Prefix system not using antenna ports 2 and 3 for transmitting cell-specific RS.
Figure 36:
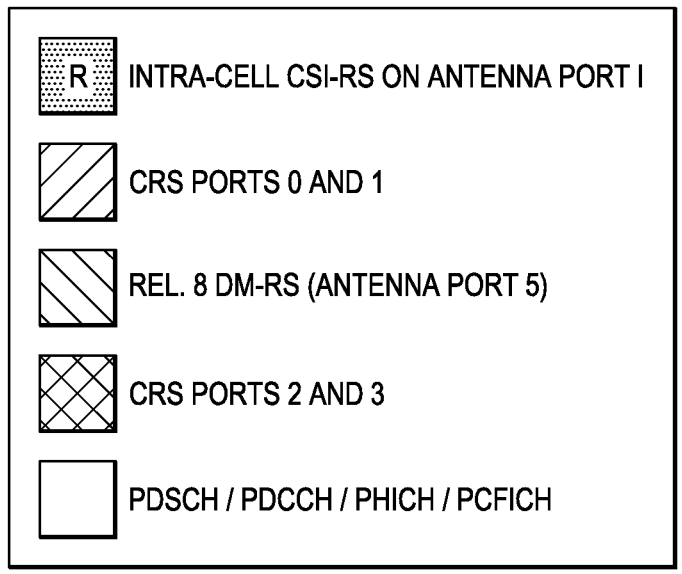
Figure 37:
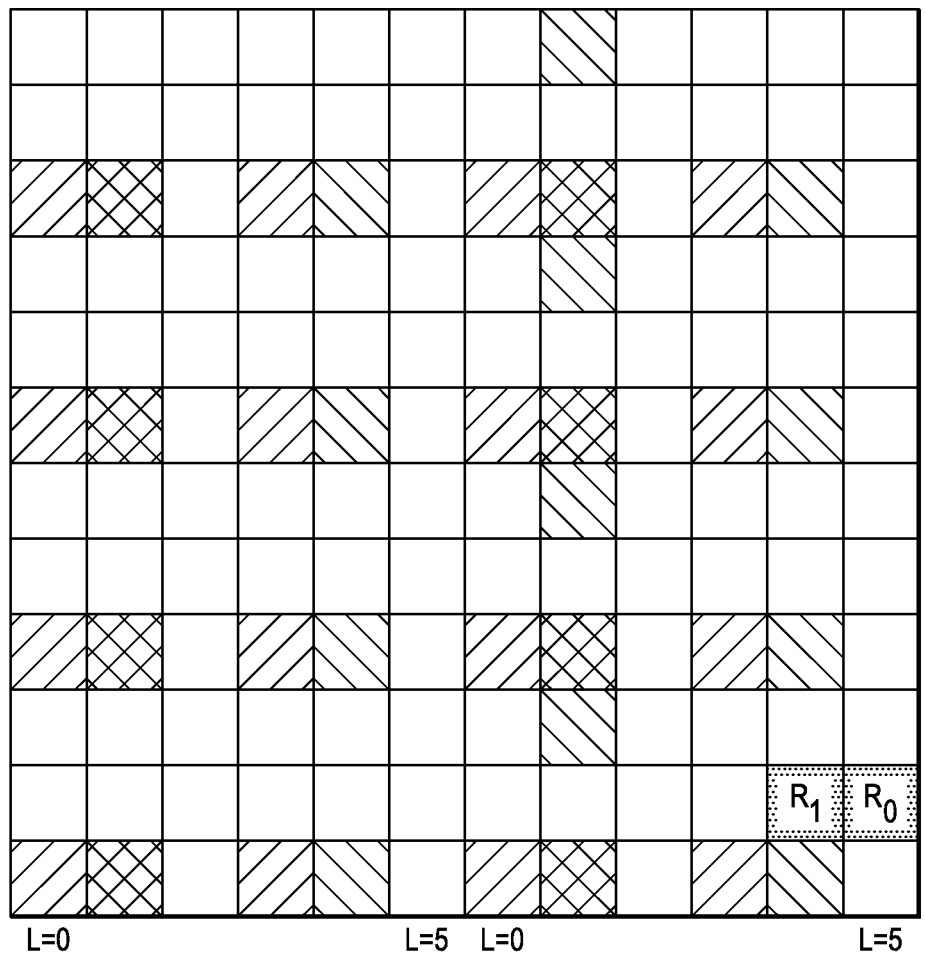
FIG. 37 illustrates a first example of a two antenna CSI-RS pattern transmitted over a Physical Resource Block (PRB) pair extended Cyclic Prefix system using antenna ports 0, 1, 2 and 3 (resp. antenna port 5) for transmission of cell-specific RS (resp. UE-specific RS)
Figure 37:
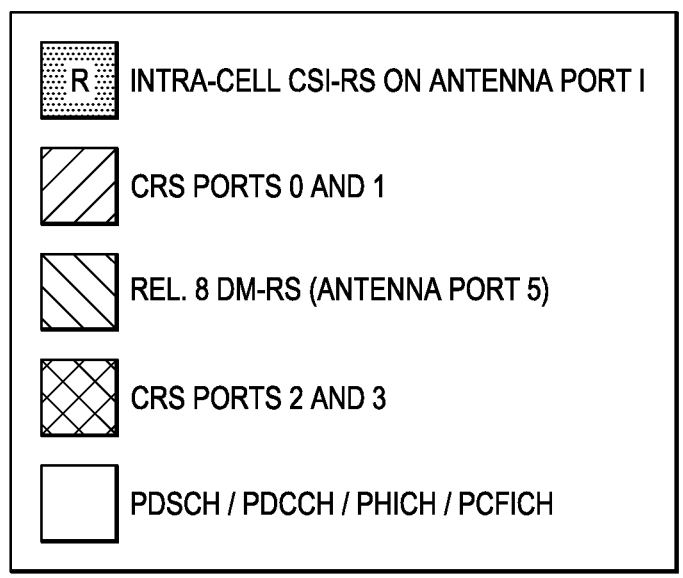
Figure 38:
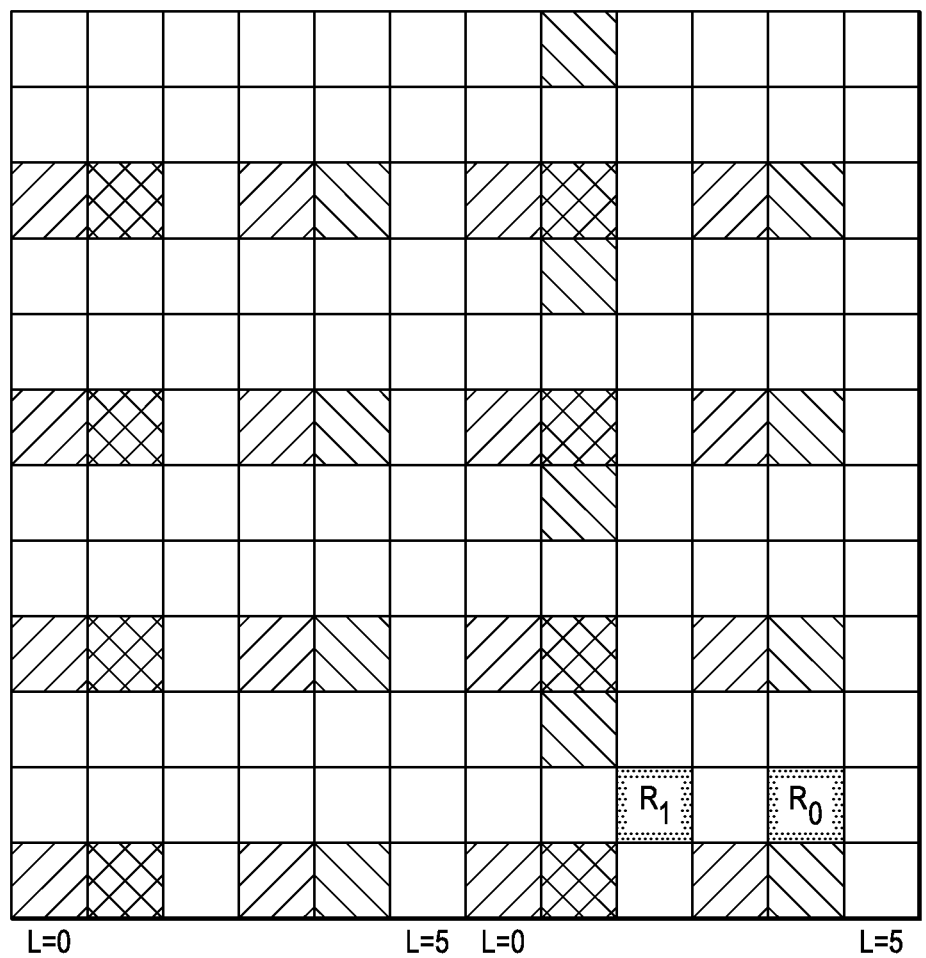
FIG. 38 illustrates a second example of a two antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 38:
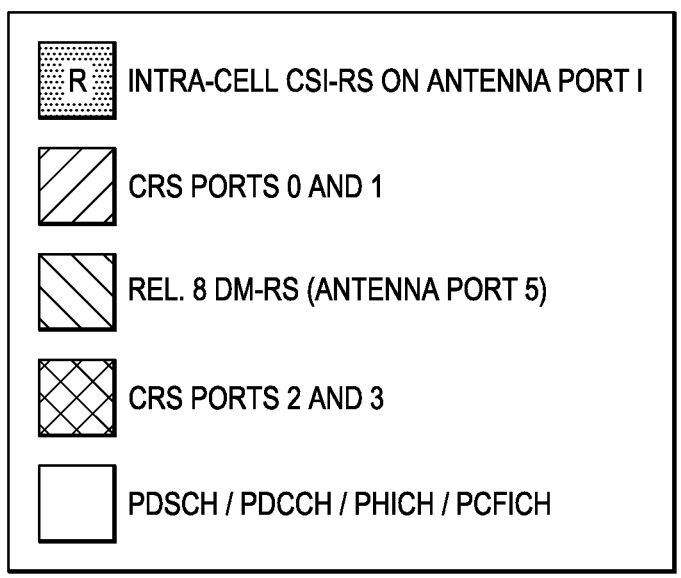
Figure 39:
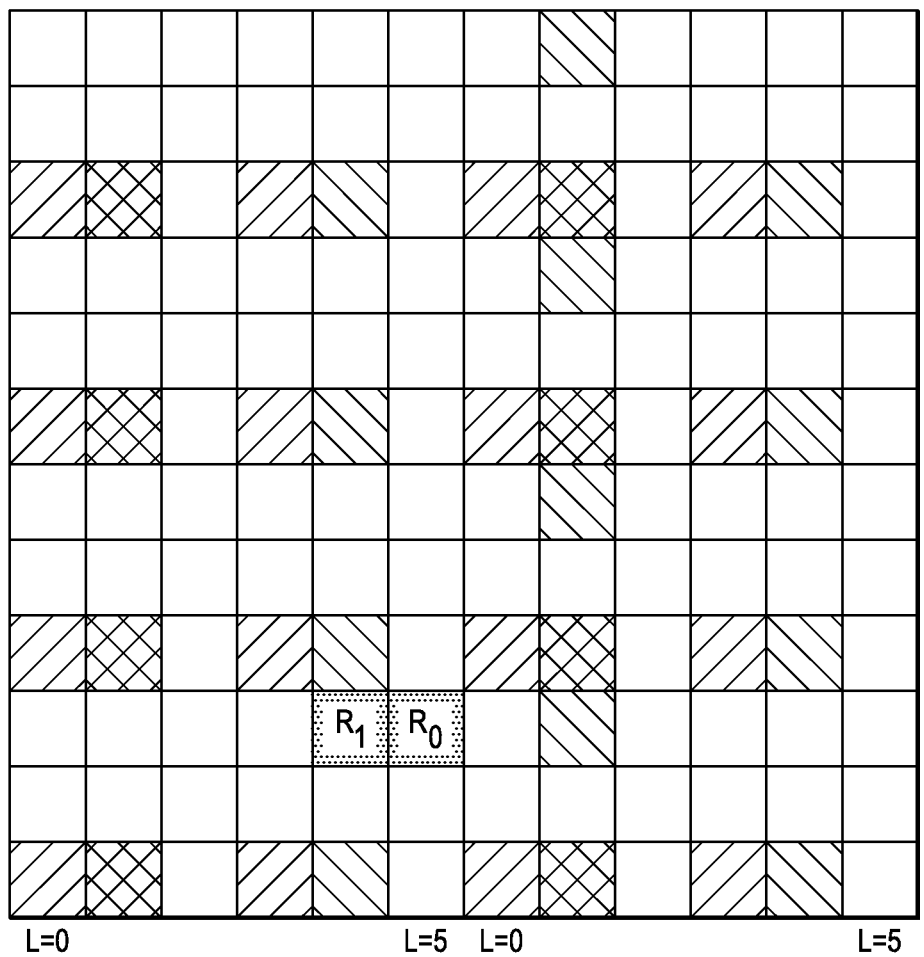
FIG. 39 illustrates a third example of a two antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 39:
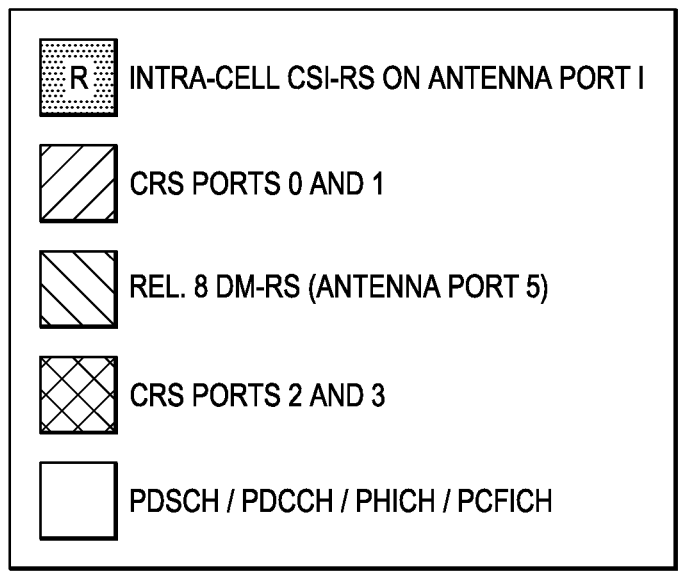
Figure 40:
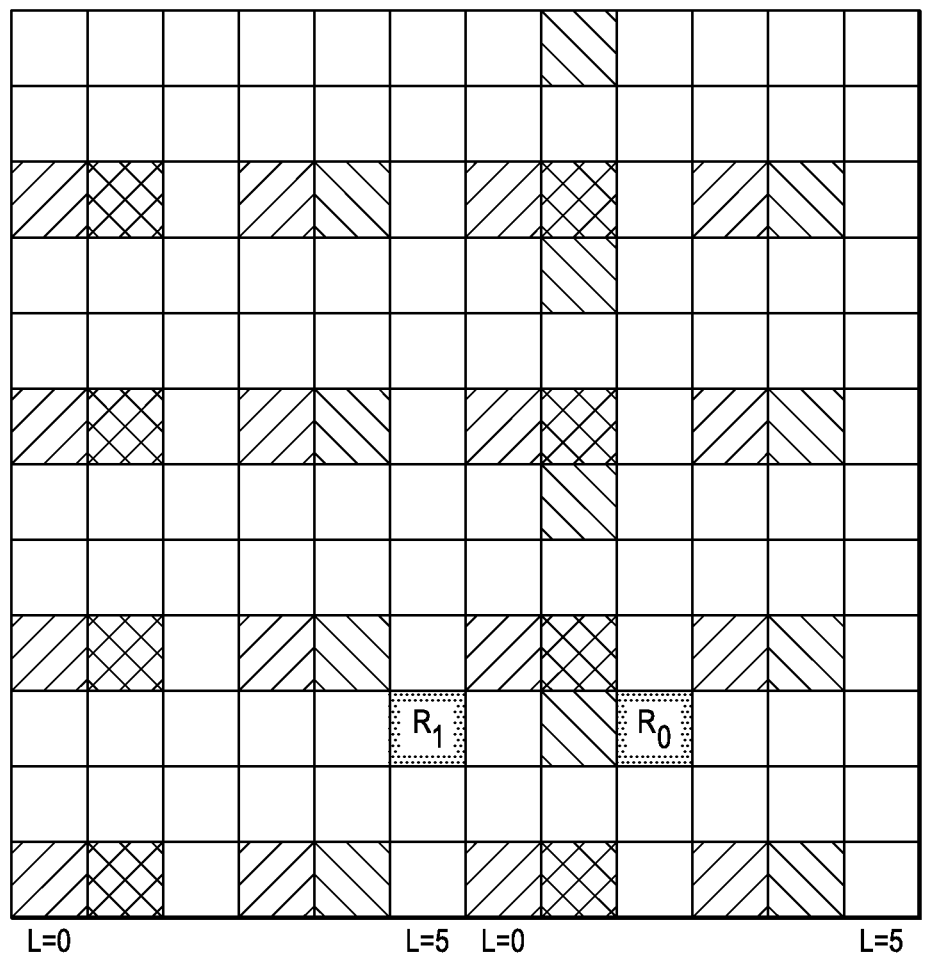
FIG. 40 illustrates a fourth example of a two antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 40:
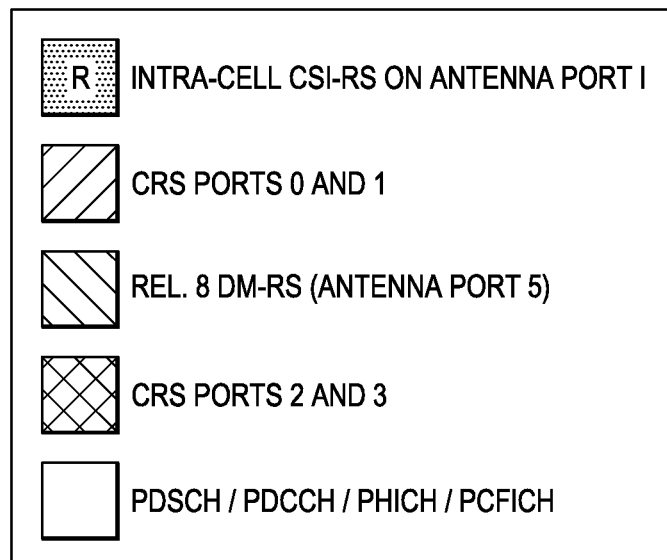
Figure 41:
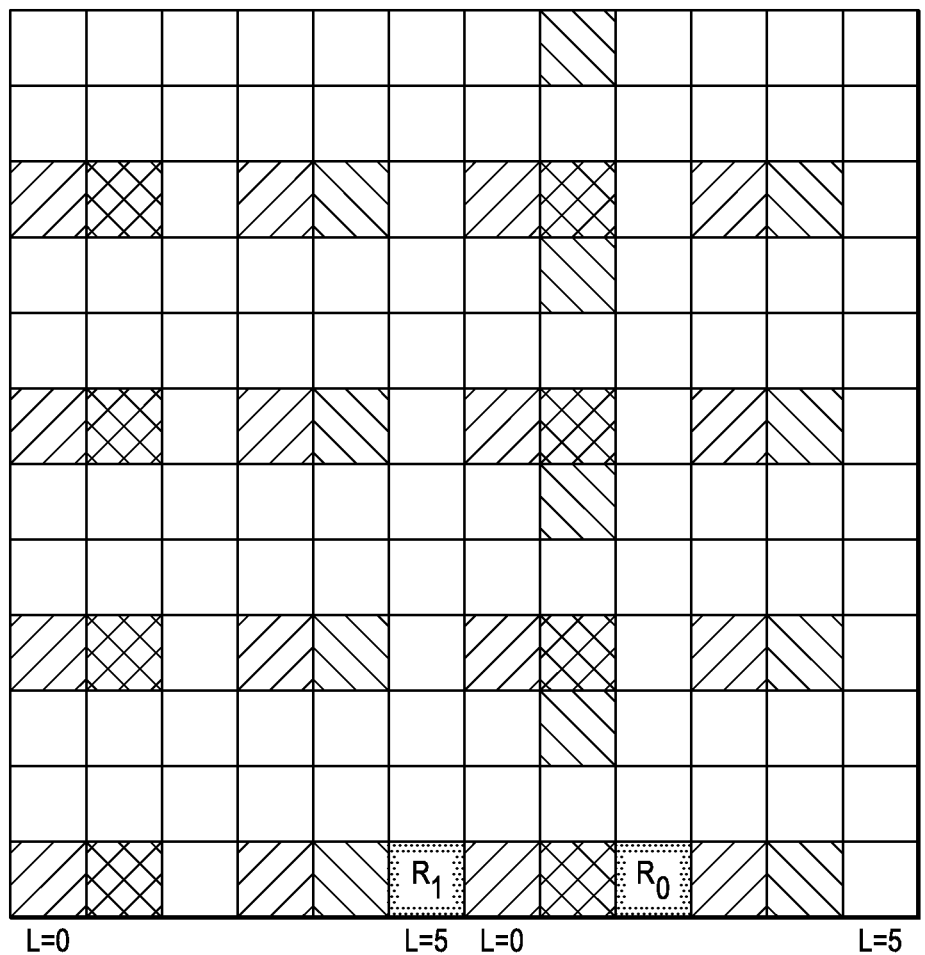
FIG. 41 illustrates a fifth example of a two antenna CSI-RS pattern transmitted over a Physical Resource Block (PRB) pair extended Cyclic Prefix system using antenna ports 0, 1, 2 and 3 (resp. antenna port 5) for transmission of cell-specific RS (UE-specific RS)
Figure 41:
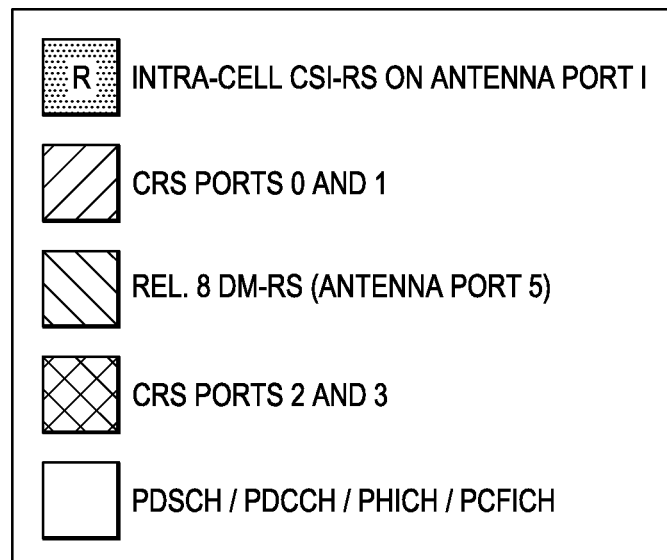
Figure 42:
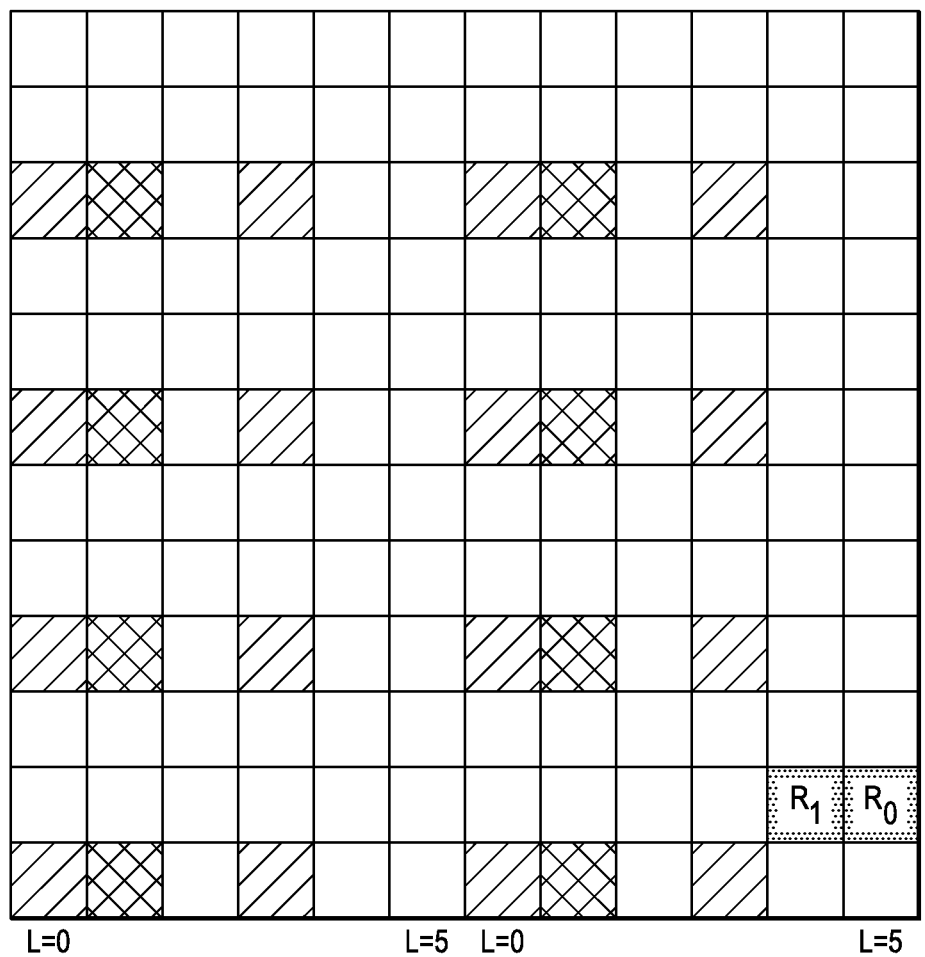
FIG. 42 illustrates a first example of a two antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 42:
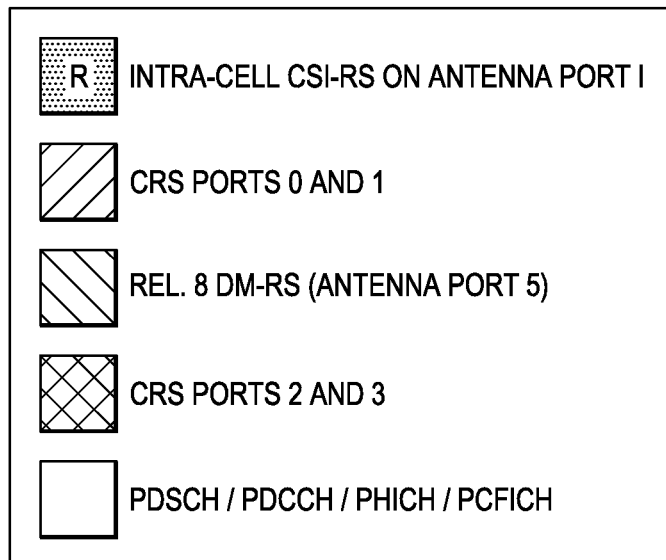
Figure 43:
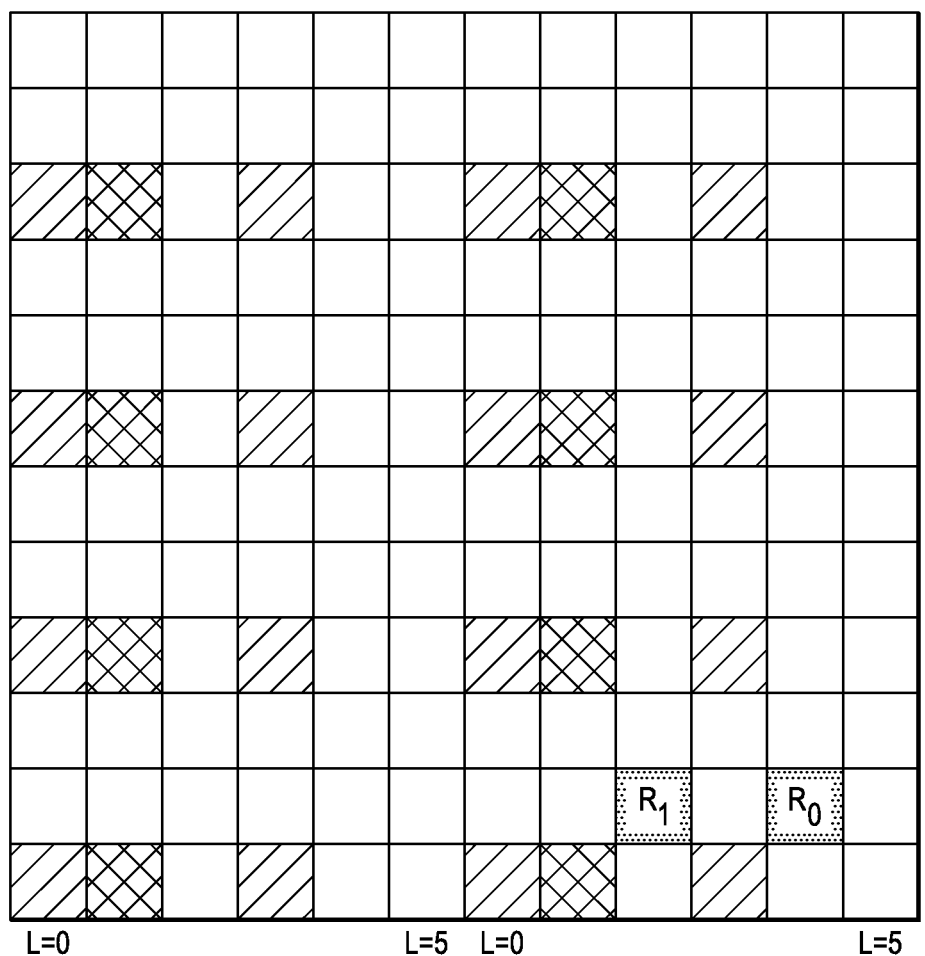
FIG. 43 illustrates a second example of a two antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 43:
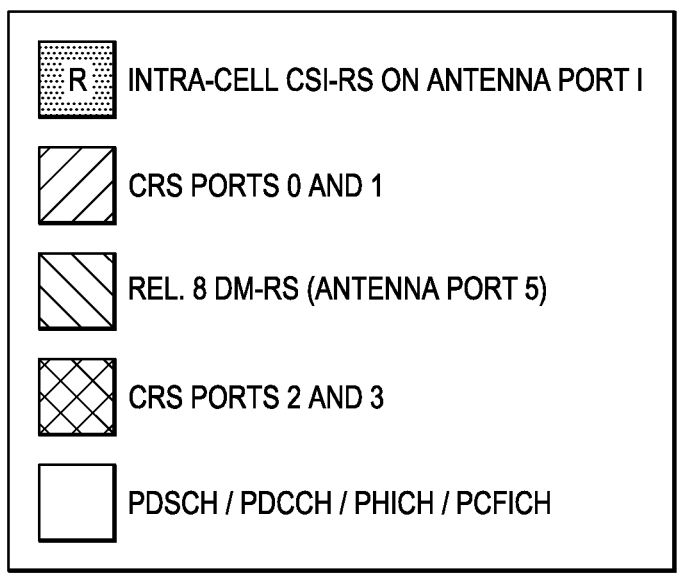
Figure 44:
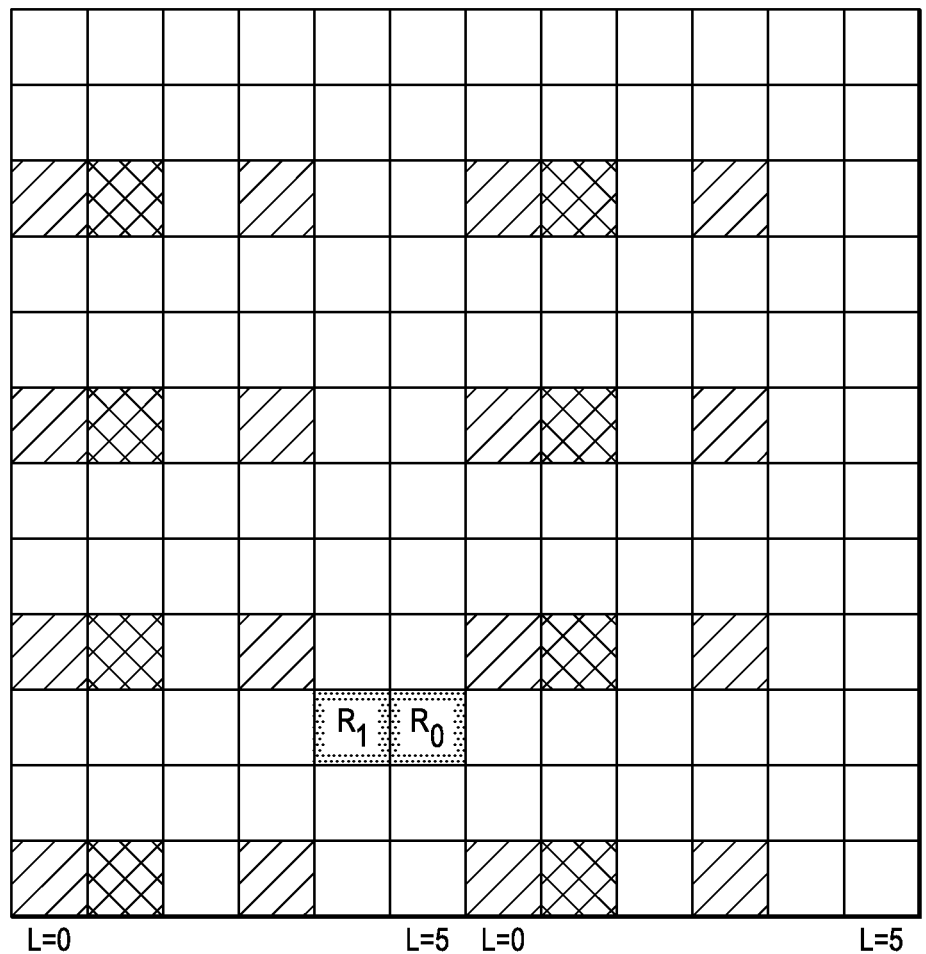
FIG. 44 illustrates a third example of a two antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 44:
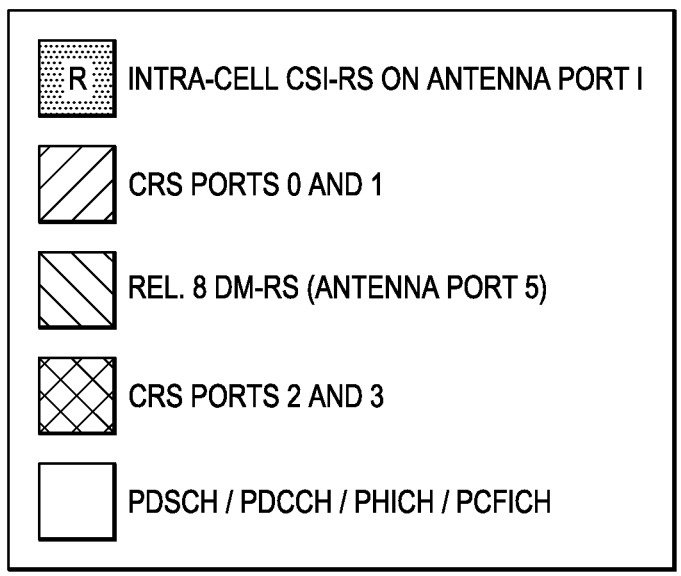
Figure 45:
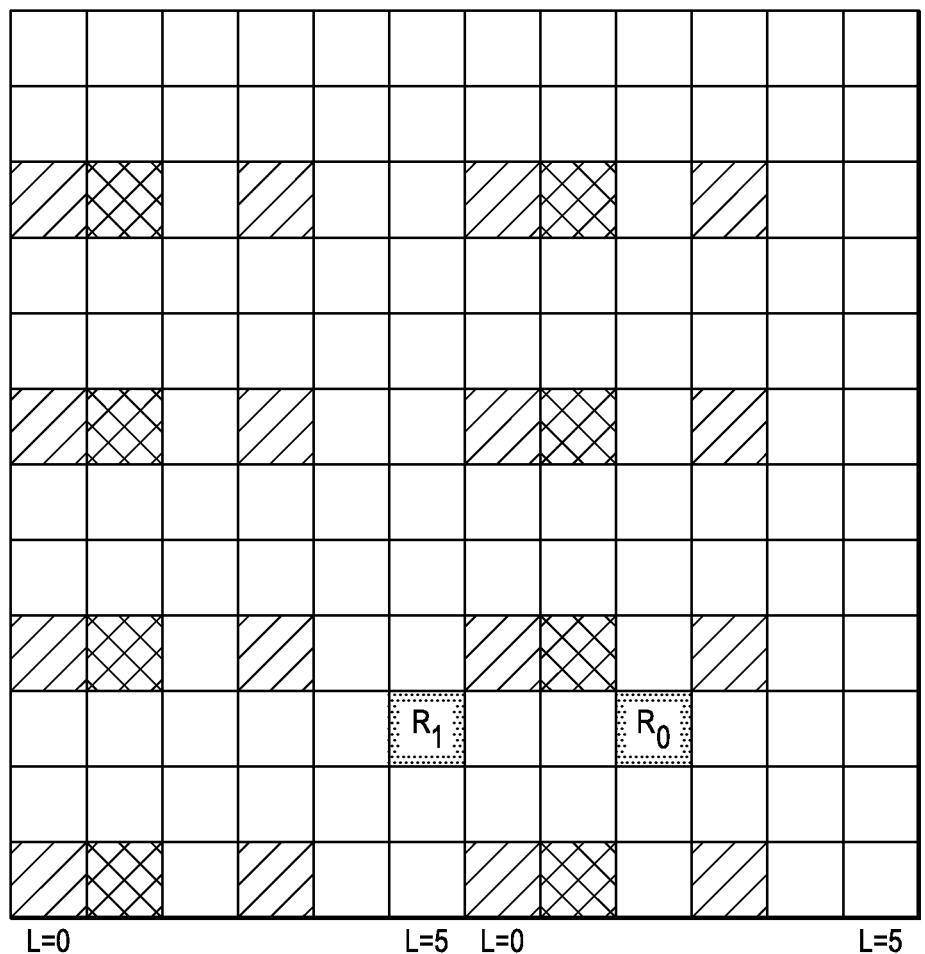
FIG. 45 illustrates a fourth example of a two antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 45:
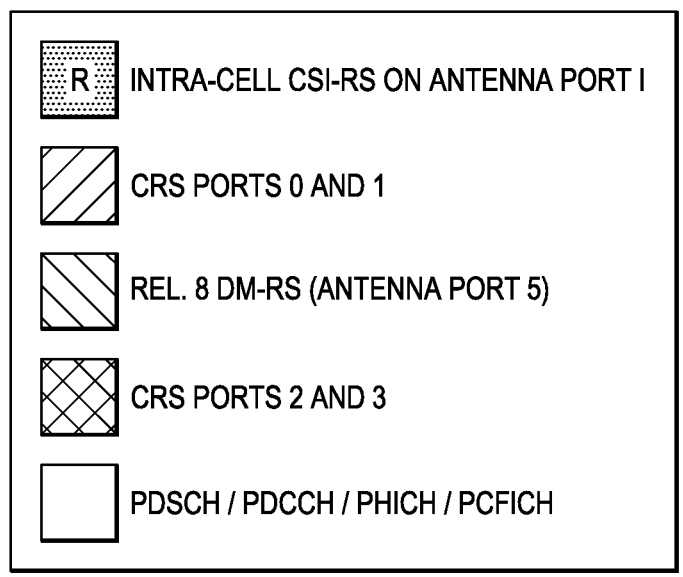
Figure 46:
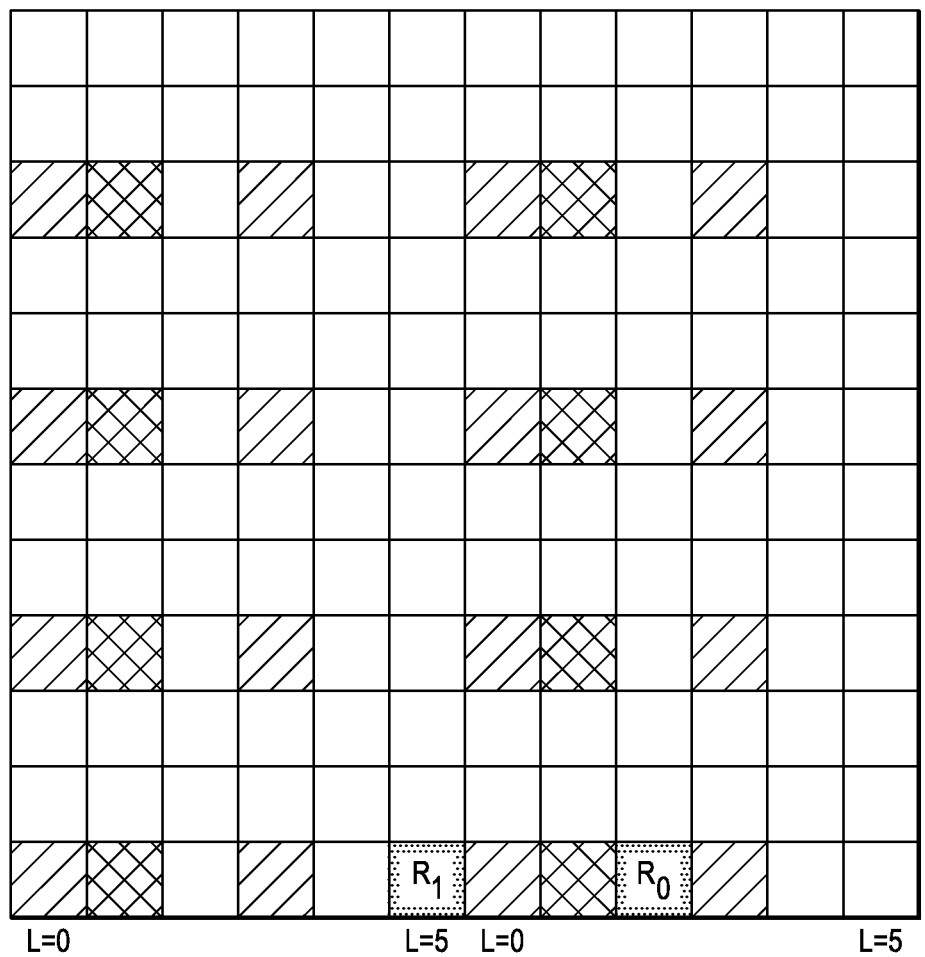
FIG. 46 illustrates a fifth example of a two antenna CSI-RS pattern transmitted over a Physical Resource Block (PRB) pair extended Cyclic Prefix system which transmits cell-specific RS on up to 4 antenna ports and does not use antenna port 5 for transmission of UE-specific reference signals.
Figure 46:
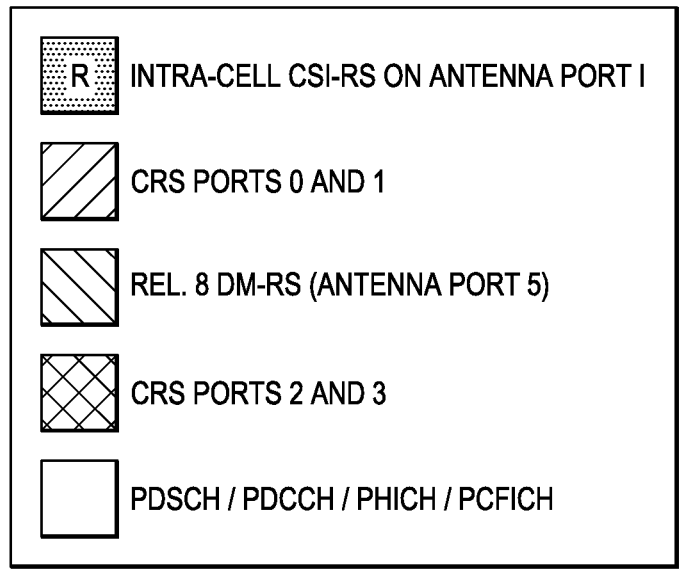
Figure 47:
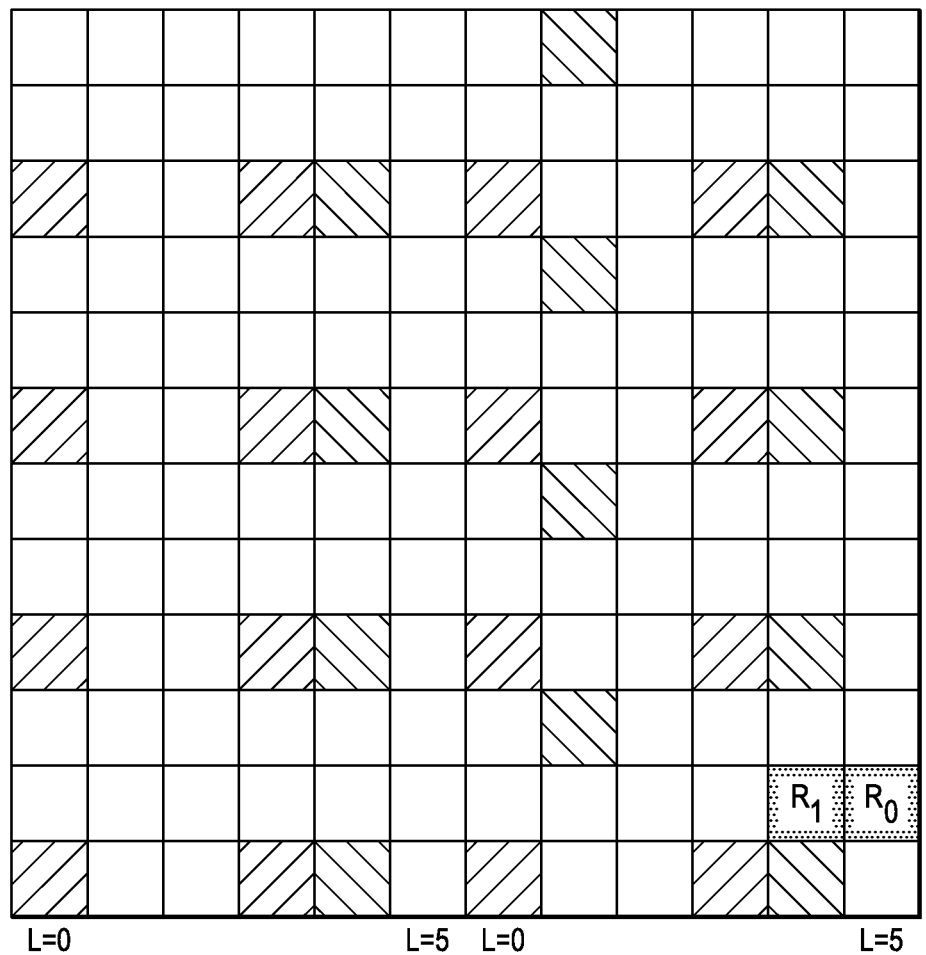
FIG. 47 illustrates a first example of a two antenna CSI-RS pattern transmitted over a Physical Resource Block (PRB) pair extended Cyclic Prefix system not using antenna ports 2 and 3 for transmitting cell-specific RS.
Figure 47:
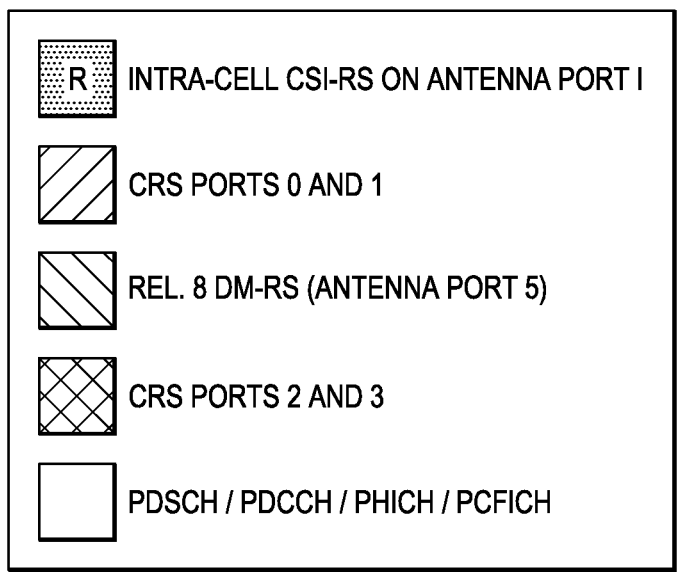
Figure 48:
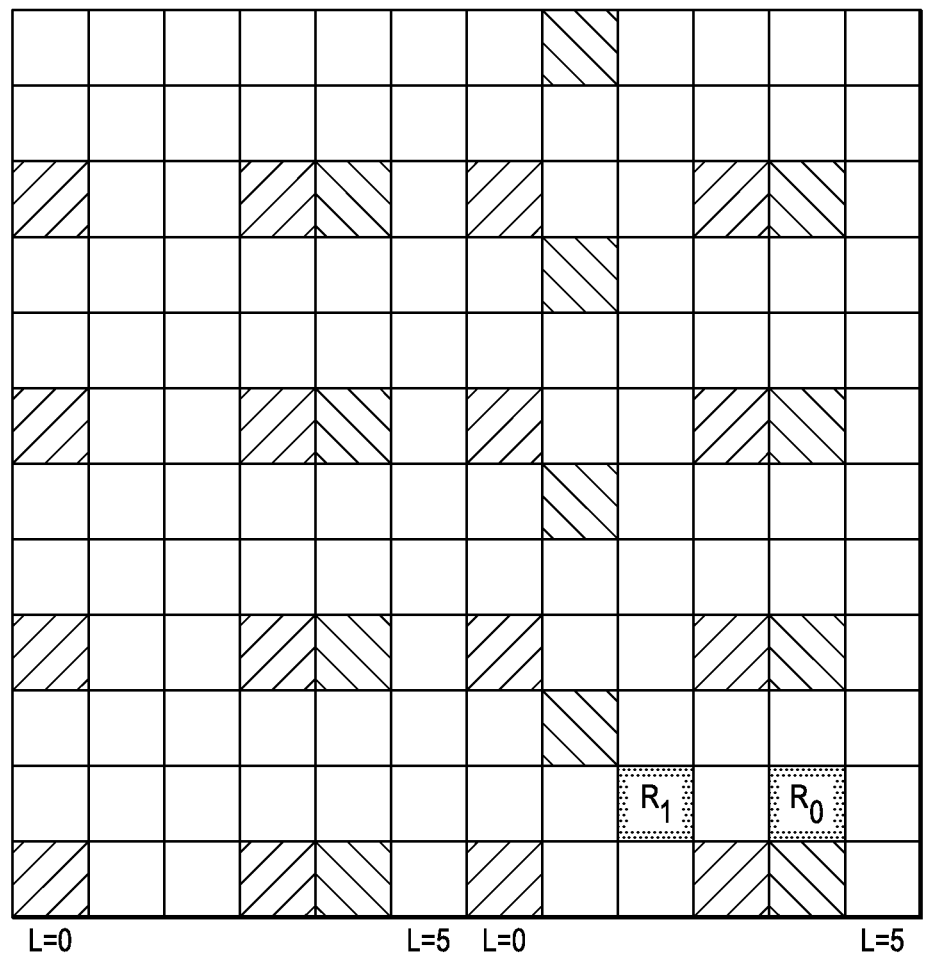
FIG. 48 illustrates a second example of a two antenna CSI-RS pattern transmitted over a Physical Resource Block (PRB) pair extended Cyclic Prefix system not using antenna ports 2 and 3 for transmitting cell-specific RS.
Figure 48:
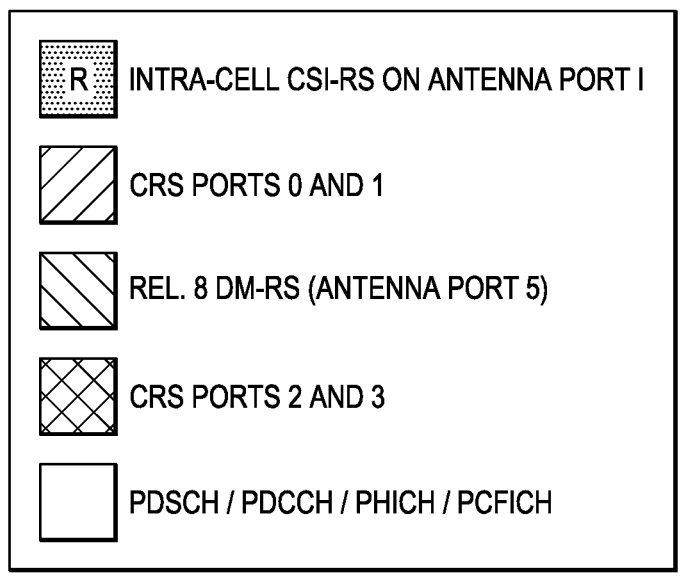
Figure 49:
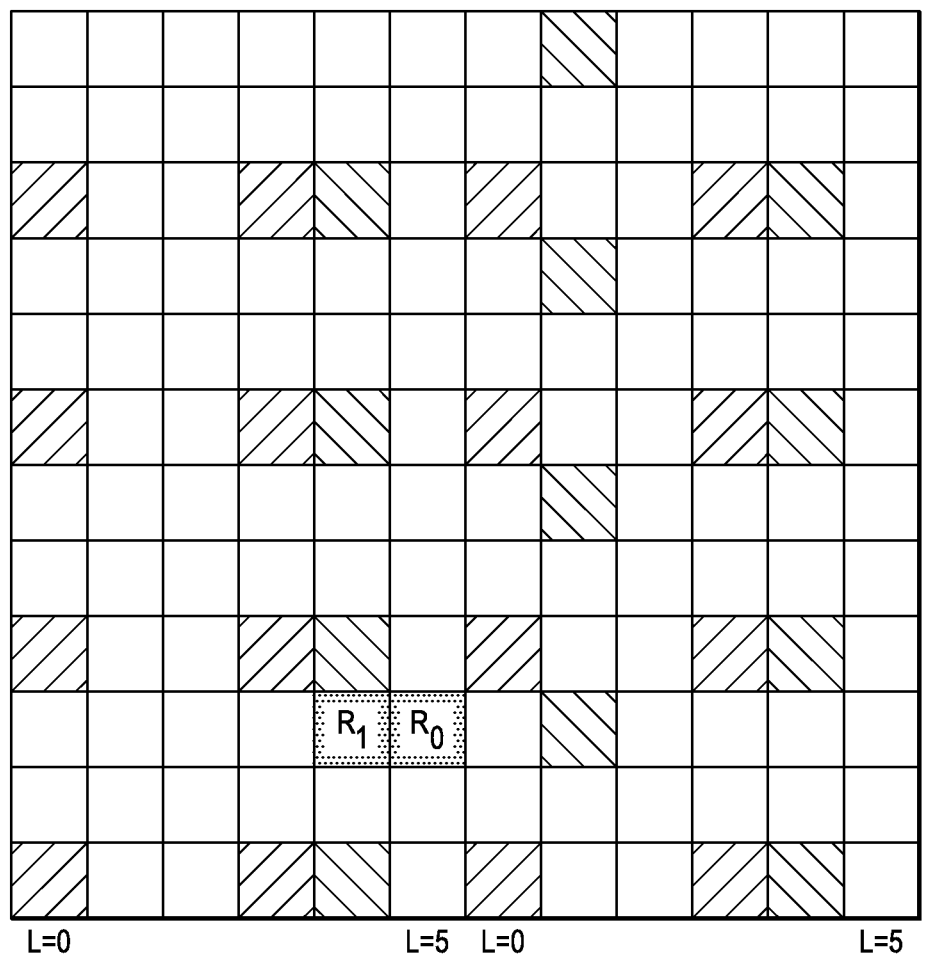
FIG. 49 illustrates a third example of a two antenna CSI-RS pattern transmitted over a Physical Resource Block (PRB) pair extended Cyclic Prefix system not using antenna ports 2 and 3 for transmitting cell-specific RS.
Figure 49:
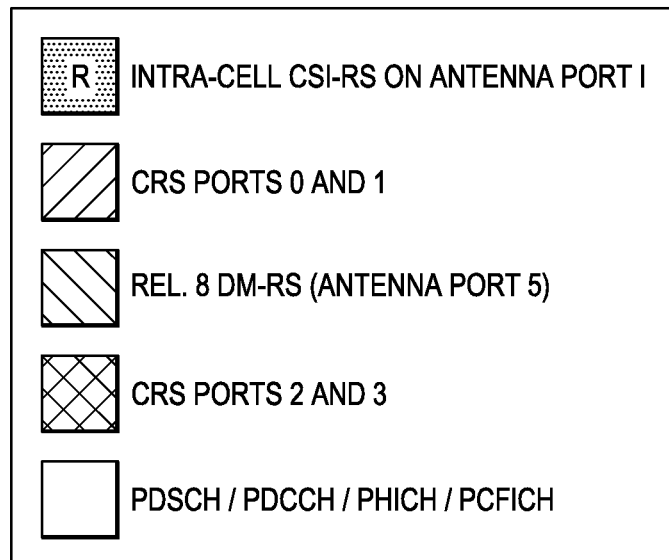
Figure 50:
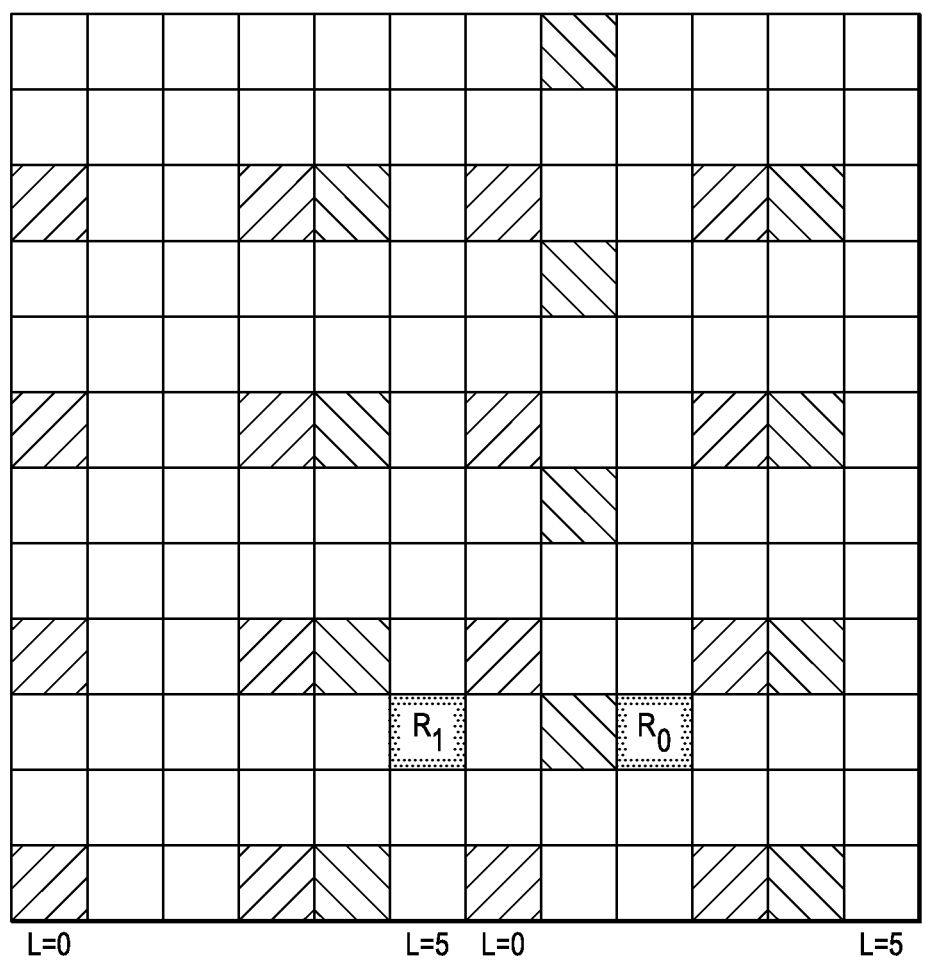
FIG. 50 illustrates a fourth example of a two antenna CSI-RS pattern transmitted over a Physical Resource Block (PRB) pair extended Cyclic Prefix system not using antenna ports 2 and 3 for transmitting cell-specific RS.
Figure 50:
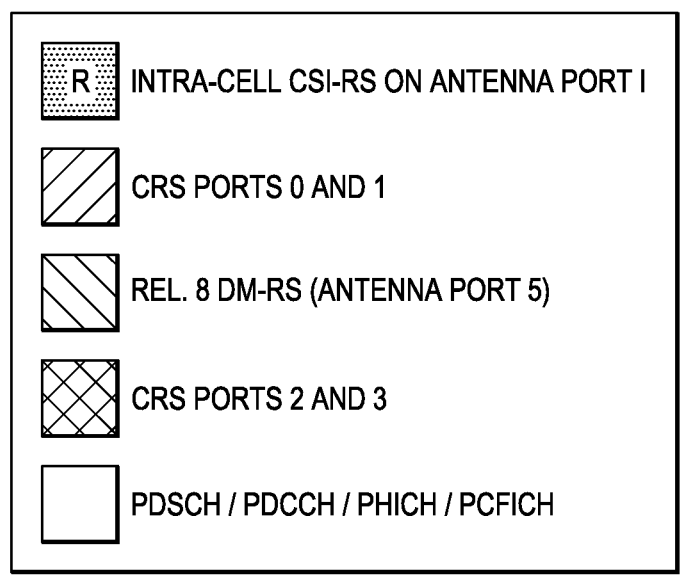
Figure 51:
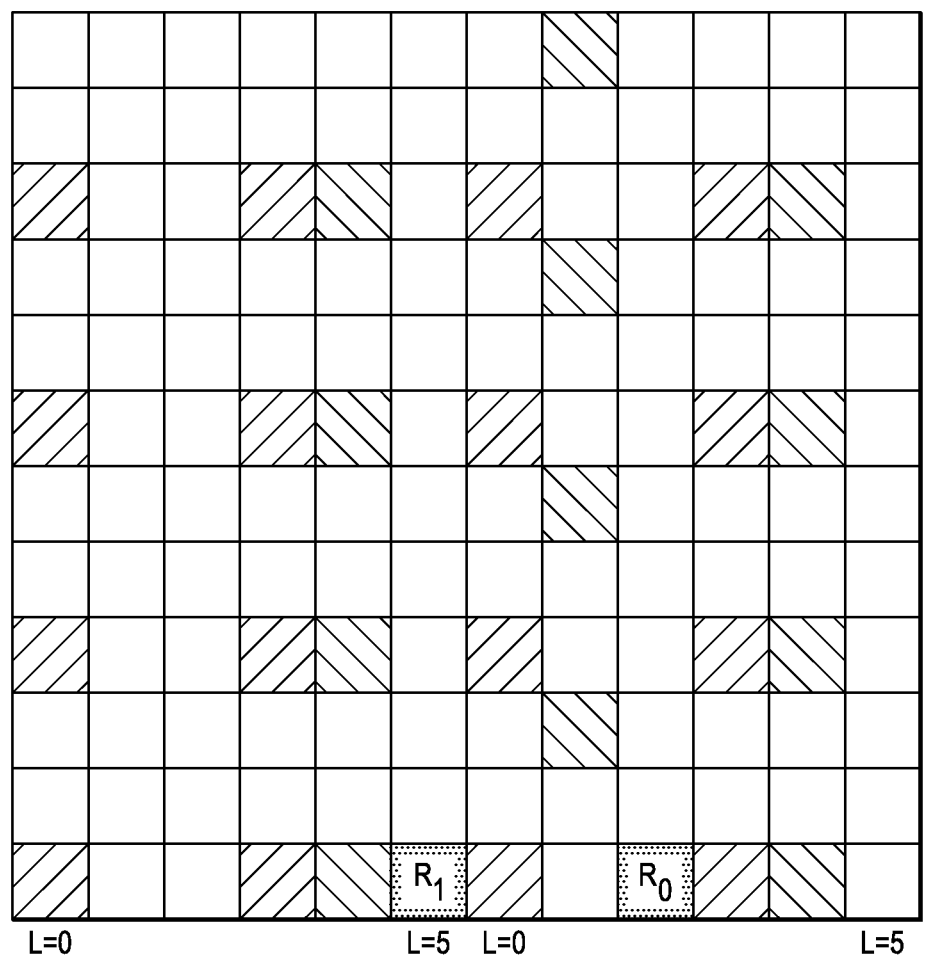
FIG. 51 illustrates a fifth example of a two antenna CSI-RS pattern transmitted over a Physical Resource Block (PRB) pair extended Cyclic Prefix system not using antenna ports 2 and 3 for transmitting cell-specific RS.
Figure 51:
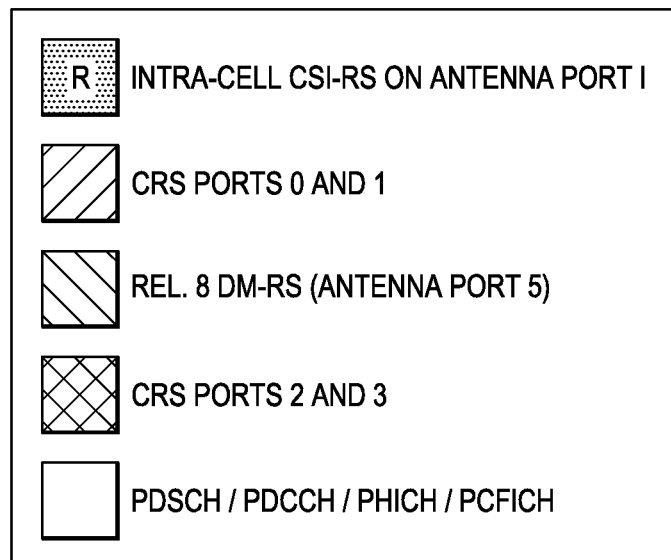
Figure 52:
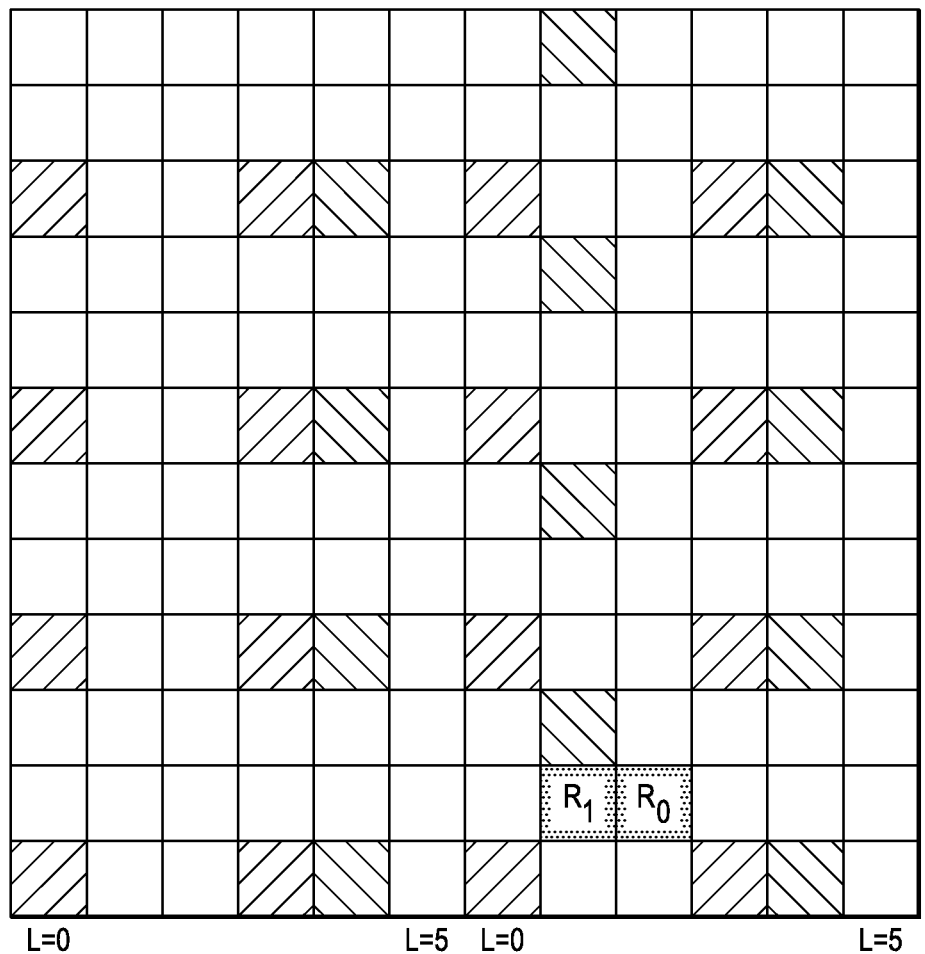
FIG. 52 illustrates a sixth example of a two antenna CSI-RS pattern transmitted over a Physical Resource Block (PRB) pair extended Cyclic Prefix system not using antenna ports 2 and 3 for transmitting cell-specific RS.
Figure 52:
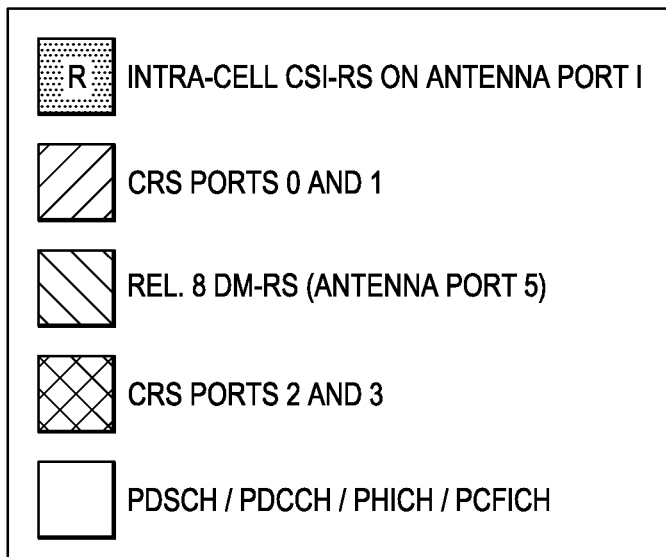
Figure 53:
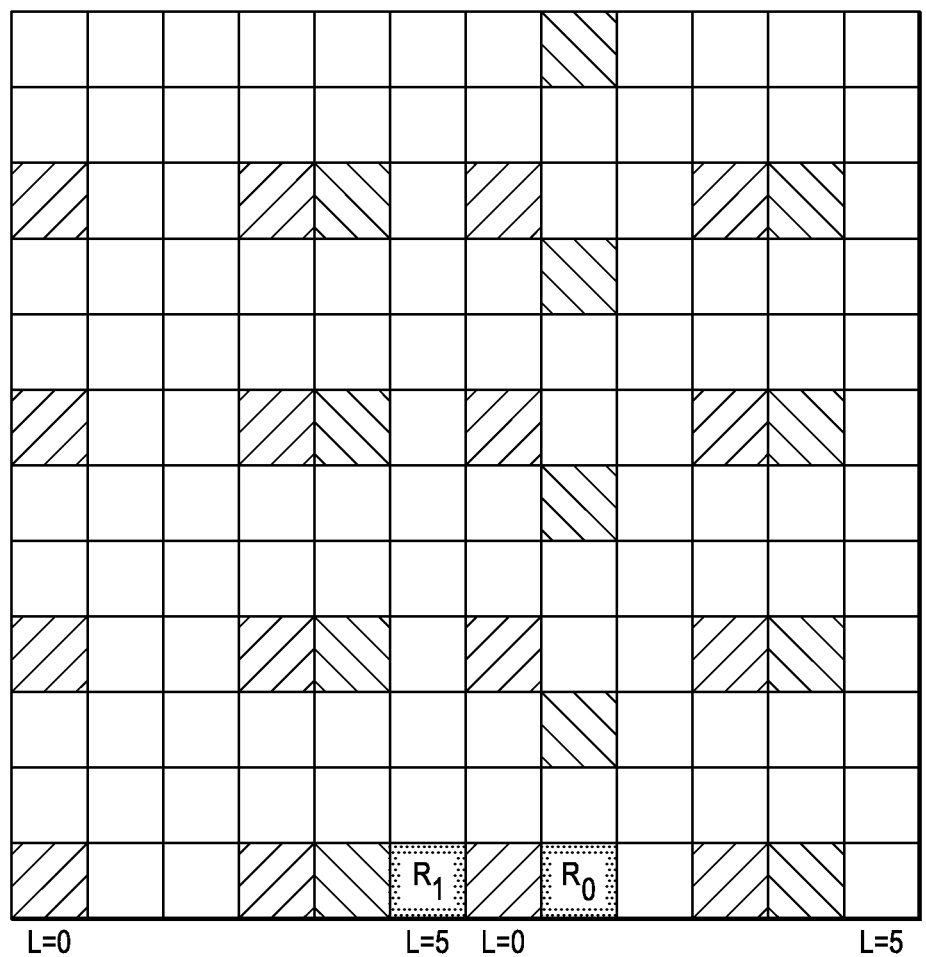
FIG. 53 illustrates a seventh example of a two antenna CSI-RS pattern transmitted over a Physical Resource Block (PRB) pair extended Cyclic Prefix system not using antenna ports 2 and 3 for transmitting cell-specific RS.
Figure 53:
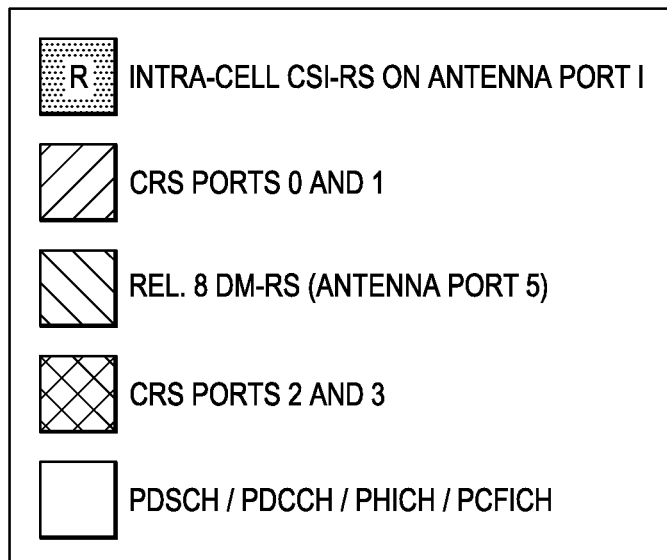

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

This invention has the following characteristics. Intra-cell CSI-RS transmissions for all APs occur within a single subframe in each frame. This invention avoids CSI-RS pattern collisions with AP 5 REs whether or not TM7 is enabled. The eNodeB avoids interference on AP 5 by picking a reuse pattern for a given cell specific Rel. 8 DM-RS shift if possible. This invention avoids collision with PBCH, synchronizism and paging channels, by choosing the unicast subframe index on which CSI-RS transmissions occur from the set {1, 2, 3, 6, 7, 8}. For normal CP operation, the CSI-RS transmissions may occur on OFDM symbol 3 whenever system bandwidth is 3 MHz or higher. CSI-RS transmissions can occur on OFDM symbol 8 (resp. OFDM symbol 7) in normal CP operation (resp. extended CP operation) if and only if the cell is configured for i≤2 CRS antenna ports.

This invention supports CDM-T multiplexing for CSI-RS. CDM-T is well adapted towards low mobility environments for which closed-loop MIMO operation is intended. Alternative multiplexing schemes such as CDM-F may either suffer from loss in orthogonality due to frequency selectivity or increase channel estimator complexity (CSM multiplexing). CDM-T multiplexing is used in conjunction with orthogonal cover codes (OCC) for Rel. 10 UE-RS transmission. In this invention CSI-RS patterns use pair-wise CDM-T multiplexing of CSI-RS APs with orthogonal cover code (OCC2).

In one embodiment of the invention CSI-RS subframes utilize CDMT multiplexing with length-2 OCC for both normal CP and extended CP transmissions.

FIGS. 3 to 19 illustrate 8 TX CSI-RS patterns for extended CP transmission. FIGS. 20 to 36 illustrate 4 TX CSI-RS patterns for extended CP transmission. FIGS. 37 to 53 illustrate 2 TX CSI-RS patterns for extended CP transmission.

The patterns are designed so that the CSI-RS pilots accommodate and avoid collisions with existing and newly introduced RS, taking into account their CELL-ID dependent pattern shifts. For Rel. 8 CRS the pattern shift in REs is CELL-ID modulo 6. For Rel. 8 DM-RS the corresponding pattern shift in Res $v_{shift}$ is CELL-ID modulo 3. The patterns do not puncture or transmit on REs corresponding to AP 5. When CRS ports 2 and 3 are disabled, the patterns additionally use OFDM symbols 3 and 8 for transmitting CSI-RS pilots.

The CSI-RS patterns are designed with a time-invariant time and frequency shift per cell. The location of AP 0 for CSI-RS pilots is determined by the serving CELL-ID, system bandwidth and whether CRS ports 2 and 3 are enabled. Time and frequency resource location of AP for i>0 is implicitly derived given the location of AP 0.

The UE-RS transmission patterns for extended CP transmission are not finalized. There is a proposal to stagger UE-RS pattern for extended CP with transmission ranks lesser than or equal to 2. This technique raises concerns regarding the applicability of transmission rank greater than 2. In the typical use the priority for extended CP transmission is to maximize coverage in large cells rather than increasing the peak throughput. This invention restricts transmission rank to less than 2 for extended CP operation. This invention focuses on CSI-RS design for extended CP assuming a staggered UE-RS pattern.

This invention proposes CSI-RS patterns for extended CP that are forward compatible with the proposed staggered UE-RS pattern and assumes that the transmission ranks are restricted to less than or equal to 2. To maximize the achievable reuse factor, this invention expands the OFDM symbol set depending on the eNodeB antenna port configuration. If APs 2 and 3 are enabled, the OFDM symbol pair carrying the CDM-T multiplexed CSI-RS pattern is chosen from the set {(5, 8), (10, 11)}. If APs 2 and 3 are disabled, the set of OFDM symbol pair carrying the CDM-T multiplexed CSI-RS is chosen from the set {(4, 5), (5, 7), (7, 8), (10, 11)}.

Table 2 shows the obtained reuse factors using the inventive CSI-RS patterns.

TABLE 2

| Configuration | 2 CSI-RS ports | 4 CSI-RS ports | 8 CSI-RS ports |
|---|---|---|---|
| With Port 5 | 12 | 6 | 3 |
| Without Port 5 | 12 | 6 | 3 |
| Without Ports 2/3 | 16 | 8 | 4 |

Table 3 shows guidelines on how the UE can be assigned its CSI-RS pattern according to the serving CELL-ID and the antenna port configuration at its serving eNodeB.

TABLE 3

| OFDM symbols carrying AP 0 | Potential RE indices for AP 0 (Cell-ID = 0 mod 3) | Potential RE indices for AP 0 (Cell-ID = 1 mod 3) | Potential RE indices for AP 0 (Cell-ID = 2 mod 3) | Applicability |
|---|---|---|---|---|
| (10, 11) | 1 | 0 | 3 | Co-exists with CRS APs 2 & 3 and Rel. 8 DM-RS on AP 5. |
| (5, 8) | 0 or 2 | 3 or 5 | 6 or 8 | Co-exists with CRS APs 2 & 3 and Rel. 8 DM-RS on AP 5. |
| (4, 5) | 2 | 5 | 8 | CRS APs 2 & 3 are disabled |
| (7, 8) | 1 | 4 | 7 | CRS APs 2 & 3 are disabled |
| (5, 7) | 0 | 3 | 6 | CRS APs 2 & 3 are disabled |

This invention presents design guidelines outlines for CSI-RS pilot patterns in LTE-A. This invention also includes a set of candidate pilot patterns for different cell-ID modulo 3 values and their achievable re-use factors taking into account the antenna port configuration at the serving cell.

In this invention CSI-RS subframes utilize CDM-T multiplexing with length-2 OCC for both normal CP and extended CP transmissions. Intra-cell CSI-RS transmissions occur within a single subframe in each frame. This invention avoids CSI-RS pattern collisions with AP 5 REs, whether or not TM7 is enabled. The eNodeB avoids interference on AP 5 by picking a CSI-RS reuse pattern for a given cell specific Rel. 8 DM-RS shift, if possible. This invention avoids collision with PBCH, synchronizism and paging channels by choosing the unicast subframe index on which CSI-RS transmissions from the set {1, 2, 3, 6, 7, 8}. For normal CP operation, CSI-RS transmissions may occur on OFDM symbol 3 whenever system bandwidth is 3 MHz or higher. CSI-RS transmissions can occur on OFDM symbol 8 (resp. OFDM symbol 7) in normal CP operation (resp. extended CP operation) if and only if the cell is configured for i≤2 CRS antenna ports. The CSI-RS patterns have a time-invariant time and frequency shift per cell. Location of AP 0 for CSI-RS pilots is determined by the serving Cell-ID, system bandwidth and whether or not CRS ports 2 & 3 are enabled. Time and frequency resource location of AP i>0 is implicitly derived given the location of AP 0.

Table 4 lists factors in a CSI-RS overhead calculation.

TABLE 4

| Symbol | Description | Value |
|---|---|---|
| $N_{syms}$ | # OFDMA symbols/subframe | 14 |
| $N_{PDCCH}$ | #Control symbols/subframe | 3 |
| $N_{tonesperRB}$ | Resource Elements per RB | 12 |
| $N_{RB}$ | Number of scheduled PDSCH RBs | 4 |
| $N_{CSIRSports}$ | Number of CSIRS ports | 8 |
| $N_{DMRSREperRB}$ | Number of DMRS REs per subframe | 24 |
| $N_{CRSRE}$ | Number of CRS REs outside PDCCH region per subframe | 12 |
| $DutyCycle_{CSIRS}$ | Fraction of subframes in which CSI-RS is transmitted | 0.1 |

Ignoring SCH and BCH resource elements (REs), assume a PDSCH allocation of $N_{RB}$ resource blocks. The CSI-RS specific parameter is given by $M_{CSIRSperport}$ in units of REs/PRB/port. Define the parameter $N_{DMRSREperRB}$ which denotes the total number of DMRS symbols in each RB. Table 4 lists detailed description of different parameters used in the ensuing CSI-RS overhead calculations.

The number of available data (PDSCH) REs when CSI-RS is present is therefore given as $$N_{data} = N_{Rb} * [(N_{syms} - N_{PDCCH}) * N_{tonesperRB} - M_{CSIRSperport} * N_{CSIRSports} - N_{CRSRE} - N_{DMRSREperRB}].$$

Using typical values given in Table 4, the total available number of PDSCH REs ($N_{data}$) equals 400 REs.

FIGS. 3 to 52 illustrate the multi-cell CSI-RS reference patterns of this invention for various numbers of transmitting antenna and various ports. Each pattern is one PRB in a 12 by N grid. Twelve is the number of resource elements (RE) in one physical resource block (PRB). The X-axis is time in OFDM symbols. The Y-axis is frequency in RE. These figures illustrate extended CP where N is 12 symbols. The symbol $R_i$ identifies the position within the PRB of the transmission of the ith antenna.

A cell transmits a unique pattern. An initial pattern is determined using formula cell-ID modulo 12. This pattern satisfies the nested property. RE locations with 4 antenna ports are a subset of the 8 antenna port case. RE locations with 2 antenna ports are a subset of the 4 antenna port case.

The pattern is periodic across frequency domain with a periodicity of 12 REs. This it is sufficient to show a single PRB. CSI-RS transmission occurs on all subframes except BCH/PSCH/SSCH/Paging subframes. CSI-RS subframe offset candidates Frequency Division Duplex (FDD) of 1, 2, 3, 6, 7 and 8 (indexed from 0). Candidate subframes in Time Division Duplex (TDD) include down Pilot Transmit Slot (DwPTS) and [Configuration 0:5], [Configuration 1:4, 9], [Configuration 2:3, 4, 8, 9], [Configuration 3:6, 7, 8, 9], [Configuration 4:4, 6, 7, 8, 9], [Configuration 5:3, 4, 6, 7, 8, 9], [Configuration 6:9]. For TDD the transmissions are assumed to occur on paging subframe for Configuration 1 and on SCH subframe for Configuration 1. In the base pattern the CELL-ID is 0 mod 3. Base patterns include possible alternative patterns obtained by relabeling antenna ports among the noted intra-cell CSI-RS REs.

FIGS. 3 to 7 are five examples of the pattern for 8 TX, extended CP using antenna ports 2, 3 and 5. A CDM-T spreading code such as Walsh Hadamard with OCC2-Mux spreads across REs at same frequency location modulates antenna ports (0,1), (2,3), (4,5) and (6,7) across ($R_i, R_{i+1}$) where i=0, 2, 4 and 6 on separate OFDM symbols. This produces the pattern of FIG. 3. The additional CSI-RS patterns of FIGS. 4 to 7 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0.

FIGS. 8 to 12 are five examples of the pattern for 8 TX, extended CP without antenna port 5. A CDM-T spreading code such as Walsh Hadamard with OCC2-Mux spreads across REs at same frequency location modulates antenna ports (0,1), (2,3), (4,5) and (6,7) across ($R_i, R_{i+1}$) where i=0, 2, 4 and 6 on separate OFDM symbols. This produces the pattern of FIG. 8. The additional CSI-RS patterns of FIGS. 9 to 12 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0.

FIGS. 13 to 19 are seven examples of the pattern for 8 TX, extended CP without antenna ports 2 and 3. A CDM-T spreading code such as Walsh Hadamard with OCC2-Mux spreads across REs at same frequency location modulates antenna ports (0,1), (2,3), (4,5) and (6,7) across ($R_i, R_{i+1}$) where i=0, 2, 4 and 6 on separate OFDM symbols. This produces the pattern of FIG. 13. The additional CSI-RS patterns of FIGS. 14 to 19 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0.

FIGS. 20 to 24 are five examples of the pattern for 4 TX, extended CP using antenna ports 2, 3 and 5. A CDM-T spreading code such as Walsh Hadamard with OCC2-Mux spreads across REs at same frequency location modulates antenna ports (0,1), (2,3), (4,5) and (6,7) across ($R_i, R_{i+1}$) where i=0, 2, 4 and 6 on separate OFDM symbols. This produces the pattern of FIG. 20. The additional CSI-RS patterns of FIGS. 21 to 24 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0. Note that the 4 TX patterns of FIGS. 20 to 24 are subsets of the 8 TX patterns of FIGS. 3 to 7.

FIGS. 25 to 29 are five examples of the pattern for 4 TX, extended CP without antenna port 5. A CDM-T spreading code such as Walsh Hadamard with OCC2-Mux spreads across REs at same frequency location modulates antenna ports (0,1), (2,3), (4,5) and (6,7) across ($R_i, R_{i+1}$) where i=0, 2, 4 and 6 on separate OFDM symbols. This produces the pattern of FIG. 25. The additional CSI-RS patterns of FIGS. 26 to 29 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0. Note that the 4 TX patterns of FIGS. 25 to 29 are subsets of the 8 TX patterns of FIGS. 8 to 12.

FIGS. 30 to 36 are seven examples of the pattern for 4 TX, extended CP without antenna ports 2 and 3. A CDM-T spreading code such as Walsh Hadamard with OCC2-Mux spreads across REs at same frequency location modulates antenna ports (0,1), (2,3), (4,5) and (6,7) across ($R_i, R_{i+1}$) where i=0, 2, 4 and 6 on separate OFDM symbols. This produces the pattern of FIG. 13. The additional CSI-RS patterns of FIGS. 14 to 19 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0. Note that the 4 TX patterns of FIGS. 30 to 36 are subsets of the 8 TX patterns of FIGS. 13 to 19.

FIGS. 37 to 41 are five examples of the pattern for 2 TX, extended CP using antenna ports 2, 3 and 5. A CDM-T spreading code such as Walsh Hadamard with OCC2-Mux spreads across REs at same frequency location modulates antenna ports (0,1), (2,3), (4,5) and (6,7) across $(R_i, R_{i+1})$ where i=0, 2, 4 and 6 on separate OFDM symbols. This produces the pattern of FIG. 37. The additional CSI-RS patterns of FIGS. 38 to 41 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0. Note that the 2 TX patterns of FIGS. 37 to 41 are subsets of the 4 TX patterns of FIGS. 20 to 24 which are subsets of the 8 TX patterns of FIGS. 3 to 7.

FIGS. 42 to 46 are five examples of the pattern for 2 TX, extended CP without antenna port 5. A CDM-T spreading code such as Walsh Hadamard with OCC2-Mux spreads across REs at same frequency location modulates antenna ports (0,1), (2,3), (4,5) and (6,7) across $(R_i, R_{i+1})$ where i=0, 2, 4 and 6 on separate OFDM symbols. This produces the pattern of FIG. 42. The additional CSI-RS patterns of FIGS. 43 to 46 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0. Note that the 2 TX patterns of FIGS. 42 to 46 are subsets of the 4 TX patterns of FIGS. 25 to 29 which are subsets of the 8 TX patterns of FIGS. 8 to 12.

FIGS. 47 to 53 are seven examples of the pattern for 2 TX, extended CP without antenna ports 2 and 3. A CDM-T spreading code such as Walsh Hadamard with OCC2-Mux spreads across REs at same frequency location modulates antenna ports (0,1), (2,3), (4,5) and (6,7) across $(R_i, R_{i+1})$ where i=0, 2, 4 and 6 on separate OFDM symbols. This produces the pattern of FIG. 47. The additional CSI-RS patterns of FIGS. 48 to 53 are obtained by cyclically shifting pattern by 3 REs within one RB with Candidate OS set: {(4,5), (8,10), (10,11)} [(a,b)=OCC2-Mux on OS a and b]. Cyclic shifts preserve relative locations of ports 1 to 7 with respect to port 0. Candidate OFDM symbol locations for port 0 are 5, 9 and 10. The symbol position of port 1 is implicitly determined from port 0:# CSI-RS patterns of 12. Port 1 is located on the not colliding with port 2/3/5 and Rel. 10 UE-RS to the left of OFDM symbol carrying port 0. Note that the 2 TX patterns of FIGS. 47 to 53 are subsets of the 4 TX patterns of FIGS. 30 to 36 are subsets of the 8 TX patterns of FIGS. 13 to 19.

Another embodiment of the invention assumes OFDM symbols containing port 0 are to right of port 1 as illustrated in FIGS. 3 to 52. This embodiment will describe the 8 TX case only. Two and 4 antenna port configurations are nested. Define Flag as 1 if ports 2 and 3 active else Flag is 0. Define $(k_i, l_i)$ as the (RE Offset, OFDM symbol offset).

Valid OFDM symbol locations for port 0 are 5, 7, 8, 10 and 11. If Flag is 1, the define X as Cell-ID modulo 6. Perform a one-to-one mapping from X to symbols 5, 8, 10 and 11. Assign to L0. If Flag is 0, define X as Cell-ID modulo 5. Perform a one-to-one mapping from X to symbols 5, 7, 8, 10 and 11. Assign to L0.

Valid RE locations for port 0 are as follows. If L0 is 5 and Flag is 1, define X as Cell-ID modulo 8. Perform a one-to-one mapping from X to RE positions 0, 2, 3, 5, 6, 8, 9 and 11. Assign to k0. If L0 is 8 and Flag is 0, Define X as Cell-ID modulo 4. Perform a one-to-one mapping from X to RE positions 1, 4, 7 and 10. Assign to k0. If L0 is 7, define X as Cell-ID modulo 4. Perform a one-to-one mapping from X to RE positions 0, 3, 6 and 9. Assign to k0. If L0 is 10 or 11, define X as Cell-ID modulo 4. Perform a one-to-one mapping from X to RE positions 1, 4, 7 and 10. Assign to k0. If L0 is 5, define x as Cell-ID modulo 4. Perform a one-to-one mapping from x to RE positions 2, 5, 8 and 11. Assign to k0.

Valid RE locations for Port 1 are as follows.

k1 to k0

$$L1 = 5*(L0==8) + 8*(L0==10) + 10*(L0==11) + 4*(L0==5) + 5*(L0==7) + (L0==8)*(7-2*\text{Flag})$$

A further embodiment of the invention assumes OFDM symbols containing port 0 are to the left of port 1 as illustrated in FIGS. 3 to 52. This embodiment will describe the 8 TX case only. Two and 4 antenna port configurations are nested. Define Flag as 1 if ports 2 and 3 active else Flag is 0. Define $(k_i, l_i)$ as the (RE Offset, OFDM symbol offset).

Valid OFDM symbol locations for port 0 are 4, 5, 7, 8 and 10. If Flag is 1, the define X as Cell-ID modulo 6. Perform a one-to-one mapping from X to symbols 4, 5, 8 and 10. Assign to L0. If Flag is 0, define X as Cell-ID modulo 5. Perform a one-to-one mapping from X to symbols 4, 5, 7, 8 and 10. Assign to L0.

Valid RE locations for port 0 are as follows. If L0 is 5 and Flag is 1, define X as Cell-ID modulo 8. Perform a one-to-one mapping from X to RE positions 0, 2, 3, 5, 6, 8, 9 and 11. Assign to k0. If L0 is 8 and Flag is 0, Define X as Cell-ID modulo 4. Perform a one-to-one mapping from X to RE positions 1, 4, 7 and 10. Assign to k0. If L0 is 7, define X as Cell-ID modulo 4. Perform a one-to-one mapping from X to RE positions 0, 3, 6 and 9. Assign to k0. If L0 is 10 or 11, define X=Cell-ID modulo 4. Perform a one-to-one mapping from X to RE positions 1, 4, 7 and 10. Assign to k0. If L0 is 5, define x as Cell-ID modulo 4. Perform a one-to-one mapping from x to RE positions 2, 5, 8 and 11. Assign to k0.

Valid RE locations for Port 1 are as follows.

k1 to k0

$$L1 = 8*(L0==5) + 5*(L0==4) + 11*(L0==10) + 10*(L0==8) + (L0==7)*\text{Flag}*8$$

Figure 54:
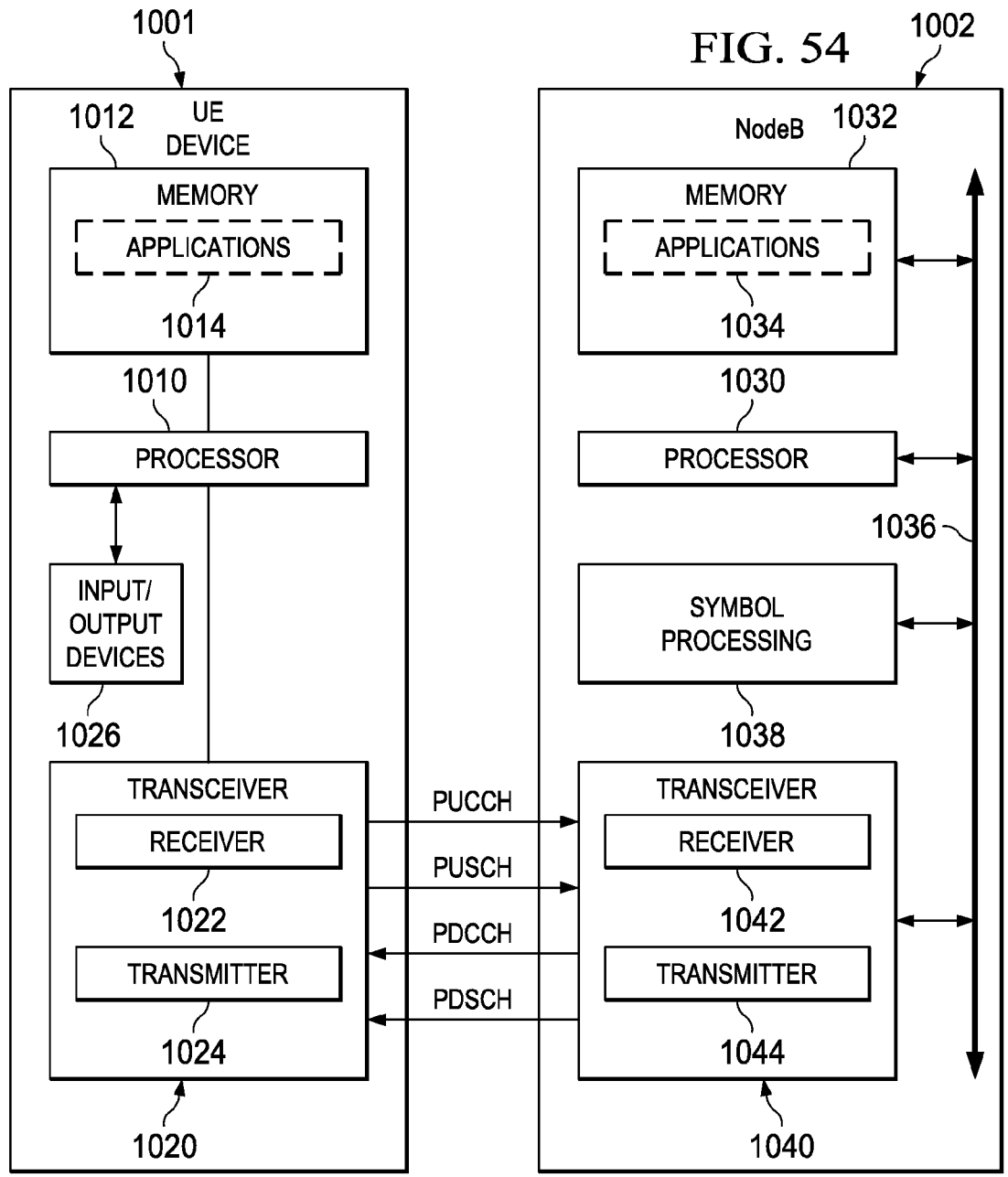
FIG. 54 is a block diagram illustrating internal details of a base station and a mobile user equipment in the network system of FIG. 1 suitable for implementing this invention.

FIG. 54 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

Those skilled in the art would realize that the invention also includes alternative patterns obtained by relabeling and/or reshuffling the CSI-RS antenna port numbers while preserving identical time-frequency resources assigned to CSI-RS in the time-frequency grid as given in the attached drawings.

What is claimed is:

1. A method of wireless communication of channel state information-reference symbols (CSI-RS) between a base station having multiple antenna and at least one user equipment in code division multiplexing-time (CDM-T) multiplexing comprising the steps of:

each user equipment determining a cell group CSI-RS pattern (10, 11) in physical resource blocks (PRBs) having an X-axis of time in Orthogonal Frequency Division Multiplexing (OFDM) symbols and a Y-axis of frequency in Resource Elements (RE) from Cell-ID modulo 3:

each user equipment mapping their Cell-ID to an element in a set of candidate OFDM pairs to choose a corresponding OFDM symbol pair on which to transmit CDM-T multiplexed CSI-RS pilots, thereby determining OFDM symbol locations for Antenna Port (AP) 0;

each user equipment determining a RE offset for Antenna Port (AP) 0 from the value of Cell-ID modulo 3; and each user equipment transmitting extended cyclic prefix (CP) CSI-RS signals on the determined portions of the PRB.

2. The method of claim 1, wherein:
    said step of determining a RE offset for Antenna Port (AP) 0 determines
    1 for a Cell-ID of 0 modulo 3,
    0 for a Cell-ID of 1 modulo 3, and
    3 for a Cell-ID of 2 modulo 3.

3. A method of wireless communication of channel state information-reference symbols (CSI-RS) between a base station having multiple antenna and at least one user equipment in code division multiplexing-time (CDM-T) multiplexing comprising the steps of:
  each user equipment determining a cell group CSI-RS pattern (5, 8) in physical resource blocks (PRBs) having an X-axis of time in Orthogonal Frequency Division Multiplexing (OFDM) symbols and a Y-axis of frequency in Resource Elements (RE) from Cell-ID modulo 3;
  each user equipment mapping their Cell-ID to an element in a set of candidate OFDM pairs to choose a corresponding OFDM symbol pair on which to transmit CDM-T multiplexed CSI-RS pilots, thereby determining OFDM symbol locations for Antenna Port (AP) 0;
  each user equipment determining a RE offset for Antenna Port (AP) 0 from the value of Cell-ID modulo 3; and
  each user equipment transmitting extended cyclic prefix (CP) CSI-RS signals on the determined portions of the PRB.

4. The method of claim 3, wherein:
  said step of determining a RE offset for Antenna Port (AP) 0 determines
    0 or 3 for a Cell-ID of 0 modulo 3,
    3 or 5 for a Cell-ID of 1 modulo 3, and
    6 or 8 for a Cell-ID of 2 modulo 3.

5. A method of wireless communication of channel state information-reference symbols (CSI-RS) between a base station having multiple antenna and at least one user equipment in code division multiplexing-time (CDM-T) multiplexing comprising the steps of:
  each user equipment determining a cell group CSI-RS pattern (4, 5) in physical resource blocks (PRBs) having an X-axis of time in Orthogonal Frequency Division Multiplexing (OFDM) symbols and a Y-axis of frequency in Resource Elements (RE) from Cell-ID modulo 3;
  each user equipment mapping their Cell-ID to an element in a set of candidate OFDM pairs to choose a corresponding OFDM symbol pair on which to transmit CDM-T multiplexed CSI-RS pilots, thereby determining OFDM symbol locations for Antenna Port (AP) 0;
  each user equipment determining a RE offset for Antenna Port (AP) 0 from the value of Cell-ID modulo 3;
  each user equipment transmitting extended cyclic prefix (CP) CSI-RS signals on the determined portions of the PRB; and
  wherein Antenna Ports (AP) 2 and 3 are disabled.

6. The method of claim 5, wherein:
  said step of determining a RE offset for AP 0 determines
    2 for a Cell-ID of 0 modulo 3,
    5 for a Cell-ID of 1 modulo 3, and
    8 for a Cell-ID of 2 modulo 3.

7. A method of wireless communication of channel state information-reference symbols (CSI-RS) between a base station having multiple antenna and at least one user equipment in code division multiplexing-time (CDM-T) multiplexing comprising the steps of:
  each user equipment determining a cell group CSI-RS pattern (7, 8) in physical resource blocks (PRBs) having an X-axis of time in Orthogonal Frequency Division Multiplexing (OFDM) symbols and a Y-axis of frequency in Resource Elements (RE) from Cell-ID modulo 3;
  each user equipment mapping their Cell-ID to an element in a set of candidate OFDM pairs to choose a corresponding OFDM symbol pair on which to transmit CDM-T multiplexed CSI-RS pilots, thereby determining OFDM symbol locations for Antenna Port (AP) 0;
  each user equipment determining a RE offset for Antenna Port (AP) 0 from the value of Cell-ID modulo 3;
  each user equipment transmitting extended cyclic prefix (CP) CSI-RS signals on the determined portions of the PRB; and
  wherein Antenna Ports (AP) 2 and 3 are disabled.

8. The method of claim 7, wherein:
  said step of determining a RE offset for Antenna Port (AP) 0 determines
    1 for a Cell-ID of 0 modulo 3,
    4 for a Cell-ID of 1 modulo 3, and
    7 for a Cell-ID of 2 modulo 3.

9. A method of wireless communication of channel state information-reference symbols (CSI-RS) between a base station having multiple antenna and at least one user equipment in code division multiplexing-time (CDM-T) multiplexing comprising the steps of:
  each user equipment determining a cell group CSI-RS pattern (5, 7) in physical resource blocks (PRBs) having an X-axis of time in Orthogonal Frequency Division Multiplexing (OFDM) symbols and a Y-axis of frequency in Resource Elements (RE) from Cell-ID modulo 3;
  each user equipment mapping their Cell-ID to an element in a set of candidate OFDM pairs to choose a corresponding OFDM symbol pair on which to transmit CDM-T multiplexed CSI-RS pilots, thereby determining OFDM symbol locations for Antenna Port (AP) 0;
  each user equipment determining a RE offset for Antenna Port (AP) 0 from the value of Cell-ID modulo 3;
  each user equipment transmitting extended cyclic prefix (CP) CSI-RS signals on the determined portions of the PRB; and
  wherein Antenna Ports (AP) 2 and 3 are disabled.

10. The method of claim 9, wherein:
  said step of determining a RE offset for Antenna Port (AP) 0 determines
    0 for a Cell-ID of 0 modulo 3,
    3 for a Cell-ID of 1 modulo 3, and
    6 for a Cell-ID of 2 modulo 3.

11. A method of wireless communication of channel state information-reference symbols (CSI-RS) between a base station having multiple antenna and at least one user equipment in code division multiplexing-time (CDM-T) multiplexing comprising the steps of:
  define Flag as 1 if ports 2 and 3 active else Flag is 0;
  define $(k_i, l_i)$ as the (RE Offset, OFDM symbol offset);
  for port 0 select a valid OFDM symbol locations from the set including 5, 7, 8, 10 and 11;
    if Flag is 1, the define X as Cell-ID modulo 6, perform a one-to-one mapping from X to symbols 5, 8, 10 and 11 and assign to L0,
    if Flag is 0, define X as Cell-ID modulo 5, perform a one-to-one mapping from X to symbols 5, 7, 8, 10 and 11 and assign to L0;
  for port 0 select valid RE locations for port 0 as follows
    if L0 is 5 and Flag is 1, define X as Cell-ID modulo 8, perform a one-to-one mapping from X to RE positions 0, 2, 3, 5, 6, 8, 9 and 11 and assign to k0,
    if L0 is 8 and Flag is 0, define X as Cell-ID modulo 4, perform a one-to-one mapping from X to RE positions 1, 4, 7 and 10 and assign to k0, if L0 is 7, define X as Cell-ID modulo 4, perform a one-to-one mapping from X to RE positions 0, 3, 6 and 9 and assign to k0, if L0 is 10 or 11, define X as Cell-ID modulo 4, perform a one-to-one mapping from X to RE positions 1, 4, 7 and 10 and assign to k0, if L0 is 5, define x as Cell-ID modulo 4, perform a one-to-one mapping from x to RE positions 2, 5, 8 and 11 and assign to k0; and for port 1 select valid RE locations are as follows $k1=k0$, $L1=5*(L0==8)+8*(L0==10)+10*(L0==11)+4*(L0==5)+5*(L0==7)+(L0==8)*(7-2*\text{Flag})$.

12. A method of wireless communication of channel state information-reference symbols (CSI-RS) between a base station having multiple antenna and at least one user equipment in code division multiplexing-time (CDM-T) multiplexing comprising the steps of:

define Flag as 1 if ports 2 and 3 active else Flag is 0;
define $(k_i, l_i)$ as the (RE Offset, OFDM symbol offset);
for port 0 select valid OFDM symbol locations from the set of 4, 5, 7, 8 and 10
  if Flag is 1, the define X as Cell-ID modulo 6, perform a one-to-one mapping from X to symbols 4, 5, 8 and 10 and assign to L0,
  if Flag is 0, define X as Cell-ID modulo 5, perform a one-to-one mapping from X to symbols 4, 5, 7, 8 and 10 and assign to L0,
for port 0 select valid RE locations as follows
  if L0 is 5 and Flag is 1, define X as Cell-ID modulo 8, perform a one-to-one mapping from X to RE positions 0, 2, 3, 5, 6, 8, 9 and 11 and assign to k0,
  if L0 is 8 and Flag is 0, define X as Cell-ID modulo 4, perform a one-to-one mapping from X to RE positions 1, 4, 7 and 10 and assign to k0,
  if L0 is 7, define X as Cell-ID modulo 4, perform a one-to-one mapping from X to RE positions 0, 3, 6 and 9 and assign to k0,
  if L0 is 10 or 11, define X as Cell-ID modulo 4, perform a one-to-one mapping from X to RE positions 1, 4, 7 and 10 and assign to k0,
  if L0 is 5, define x as Cell-ID modulo 4, perform a one-to-one mapping from x to RE positions 2, 5, 8 and 11 and assign to k0;
for port 1 select valid RE locations as follows
  k1 to k0

$L1=8*(L0==5)+5*(L0==4)+11*(L0==10)+10*(L0==8)+(L0==7)*\text{Flag}*8$.

* * * * *